(12) United States Patent
Collins et al.

(10) Patent No.: US 12,424,124 B2
(45) Date of Patent: Sep. 23, 2025

(54) EYE MODEL WITH BUBBLE MANAGEMENT

(71) Applicants: Nathaniel R Collins, Monrovia, CA (US); Nico J Slabber, Eastvale, CA (US); Vijay R Balan, Torrance, CA (US)

(72) Inventors: Nathaniel R Collins, Monrovia, CA (US); Nico J Slabber, Eastvale, CA (US); Vijay R Balan, Torrance, CA (US)

( * ) Notice: Subject to any disclaimer, the term of this patent is extended or adjusted under 35 U.S.C. 154(b) by 0 days.

(21) Appl. No.: 19/193,478

(22) Filed: Apr. 29, 2025

(65) Prior Publication Data
US 2025/0259566 A1 Aug. 14, 2025

Related U.S. Application Data

(63) Continuation-in-part of application No. 18/920,863, filed on Oct. 19, 2024.

(60) Provisional application No. 63/593,026, filed on Oct. 25, 2023.

(51) Int. Cl.
G09B 23/30 (2006.01)
G09B 23/32 (2006.01)

(52) U.S. Cl.
CPC ........... G09B 23/303 (2013.01); G09B 23/32 (2013.01)

(58) Field of Classification Search
CPC ...... G09B 23/28; G09B 23/30; G09B 23/303; G09B 23/32
USPC ....................................................... 434/271
See application file for complete search history.

(56) References Cited

U.S. PATENT DOCUMENTS

| | | |
|---|---|---|
| 3,177,593 A | 4/1965 | Loeb |
| 4,865,552 A | 9/1989 | Maloney |
| 6,589,057 B1 | 7/2003 | Keenan |
| 7,066,598 B2 | 6/2006 | Niven |
| 8,128,412 B2 | 3/2012 | Carda |
| 8,137,111 B2 | 3/2012 | Carda |
| 8,235,728 B2 | 8/2012 | Stoll |
| 8,308,487 B2 | 11/2012 | Van Dalen |

(Continued)

OTHER PUBLICATIONS

Model-eye-tool-for-retinal-optical-coherence-tomography-instrument-calibration, Wang-et-al, Journal of Innovative Optical Health Sciences, vol. 14, No. 3 (2021).

(Continued)

*Primary Examiner* — Kurt Fernstrom
(74) *Attorney, Agent, or Firm* — Guy Cumberbatch

(57) ABSTRACT

A simulated eye surgical model with a bubble management system that facilitates training of ophthalmic surgical procedures, such as laser-based glaucoma treatment. The simulated eye could also be used for marketing, startup procedures, go/no-go tests, etc. The eye model has a lower core, a corneal dome positioned above the lower core, and an anterior chamber under the corneal dome defining a floor. A bubble reservoir under the anterior chamber defined by the lower core has a capture tube opening to the anterior chamber. A bubble chamber open to the capture tube rises up above the capture tube lower end to an upper portion sealed off from the anterior chamber. The eye model may be rotated 360° about a horizontal axis to transfer bubbles from the anterior chamber to the bubble chamber. An alternative flow-through eye model provides active flushing of bubbles and particulate.

20 Claims, 51 Drawing Sheets

(56) References Cited

U.S. PATENT DOCUMENTS

| | | |
|---|---|---|
| 8,684,743 B2 | 4/2014 | Van Dalen |
| 8,845,334 B1 | 9/2014 | Stoll |
| 9,336,692 B1 | 5/2016 | Stoll |
| 9,384,681 B2 | 7/2016 | Van Dalen |
| 9,437,119 B1 | 9/2016 | Bernal |
| 9,918,873 B2 | 3/2018 | Woodley |
| 10,290,236 B2 | 5/2019 | Bernal |
| 10,360,815 B2 | 7/2019 | Bernal |
| 10,636,325 B2 | 4/2020 | Bernal |
| 10,783,803 B2 | 9/2020 | Huh |
| 11,246,754 B2 | 2/2022 | Holland |
| 12,150,894 B2 | 11/2024 | Govari |
| 2009/0291423 A1 | 11/2009 | Hara |
| 2014/0356836 A1 | 12/2014 | Van Dalen |
| 2016/0189570 A1* | 6/2016 | Dong .................... G09B 23/30 434/271 |
| 2017/0229043 A1* | 8/2017 | Huh ....................... G09B 23/32 |
| 2020/0118466 A1 | 4/2020 | Bernal |
| 2020/0135056 A1 | 4/2020 | Omata |
| 2021/0205126 A1 | 7/2021 | Puglisi |
| 2022/0313490 A1 | 10/2022 | Schieber |
| 2022/0339032 A1 | 10/2022 | Govari |
| 2023/0237932 A1* | 7/2023 | Slabber ................. G09B 23/30 434/271 |
| 2025/0032316 A1 | 1/2025 | Govari |
| 2025/0054415 A1 | 2/2025 | Bernal |
| 2025/0078685 A1* | 3/2025 | Kenning ............. G09B 23/303 |

OTHER PUBLICATIONS

Porcine-Eye-Model-laser-surgery, Lwowski, et al., tvst.arvojournals. org, 2022.

* cited by examiner

EYE MODEL WITH BUBBLE MANAGEMENT

RELATED APPLICATIONS

The present application is a continuation-in-part of U.S. provisional Ser. No. 18/920,863, filed Oct. 19, 2024, which claims priority to U.S. provisional Ser. No. 63/593,026, filed Oct. 25, 2023, the contents of which are expressly incorporated herein.

FIELD OF THE INVENTION

The present application is directed to a simulated eye tool and, in particular, to an eye model that facilitates training of ophthalmic surgery procedures, as well as using and testing laser systems for laser-based glaucoma treatment.

BACKGROUND OF THE INVENTION

Glaucoma is a blinding optic neuropathy affecting approximately 70 million individuals worldwide. Its main risk factor is elevated intraocular pressure (IOP). The trabecular meshwork (TM), a group of tiny canals located in the iridocorneal angle, constitutes the main pathway for drainage of aqueous humor out of the eye. It is a fenestrated three-dimensional structure composed of trabecular meshwork cells (TMC) within a multi-layered extracellular matrix (ECM). The trabecular meshwork controls the IOP by regulating outflow of aqueous humor from the anterior chamber (AC) of the eye into the adjacent Schlemm's canal (SC) and then via aqueous vein collector channels into the venous system. Dysfunction of the trabecular meshwork is one major cause of IOP elevation.

Goniotomy is a surgical procedure in which an opening is made in the TM where fluid leaves the eye. The new opening provides a way for fluid to flow out of the eye. The procedures to make this opening in the TM include lasers, excising tissue via instruments and stents.

What is needed is a model human eye that closely mimics the anatomy and physiology of the human eye for particular procedures and may be reused more frequently and with better accuracy.

SUMMARY OF THE INVENTION

This application presents a simulated eye with a bubble management system that allows for bubbles generated during laser-based simulated ophthalmology procedures to be removed from the anterior chamber without puncturing the cornea or sclera.

One aspect disclosed herein is an eye model adapted to manage bubbles, comprising a lower core, a corneal dome positioned above the lower core, an anterior chamber under the corneal dome defining a floor, and a bubble reservoir defined by the lower core and located under the anterior chamber. The bubble reservoir has a capture tube opening through the floor to the anterior chamber and a bubble chamber in fluid communication with a lower end of the capture tube and rising up above the capture tube lower end to an upper portion sealed off from the anterior chamber. The bubble reservoir is configured such that upon rotation of the eye model about a horizontal axis bubbles in the anterior chamber are urged out of the capture tube and captured in the bubble chamber and, after full 360° rotation of the eye model about the horizontal axis, buoyancy of the bubbles prevents them from traveling back to the capture tube and the anterior chamber A method of use of the eye models described herein include shooting the trabecular meshwork (TM) ridge with a laser that generates bubbles. The bubbles are then captured by the bubble reservoir or flush out of the anterior chamber so that the eye model can be reused.

BRIEF DESCRIPTION OF THE DRAWINGS

Features and advantages of the present invention will become appreciated as the same become better understood with reference to the specification, claims, and appended drawings wherein:

DETAILED DESCRIPTION OF THE PREFERRED EMBODIMENTS

The present application provides an eye model that simulates a natural eye and facilitates training of ophthalmic surgical procedures, marketing, or other uses.

Glaucoma Surgery with Laser

Figure 34A:
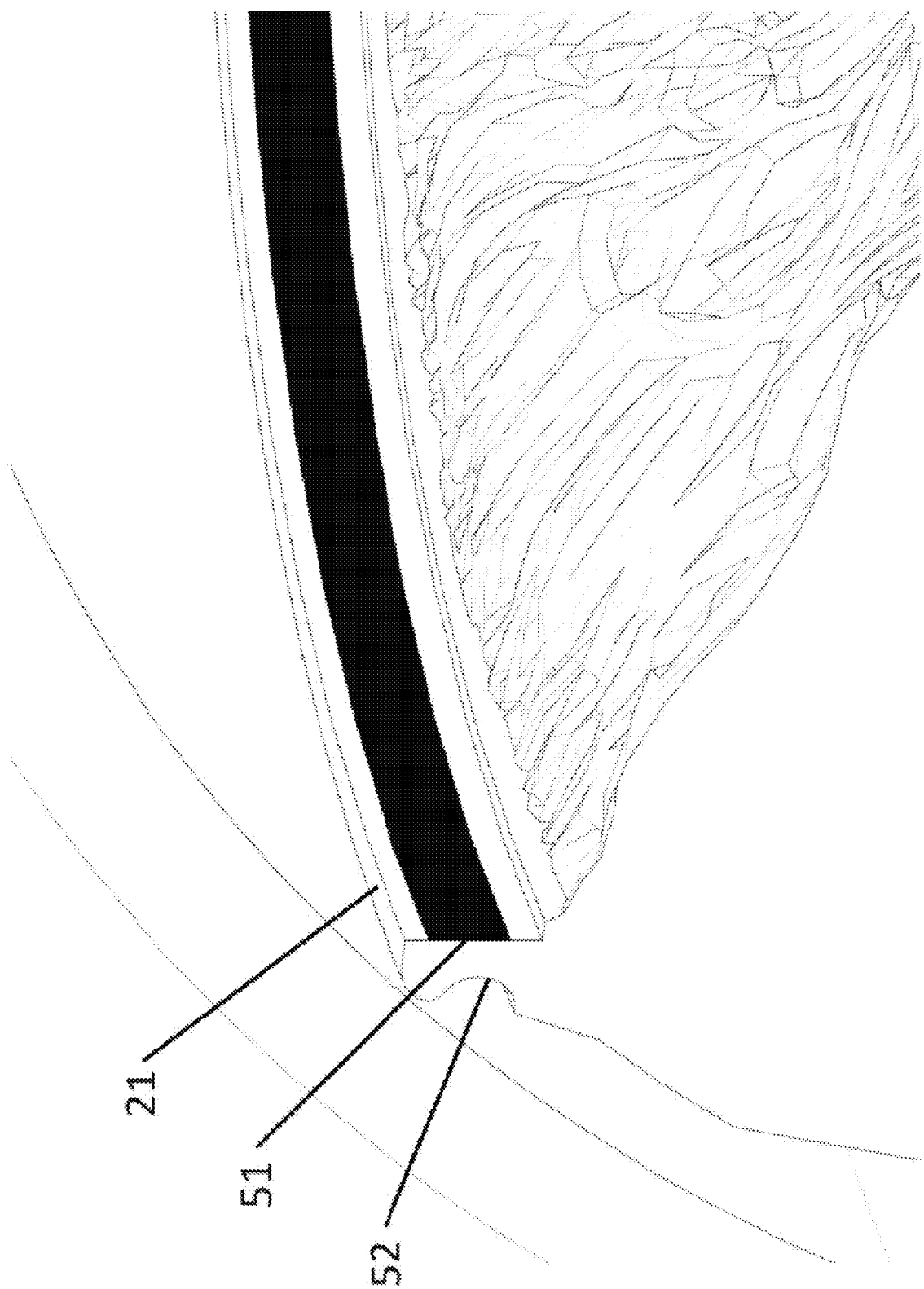
FIGS. 34A-34D are perspective sectional views of the eye model of FIG. 14 that demonstrate how a laser would fire into the TM, the resulting bubbles, and completed excision.
Figure 34B:
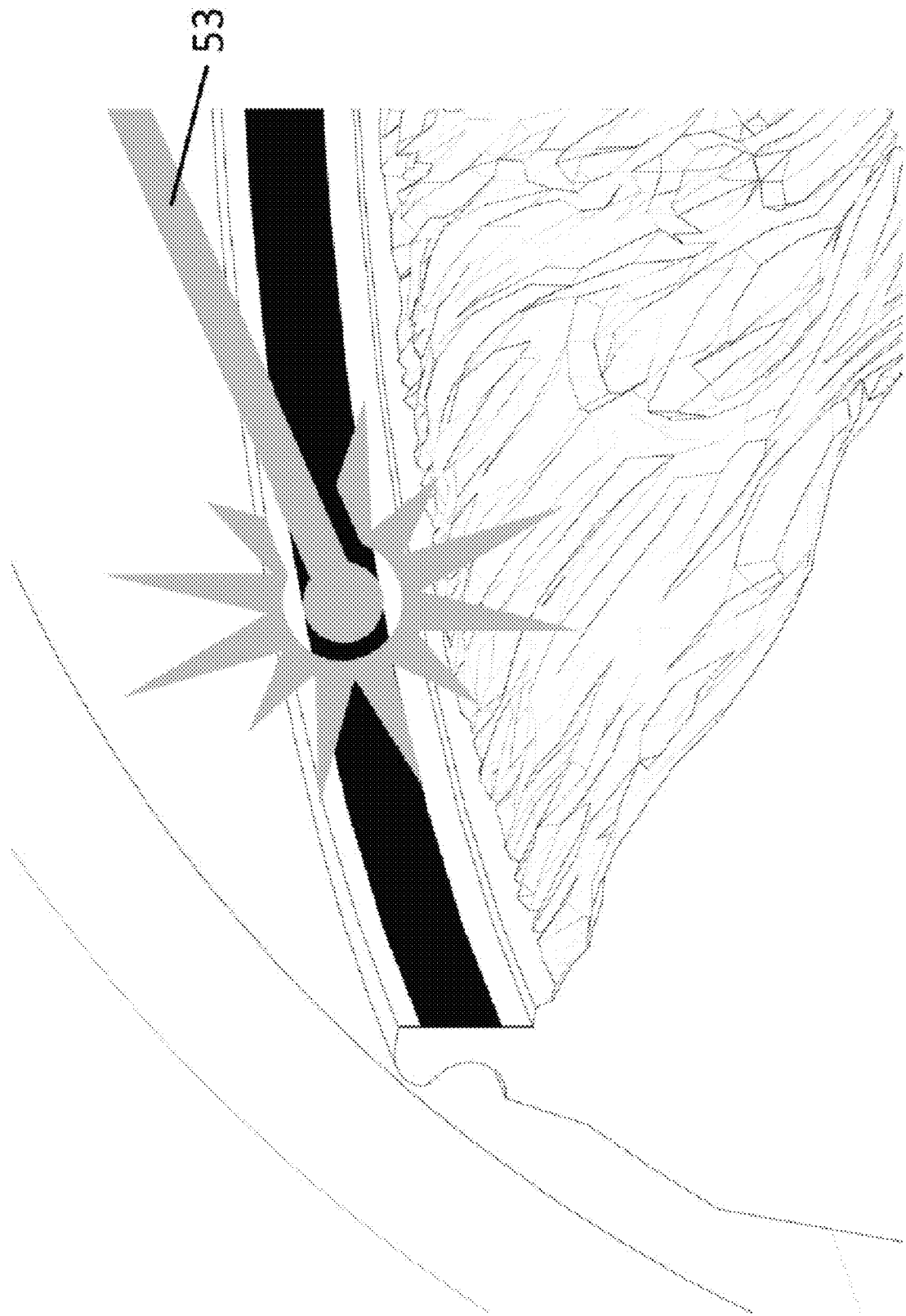
Figure 34C:
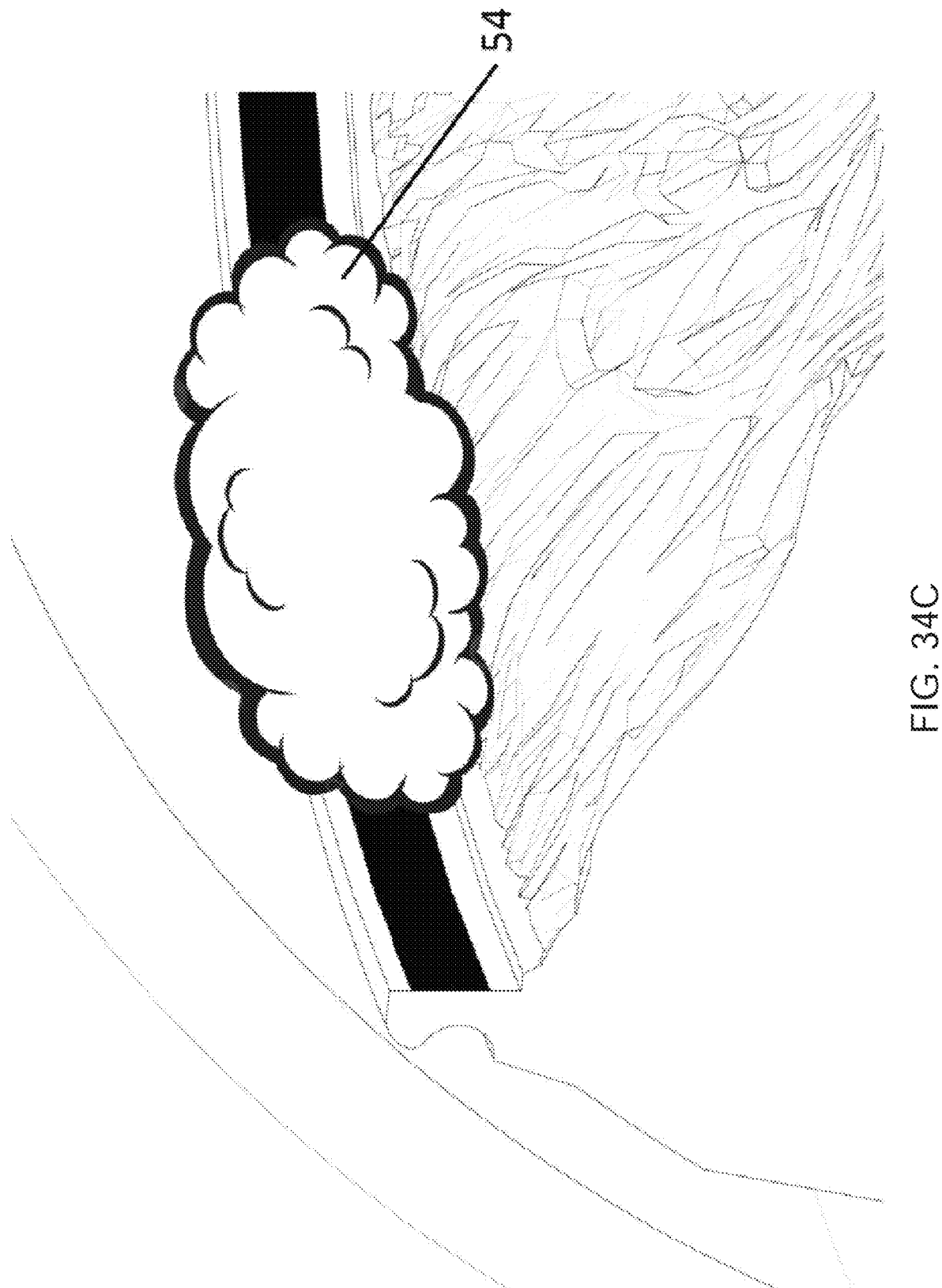
Figure 34D:
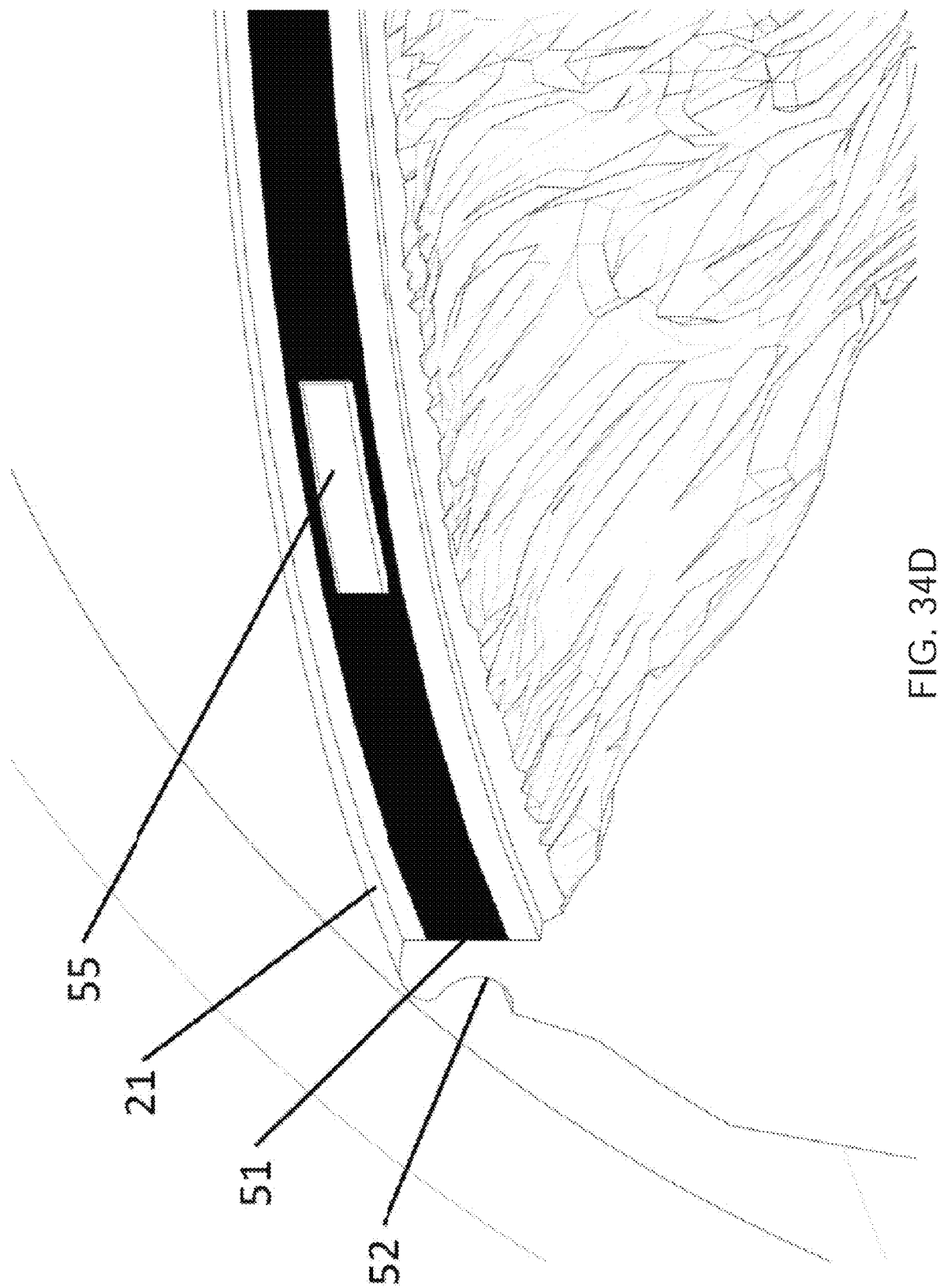

One method of goniotomy includes using a laser system to remove the TM. To begin this surgery, the surgeon can place viscoelastic directly onto the cornea to enhance visualization for the patient interface and gonioprism. The patient interface is the component that makes direct contact with the patient's eye. The gonioprism allows visibility into the iridocorneal angle and contours to the shape of the cornea. A laser is fired into the TM to remove the desired amount of tissue. Bubbles or debris may form during the ablation of the TM. As the eye heals it will absorb the bubbles and filter out the debris. The new opening in the TM now allows for fluid to drain out of the eye reducing IOP. Goniotomy via laser is much less traumatic to the patient as compared to standard invasive surgical methods, leading to faster recovery times. However, this procedure requires advanced laser equipment and specific training, FIGS. 34A-34D are perspective sectional views of the eye model of FIG. 14 to demonstrate a laser treatment on a simulated eye. FIG. 34A demonstrates how a rim structure (#21) can represent the iridocorneal angle with a coating as the trabecular meshwork (#51) and a Schlemm's canal in the back of the structure (#52). FIG. 34A shows an intact simulated TM prior to treatment. FIG. 34B demonstrates how a laser (#53) can fire on the trabecular meshwork coating (#51). FIG. 34C demonstrates the bubble cloud (#54) that appears upon firing of the laser may obfuscate visualization of the target. In actual surgery, these bubbles are eventually absorbed by the eye over time but with a simulated eye they remain in place and need to be actively eliminated via the bubble management system described herein. Once bubbles have been eliminated from the AC, a hole in the TM (#55) is visible as demonstrated in FIG. 34D. Note that the TM hole in FIG. 34D is rectangular in shape, which is to demonstrate that a laser system may be able to ablate a hole in any shape and size that the system is designed to create and is not limited to simple circular punctures.

Goniotomy via laser does not require a corneal incision and viscoelastic injection through the cornea. Therefore, the AC remains sealed and the eye's natural aqueous humor maintains the cornea's shape in surgery.

In simulated surgery of goniotomy via laser, eyes from cadavers or animal substitutes are typically used, and a fluid filled AC that maintains its shape is paramount. Having fluid in the AC is critical for visualization with the gonioprism, critical for the laser to be refracted properly to its target, and provides realism of tactile feedback.

A simulated eye needs to be used multiple times during training which is where bubble management becomes important. If bubbles are not removed from the anterior chamber, then they can impair the gonio view, interrupt laser paths, or other impairments that prevent reuse. One way to manage bubbles is by penetrating the cornea or surrounding tissue with a needle to suck out bubbles, but that deviates from the actual surgical procedure which is non-invasive. This could also cause leakage and the inability of the cornea to hold its shape. Bubble management without piercing the cornea or surrounding tissue is extremely beneficial.

A simulated eye may also be used as a go/no-go gage for a laser system to test functionality. If the laser system is able to create a proper excision in the simulated TM then there is evidence that the equipment works; if a TM excision is not created properly then there is evidence that the equipment is not functioning properly.

Inlet/Outlet Ports

Figure 4B:
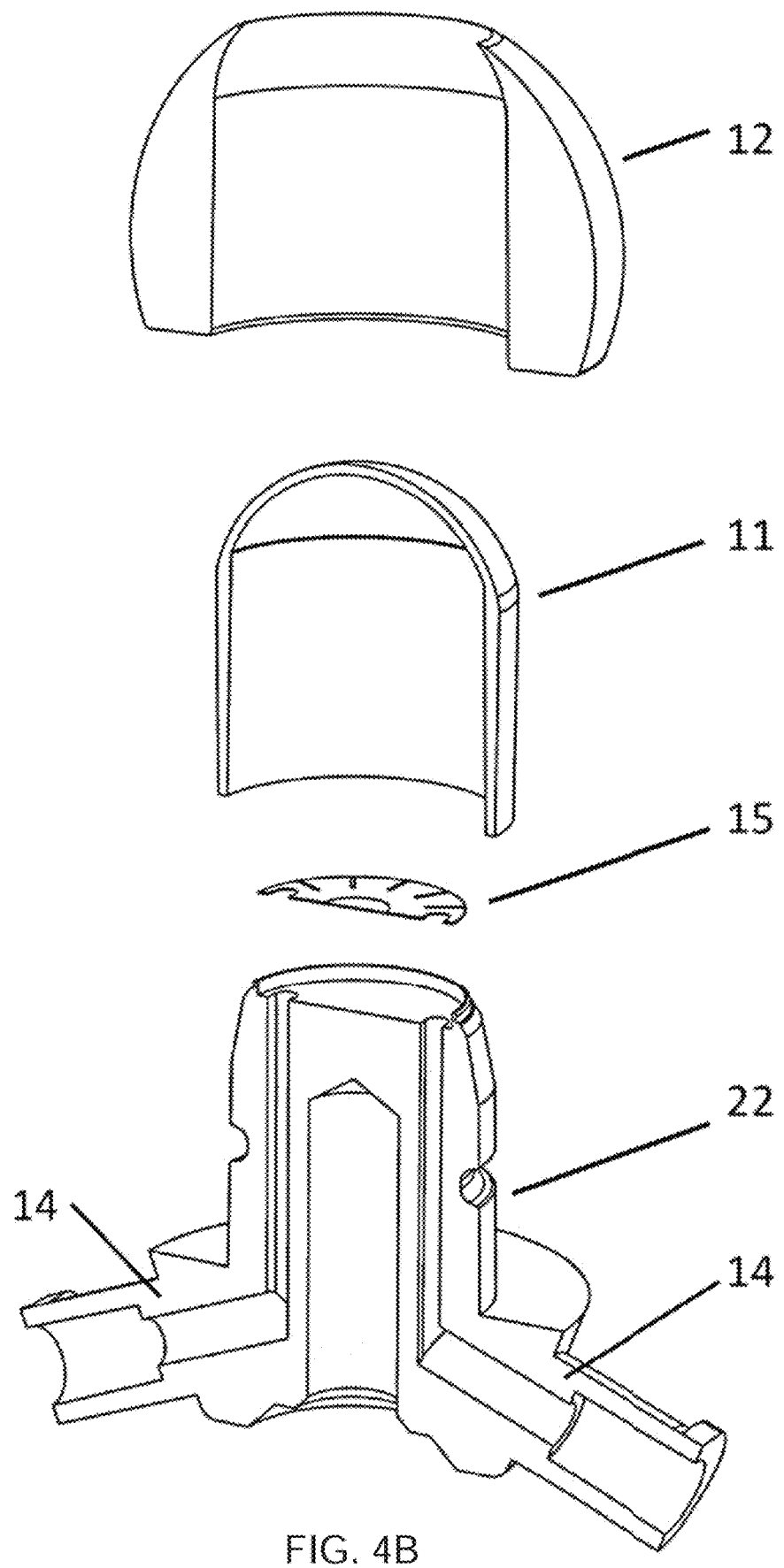
FIG. 4B is an exploded cutaway perspective view thereof.
Figure 5:
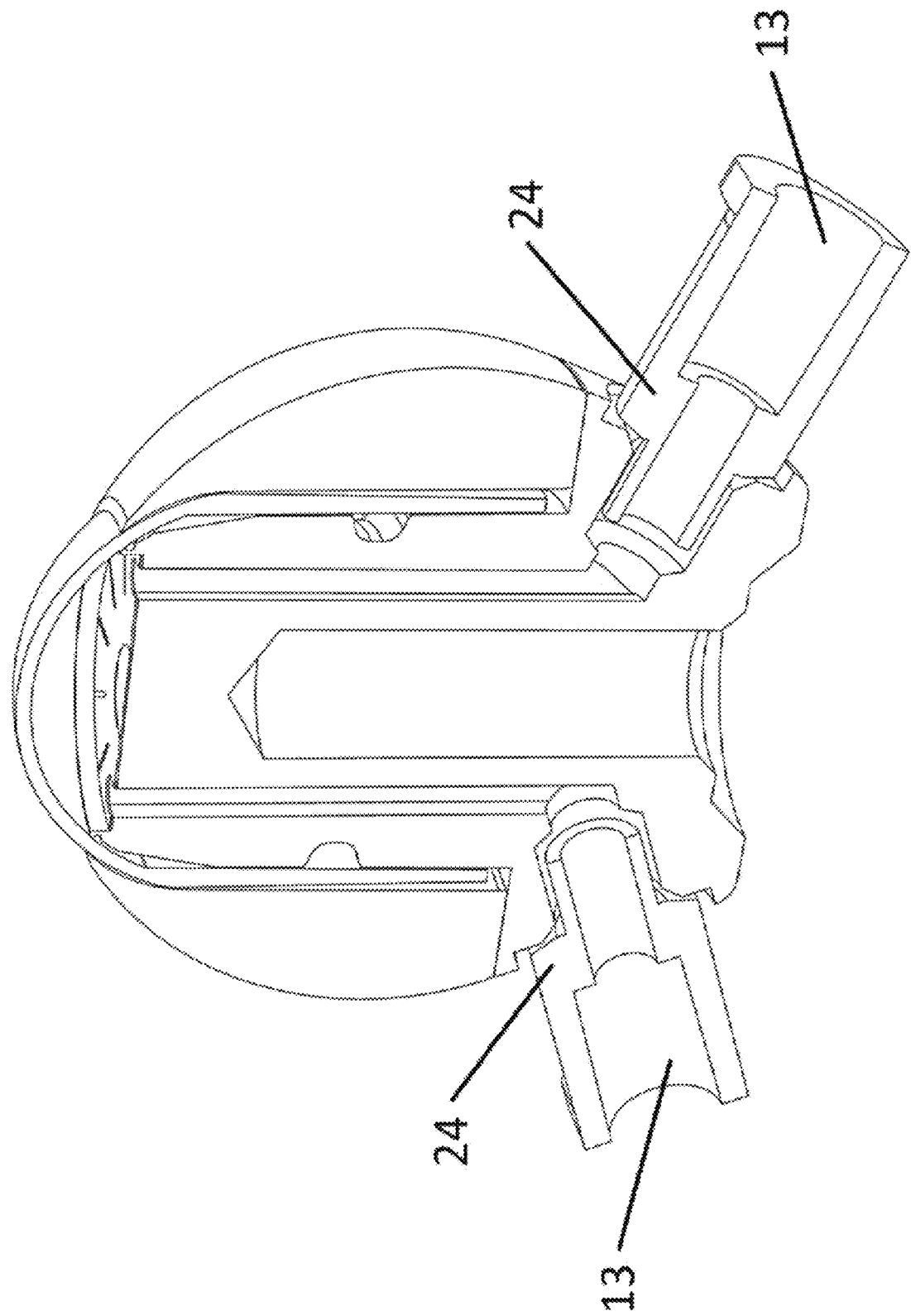
FIG. 5 is a cross-sectional view of the eye model having attachable luer connectors.
Figure 9:
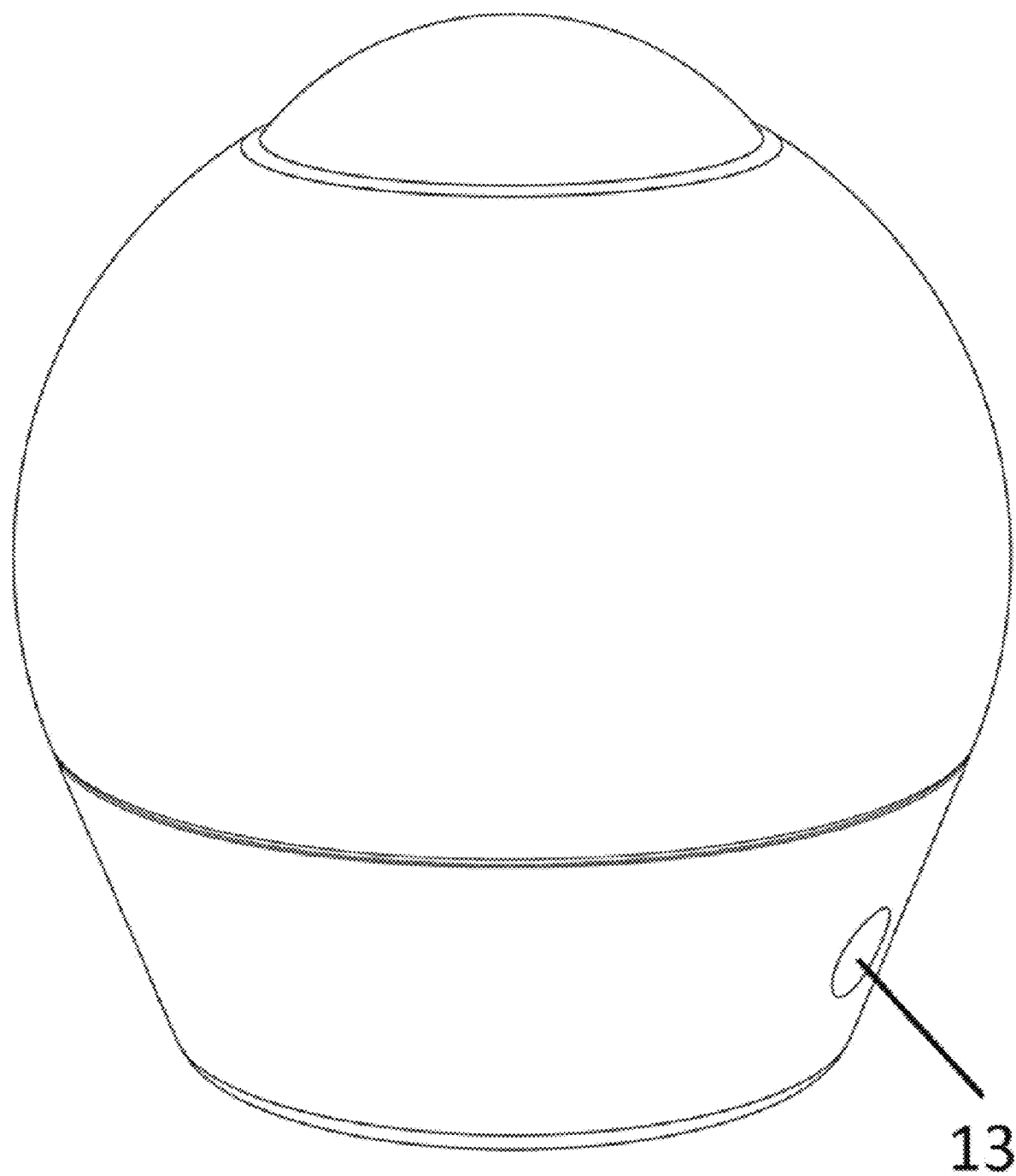
FIG. 9 is a perspective view of one eye model having a hole for pipe or tube fittings.
Figure 10:
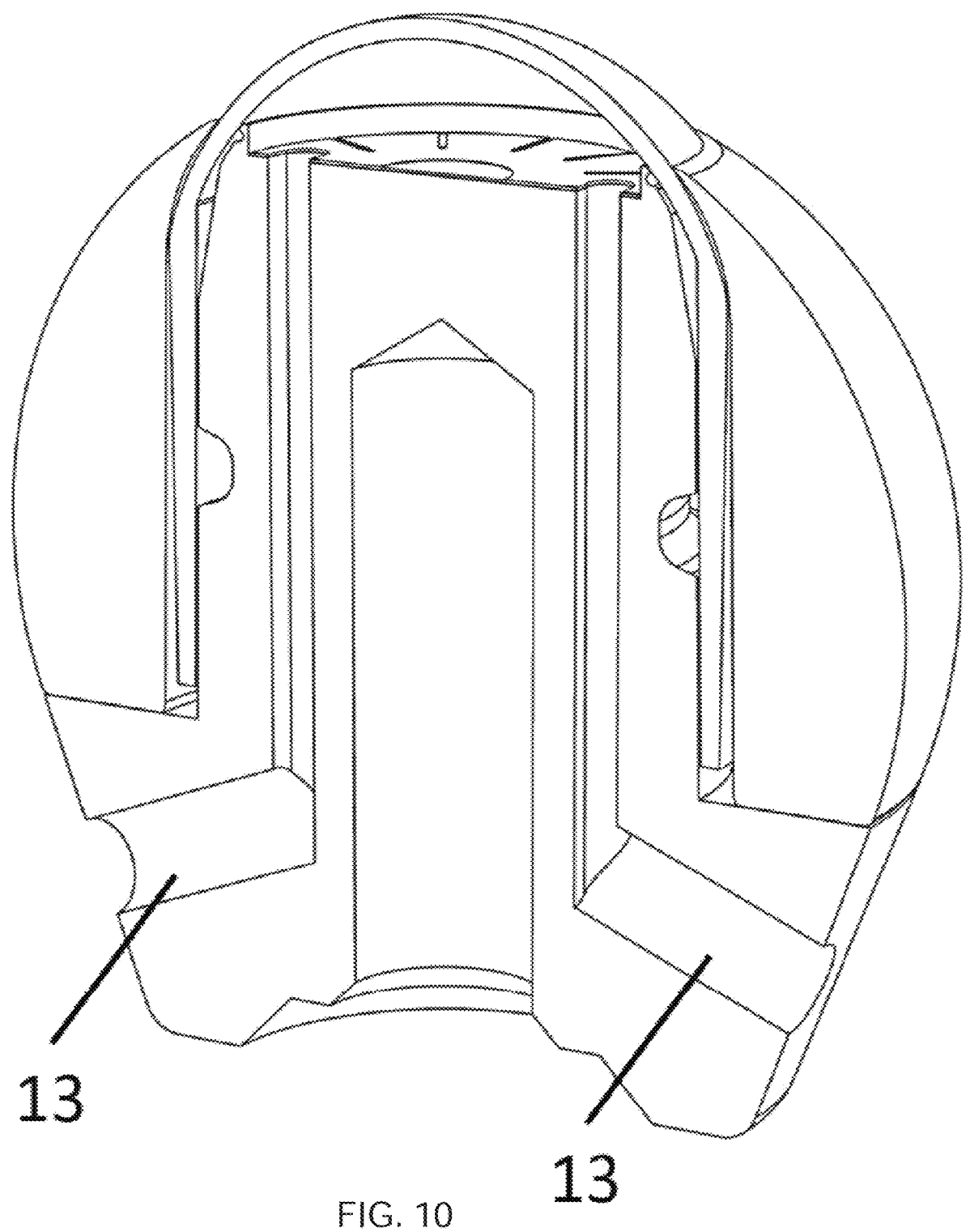
FIG. 10 is a sectional view thereof.

One proposed design has inlet/outlet ports (FIG. 3A, #13) at the bottom sides of the eye model attached to the core. These ports can be fitted with a standard luer connection (#14), or be a hole for pipe or tube fittings (#13 in FIGS. 9 and 10). These luer connections can be attached to the core or can be manufactured as part of the core itself. FIG. 4B shows a cross section with luer connectors (#14) as part of the core (#22), and FIG. 5 shows attachable luer connectors (#24) that can be separate from the core. This instance of the inlet/outlet system is symmetric so that either side can be used as the inlet or outlet.

One-way valves can be connected to the luer fittings to define the direction of the inlet and outlet fluid path and prevent backflow. Flow valves can also be connected to the luer fittings to maintain a filled AC as well as the desired pressure. Consider FIGS. 19-21 which demonstrate a combination bubble reservoir and inlet/outlet system. The one-way valve used as an example in FIGS. 19-21 (#30) is a push button exit. In its relaxed state it seals the port and when the end of the valve is pressed it unseals to allow fluid to exit in one direction. FIG. 3B shows the fluid path of the standard inlet/outlet system. Without a one-way valve the water can flow in either direction through the eye. The addition of a one-way valve would result in single directional flow as the exit is fixed as shown in FIG. 21. In this instance, a one-way valve (#30) is used in conjunction with a bubble reservoir (#37) which allows bubbles to be captured within the eye during use while the one-way valve keeps the fluid contained. FIG. 21 demonstrates that the eye should be held upside down while purging the bubbles since they will all float to the direction of fluid flow.

Figure 3A:
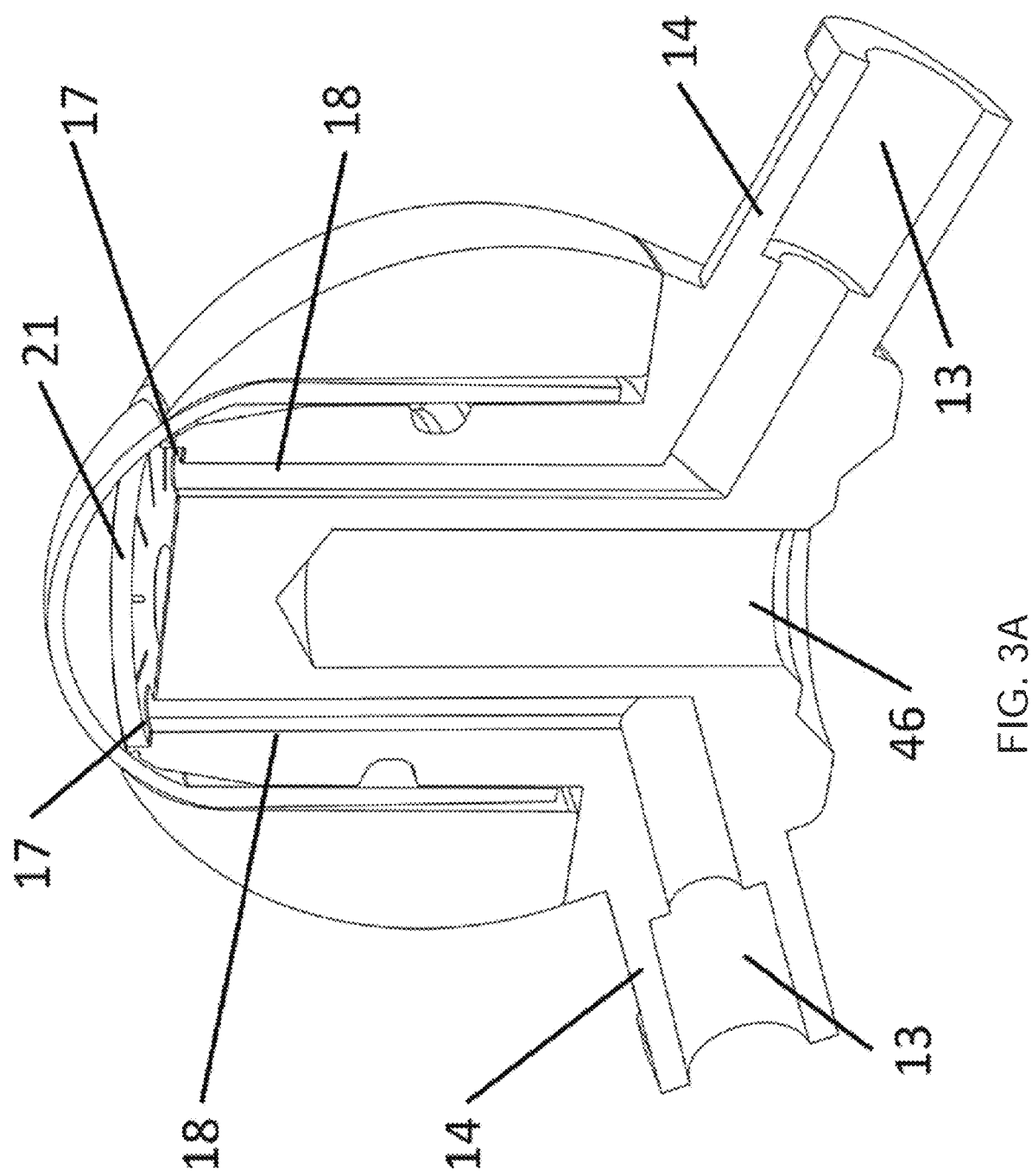
FIG. 3A is a cross-sectional view of the eye model showing internal flow channels.
Figure 3B:
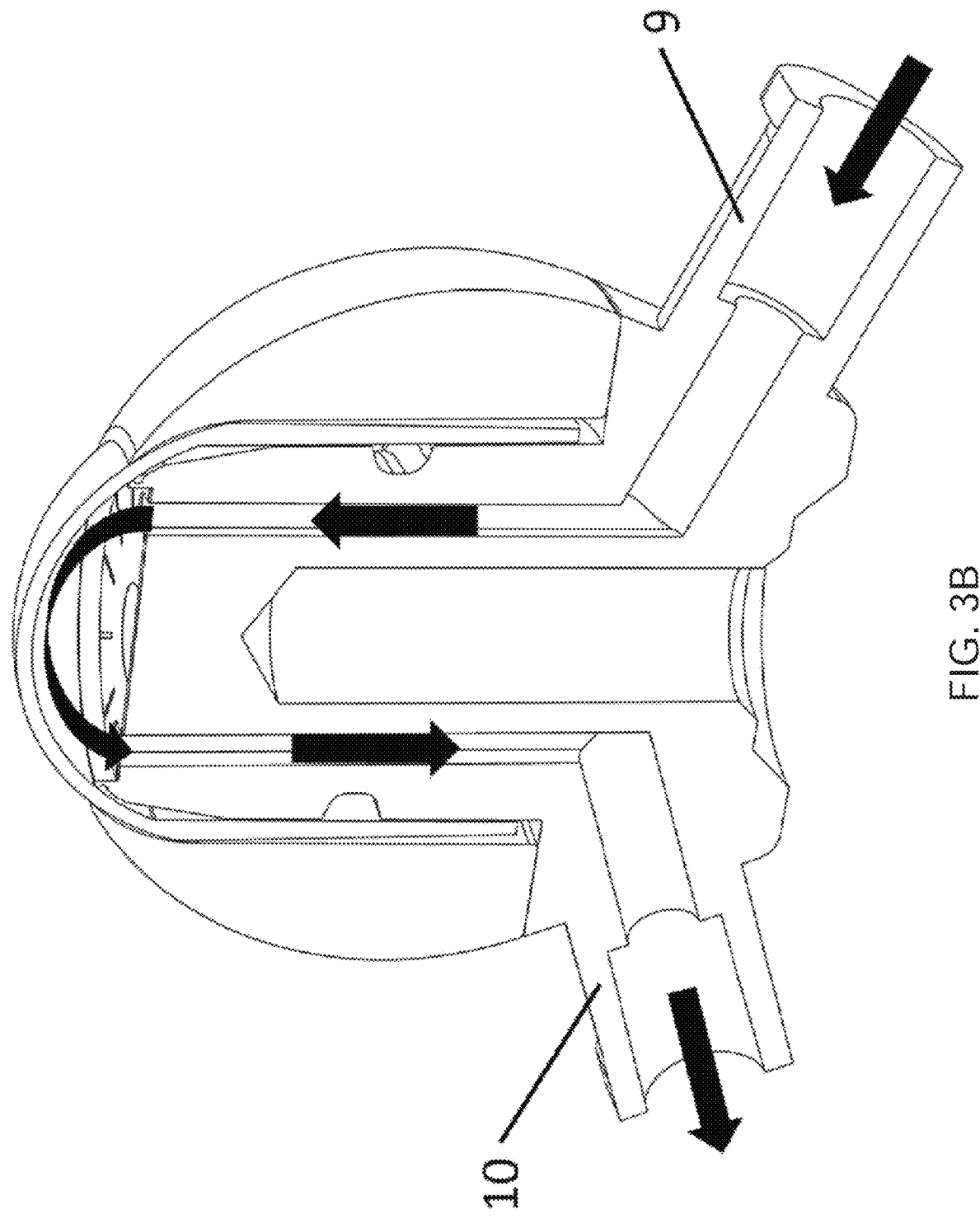
FIG. 3B is the same view with fluid circulation arrows.
Figure 4A:
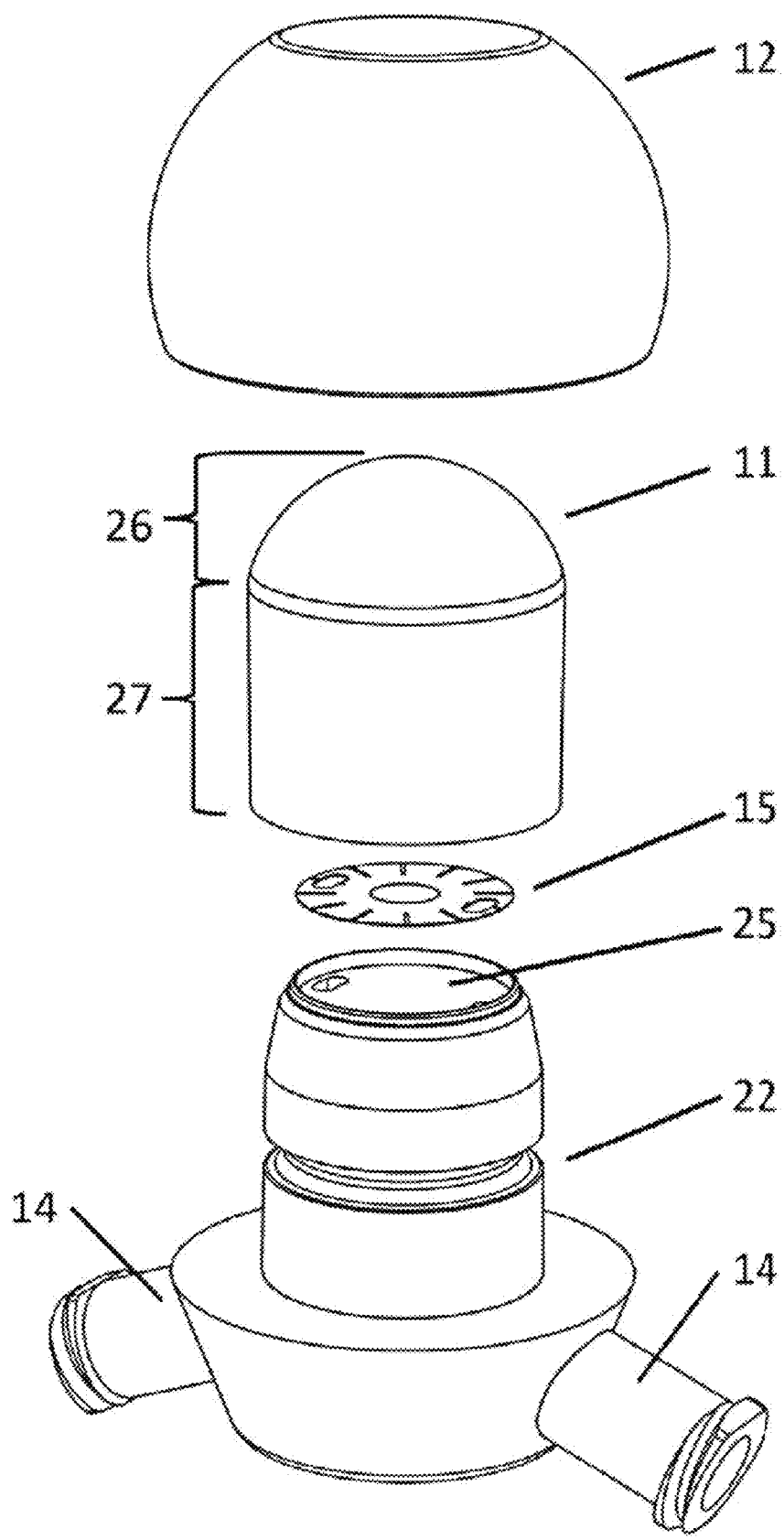
FIG. 4A is an exploded perspective view of the exemplary eye model.

FIG. 4A shows an exploded view of FIG. 3A. FIG. 4B shows a cross-section of FIG. 4A to better identify the individual components. The scleral dome (#12) simulates the soft outside white part of the eye. The corneal dome (#11) where the curved top section of the dome simulates the cornea (#26) and the cylindrical section is an extended lower portion to aid in structural integrity and modularity (#27). The corneal dome (#11) is flexible in nature and fixed to the core to make a water tight seal. Certain of the eye models described herein are distinct from competitors' models due to the corneal dome (#11) being attached to the lower core (#22). Some competitors attach their cornea over the anterior chamber, while others only simulate an anterior chamber without having a core at all.

Figure 1:
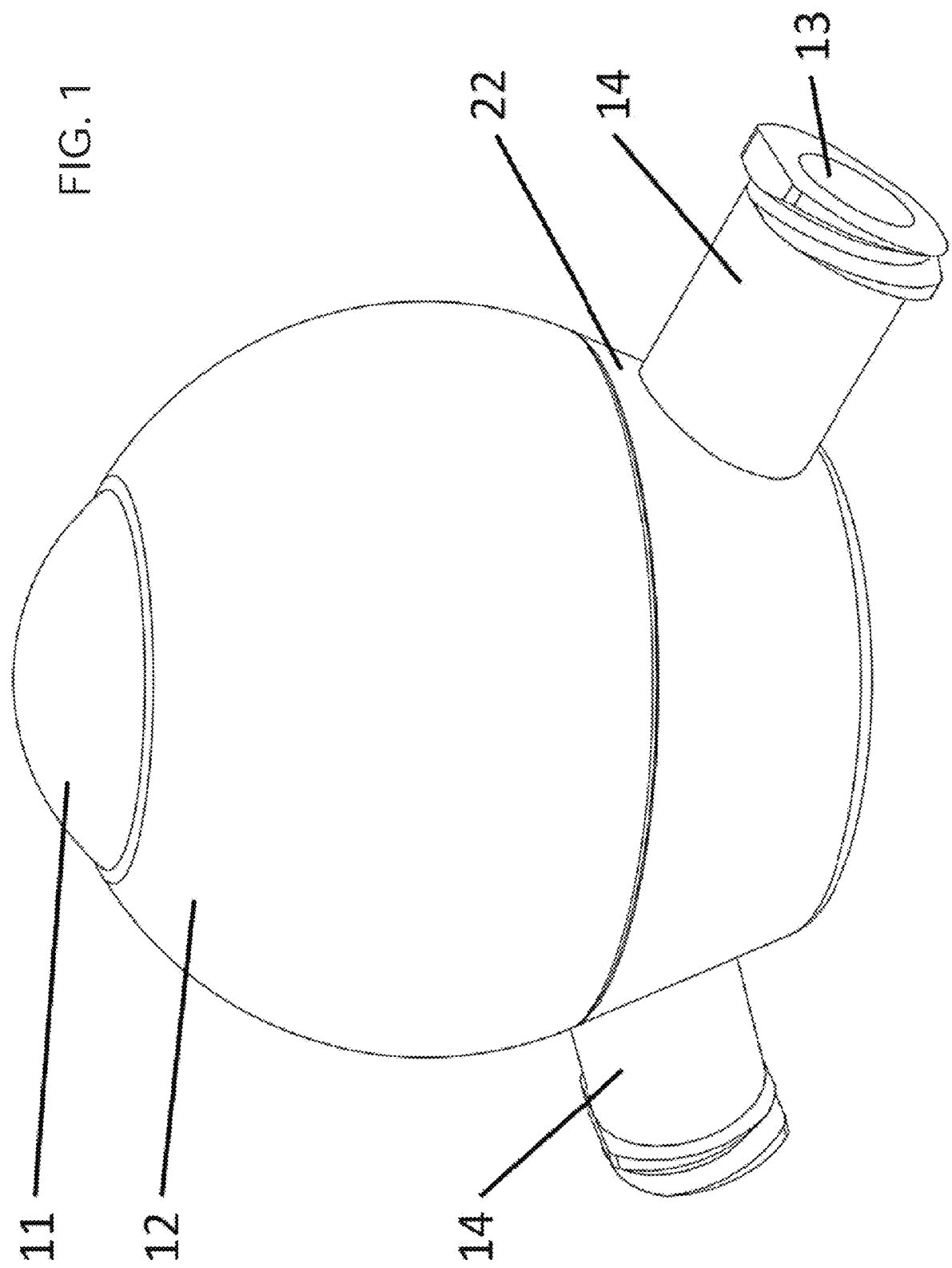
FIG. 1 is a perspective view of an eye model of the present application.
Figure 2A:
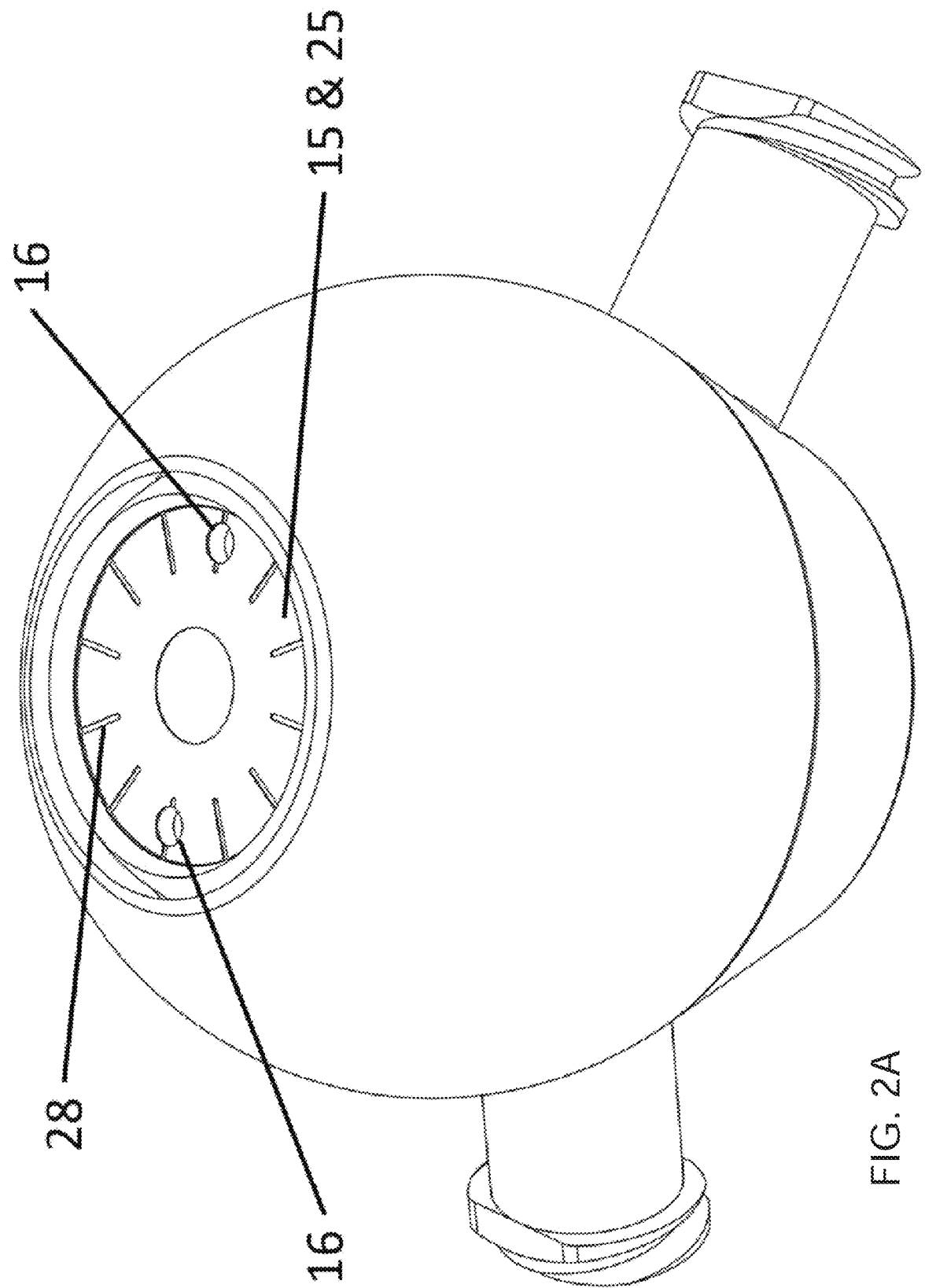
FIG. 2A is a perspective view of the eye model with a corneal dome removed to expose an iris/pupil surface having inlet and outlet ports.

The cosmetic iris simulates the iris (in this case, as a sticker) (#15) with additional clock hour markings (FIG. 2A, #28) to help give the surgeon bearing. The cosmetic iris (#15) is attached to the top of the core (#22), specifically at the iris/pupil floor (#25) with cutouts that allow for flow through the iris holes (#17) unobstructed. The lower core (#22) is the rigid center of the design to provide structural integrity to the eye while the outer components provide the realistic tissue properties. The rigid core contains the internal flow channels (#18), inlet/outlet ports (#13), optional luer locks (#14 or #24).

Note the modularity approach in the design of these eye models for bubble management. The bubble evacuation concept (FIG. 4B) and the bubble reservoir concept (FIG. 30) are both designed to utilize components independent of bubble management without modification: the corneal dome (#11) and scleral dome (#12).

A major purpose of the inlet/outlet system in the eye model is to fill the AC with fluid and maintain the structure of the cornea. The cornea shape must conform to the gonioprism for proper visualization. Since the AC is a sealed environment, the user has the ability to maintain IOP, as well as increase pressure to simulate higher IOP.

The fluid in the AC is critical for the visibility of the angle, and keeping this fluid clear is vital for a successful surgical simulation. Any bubbles or particles may impair visualization for locating the TM or interfere with the procedure itself. Having inlet/outlet ports help facilitate removal of debris and bubbles resulting from laser ablation inside the AC. Evacuating these obstructions quickly and easily allows for multiple uses on the simulated eye.

Fluid Channels and Iris Holes

Fluid enters via an inlet (FIG. 3A, #13), travels through an internal flow channel (#18), into the AC via an iris hole (#17), out the AC via another iris hole (#17), though another internal flow channel (#18), and exits from the outlet (#13).

Figure 2B:
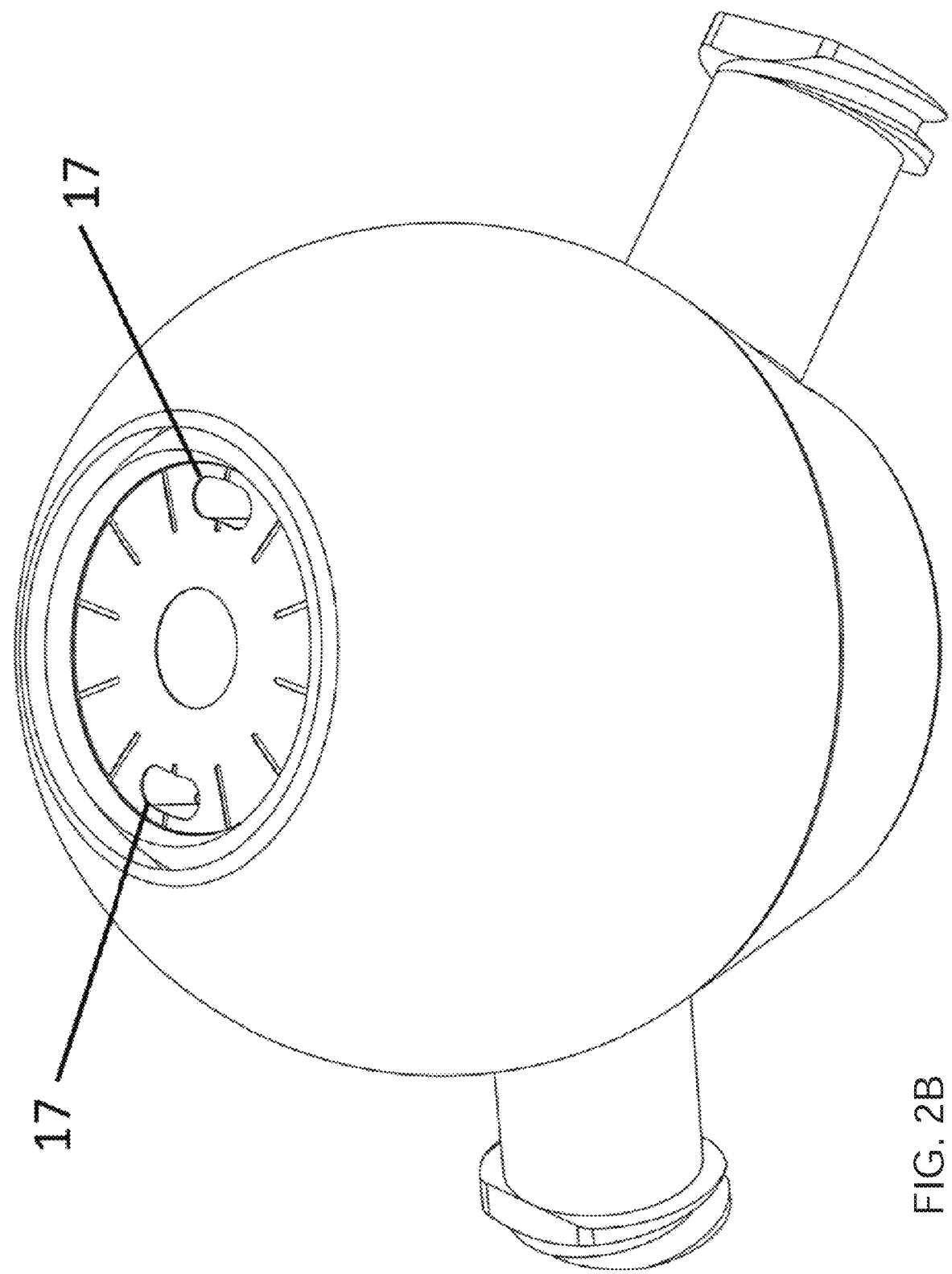
FIG. 2B is the same view showing alternatively shaped ports.

The entry/exit of the fluid to the AC is through iris holes (FIG. 3A, #17) located on the iris/pupil plane (FIG. 4A, #25). There can be as few as one entry and one exit hole, or multiple. The iris hole can vary in shape and size. Some examples of iris hole variation include: standard circular holes (FIG. 2A, #16), irregular shapes such as kidney bean (FIG. 2B, #17), half-moon, or slots. Irregular shapes can be useful for maximizing fluid flow in a small and confined system.

Fluid is transferred from the inlet/outlet port to the AC via fluid channels. (FIG. 3A, #18). Variations to the fluid channels can include different cross-sectional areas, as well as a change in cross-sectional area over the length of the channel. Some examples of a changing cross-sectional area of the fluid channels include: increasing or decreasing area, transition from circle to polygon, or having a funnel shape at the fluid entrance and or exit.

Bubble and/or Particulates Evacuation System

The application in FIG. 3A presents a simulated eye training tool which uses an inlet/outlet fluid system to fill the AC. The inlet/outlet fluid system may be comprised of: inlet/outlet ports (#13), internal flow channels (#18), iris holes (#17), and built in luer connectors (#14) which connect the inlet/outlet ports to external fluid transport. This application also presents various simulations of TM than can be excised with laser procedures. FIG. 3A demonstrates a rigid TM wall (#21).

Figure 11:
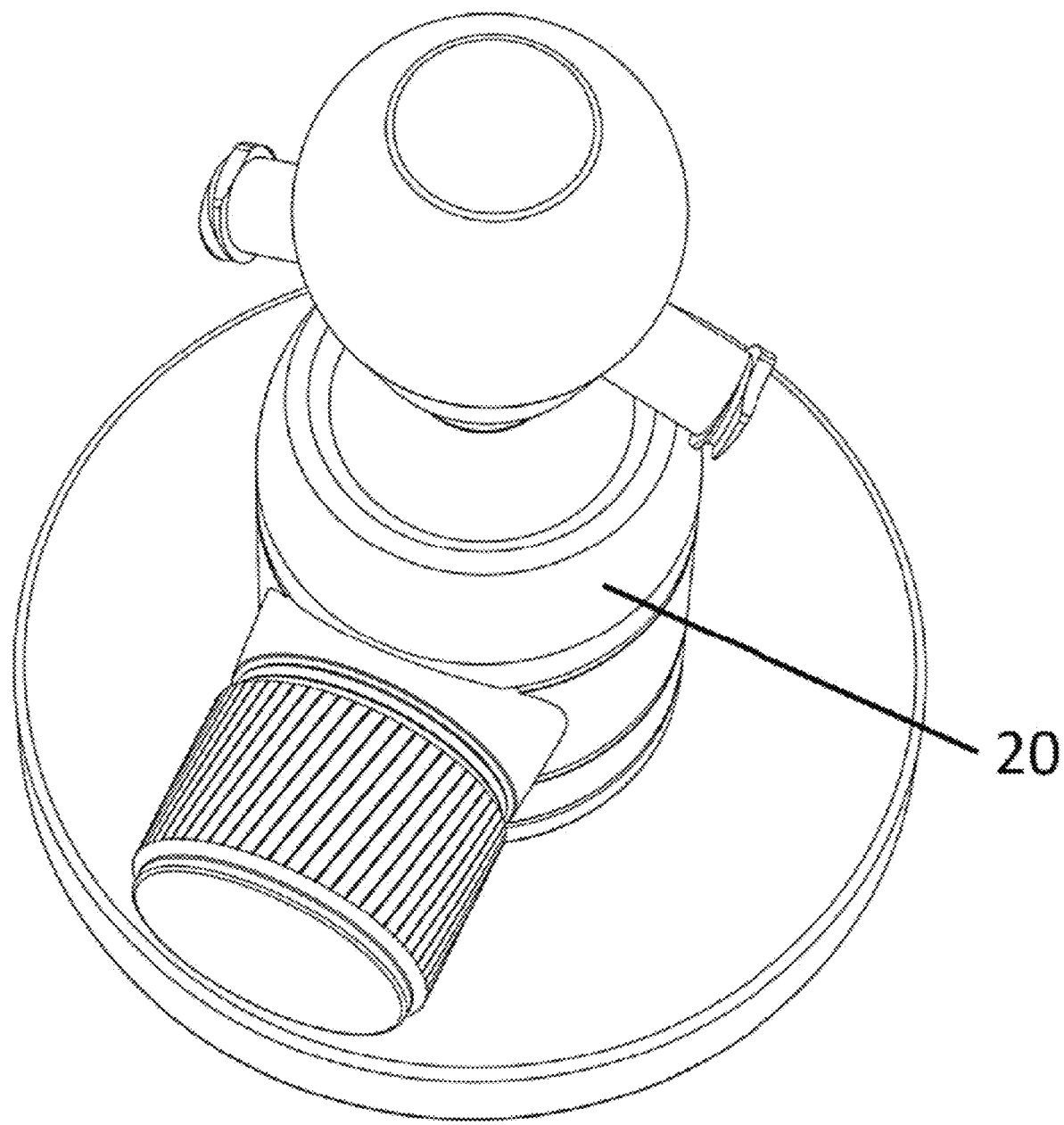
FIG. 11 is a perspective view of an eye model prototype held on a mounting stand.
Figure 12:
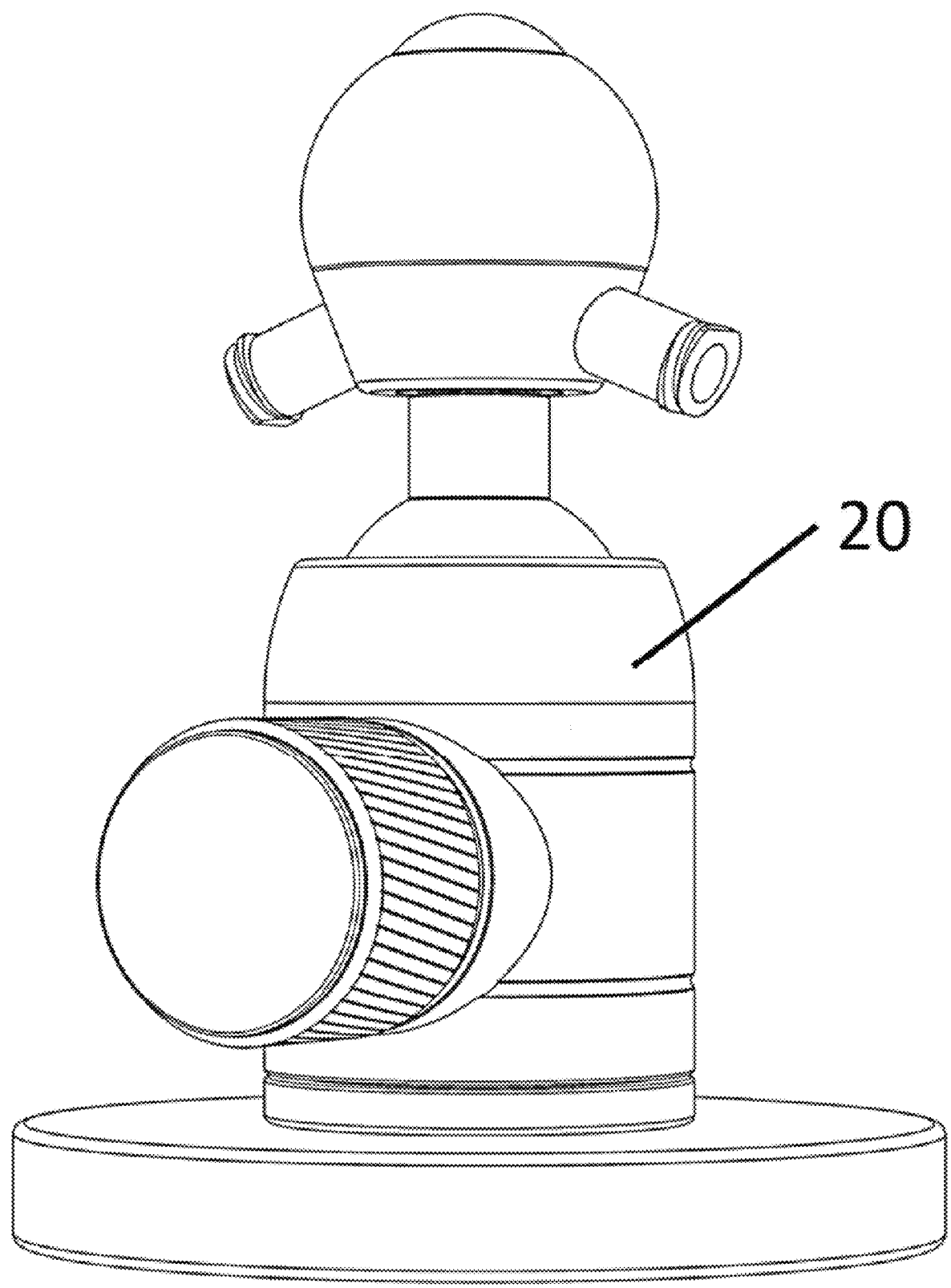
FIG. 12 is an elevational view of an eye model prototype held on a mounting stand.
Figure 13:
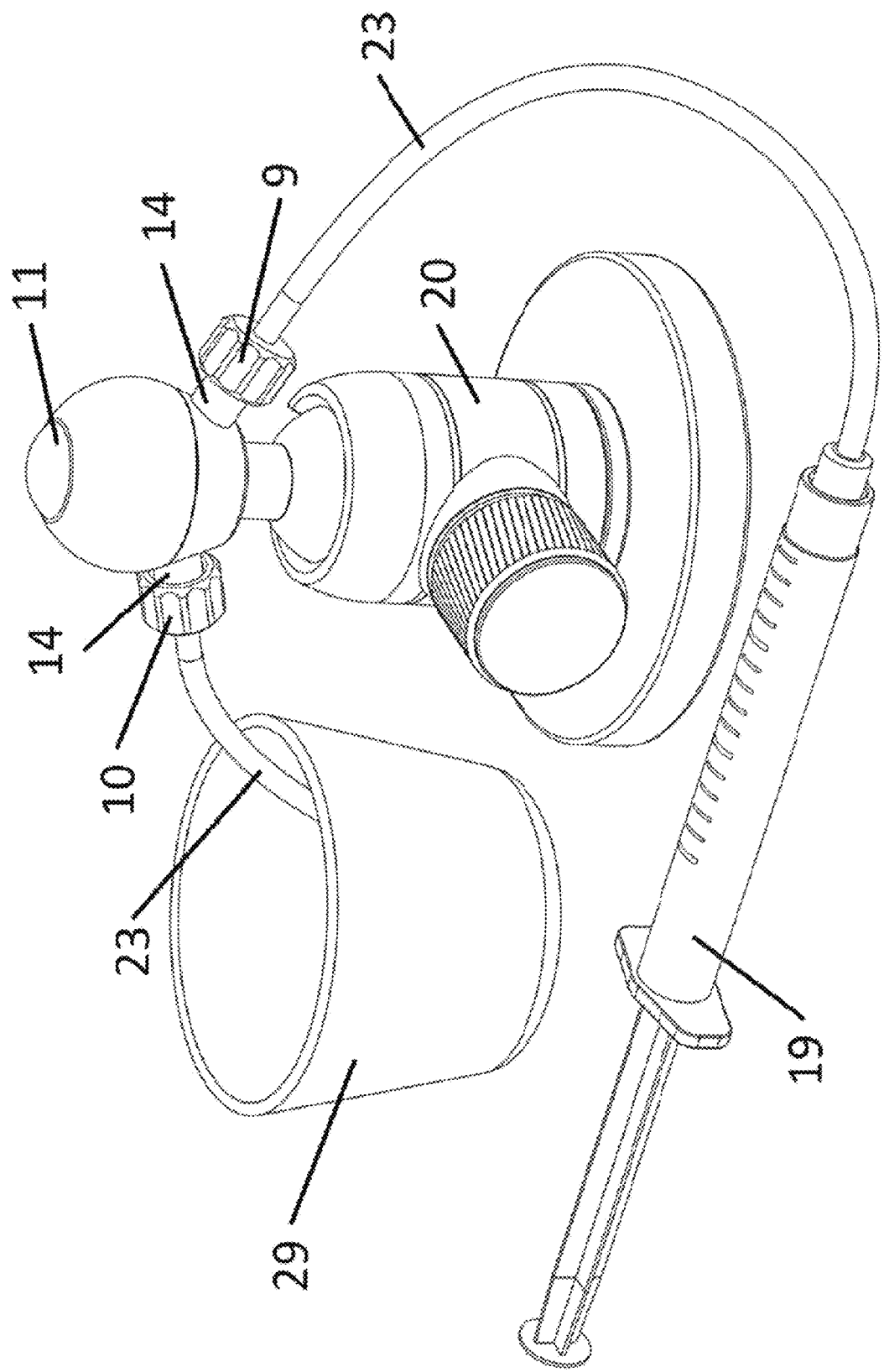
FIG. 13 is a perspective view of an eye model prototype on a mounting stand and connected to a fluid source and drain.

There are 2 ports (FIG. 3A, #13) added to the bottom of the eye model; an inlet and an outlet. The eye can have a threaded mounting dock (#46) to secure it to a base (#20) shown from two perspectives in FIG. 11 and FIG. 12. A functional setup for this eye is demonstrated in FIG. 13 which includes additional components: a syringe (#19), a water basin (#29), and tubing (#23) which is secured to the eye via luer fittings (#14). The syringe (#19) pushes fluid (e.g., water or viscoelastic, saline, etc.) through tubing (#23) to the inlet (#9) where the fluid travels through an internal flow channel (FIG. 3A, #18), out an iris hole (#17), into and through the anterior chamber flushing out all inside it, including bubble and/or particulates. Then it goes out the other iris hole (#17), through the other internal flow channel (#18), to the outlet (FIG. 13, #10) where tubing (#23) carries it to a water basin (#29) for disposal. FIG. 3B demonstrates the direction of flow with arrows. The inlet/outlet are interchangeable until a fluid injector, in this case a syringe (FIG. 13, #19), is attached when then defines the direction of flow. Any bubbles and/or particulates that are present are purged. If bubbles are still present after flushing then the flexible corneal dome (#11) can be pressed like a button which forces the remaining bubbles out.

Bubble Capture

Figure 15A:
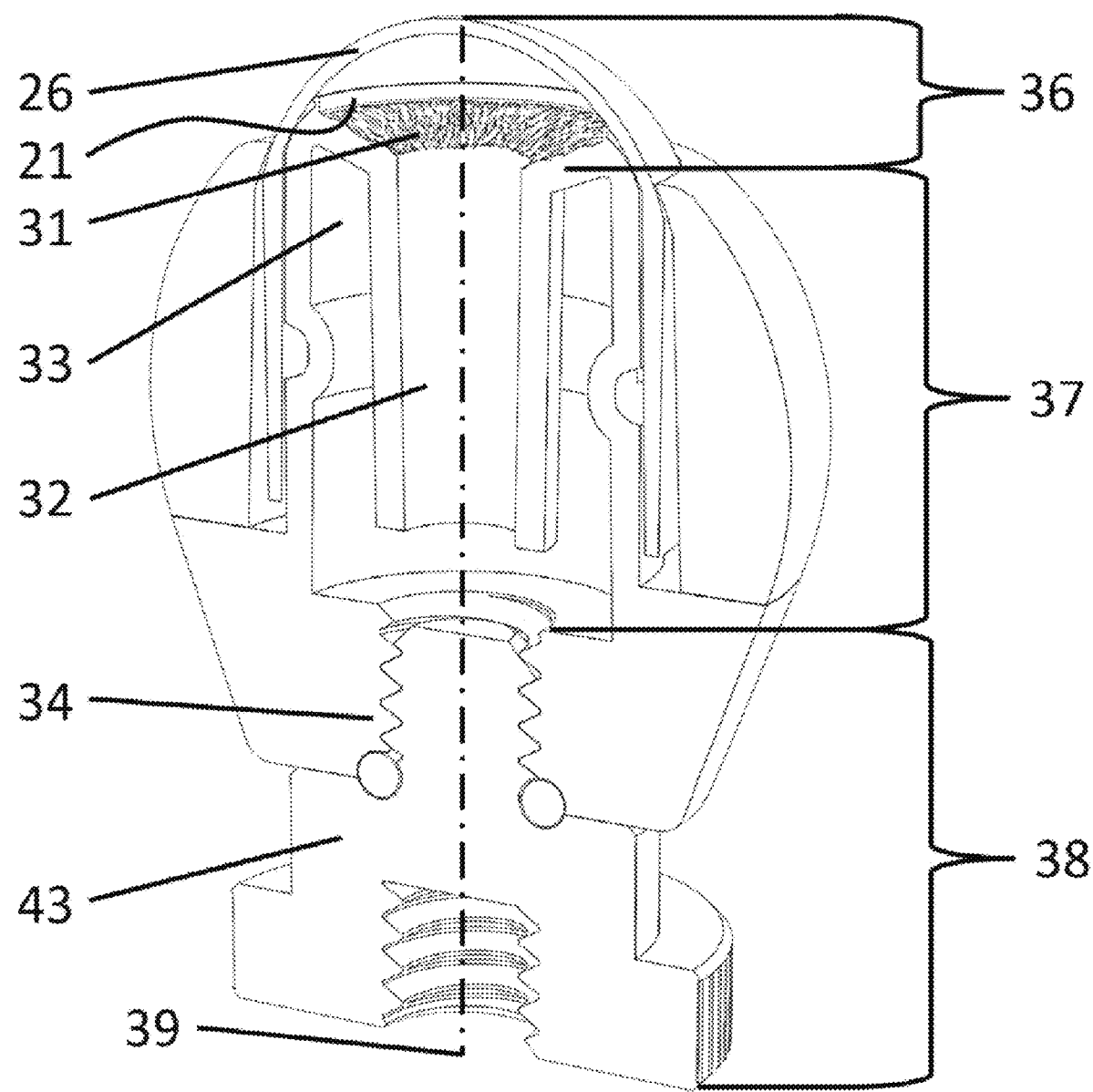
FIG. 15A is a cross-sectional view of the eye model of FIG. 14 with a centerline and part identification.
Figure 15B:
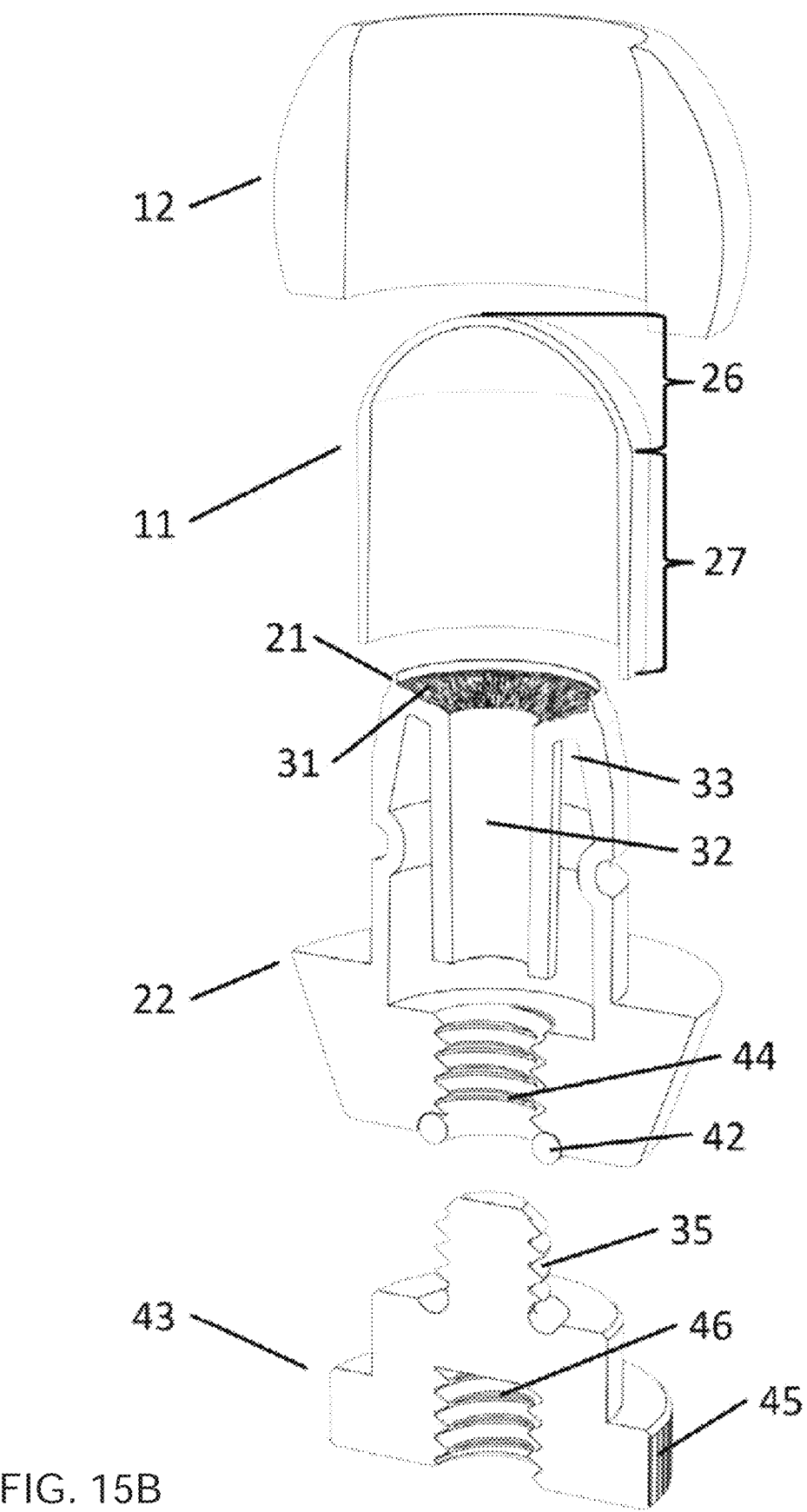
FIG. 15B is an exploded cross-sectional view which gives an alternative visualization of the components and features thereof.

FIGS. 15A and 15B identify a bubble reservoir in conjunction with a simulated eye, oriented right-side up (bubbles rise towards cornea) and comprised of various sections. Section 36 identifies the simulated anterior chamber which consists of: the domed flexible cornea (#26), a TM ridge (#21), and a simulated iris (#31) defined by a floor of the anterior chamber. Section 37 identifies the bubble reservoir that sits under the anterior chamber and within the envelope of an eye. Section 37 is comprised of the capture tube (#32) and the bubble chamber (#33). In this instance, the capture tube (#32) is centered and opens at the center of the anterior chamber at the location of a natural pupil. The bubble reservoir (#37), in this case, is axially symmetric about the axis (#39) that goes directly through the center of the capture tube, with the bubble chamber (#33) concentrically surrounding the tube.

Section 38 identifies the refill system, including an opening where water can be added/removed/sealed, and is comprised of a water port (#34) which is sealed by a port cover (#43); in the illustrated embodiment having a threaded boss received by the port (#34). The iris (#31) can be slanted inward to encourage the flow of bubbles into the capture tube (#32) when the eye is inverted (See FIGS. 16 & 16A-16H for bubble flow path). The slanted iris can be represented by a 3D texture (FIG. 15A, #31) or, alternatively, as a smooth surface (see FIG. 17, #40), both of which may be colored to depict a natural iris. Inverting and then slowly rotating the eye model upright again causes the buoyant bubbles to coalesce at the top of the bubble chamber (#33). After bubbles are captured at the top of the bubble chamber (see FIG. 16H) the capture tube (#32) acts as a barrier to block the buoyant bubbles from traveling back to the anterior chamber. The refill system (#38) allows water to be added/removed which is shown in greater detail in FIG. 18. The iris (#31), the bubble chamber (#33), the capture tube (#32), and the water port (#34) are all shown in FIGS. 15A and 15B as features of the core (#22). These features can also be made as separate components for manufacturing.

Figure 18:
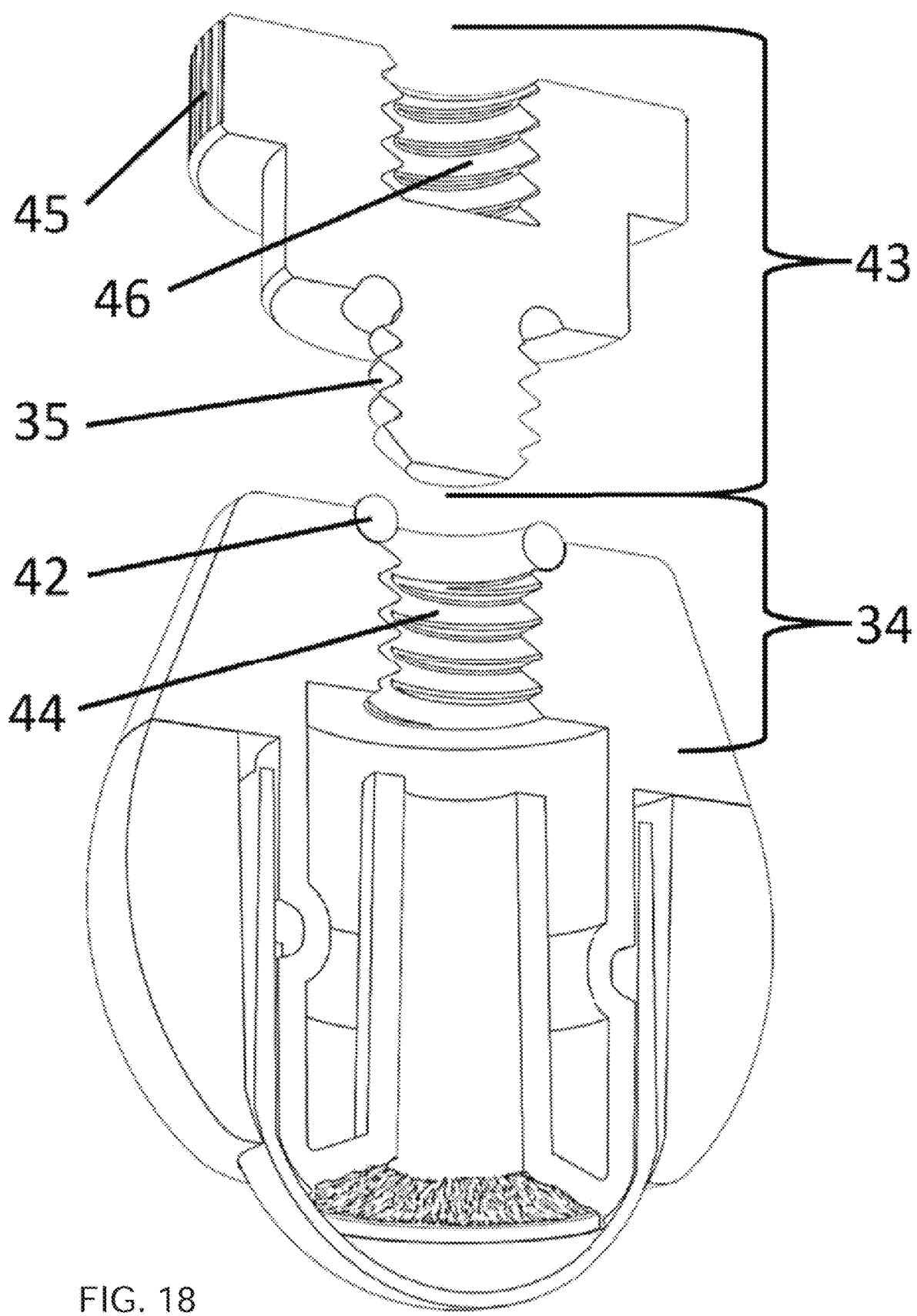
FIG. 18 is a cross-sectional inverted view of the eye model of FIG. 14 with a water port opened for refill.

FIG. 18 displays the refill system in greater detail and fully open. A water port (#34) allows water to be added/removed; it is comprised of a port guide (#44) which mechanically guides and aligns the port cover (#43) and an O-ring (#42) which seals the fluid in the system. The port cover (#43) is a component that contains the following features: a sealing surface (#35), a ribbed or knurled seal opener (#45), and an optional threaded mounting dock (#46). The interaction between the O-ring (#34) and sealing surface (#35) seals/unseals the water port to add/remove water via an interference fit, which is represented here by a screw for mechanical attachment. The sealing surface (#35) is attached to the seal opener (#45), which is represented here by a thumbscrew so that the port cover (#43) can be operated by hand. The port cover (#43) is hand tightened into the water port (#34) to make the system secure. Alternatively, the O-ring (#42) could be a part of the port cover (#43) which would then seal against the bottom of the eye.

Figure 39:
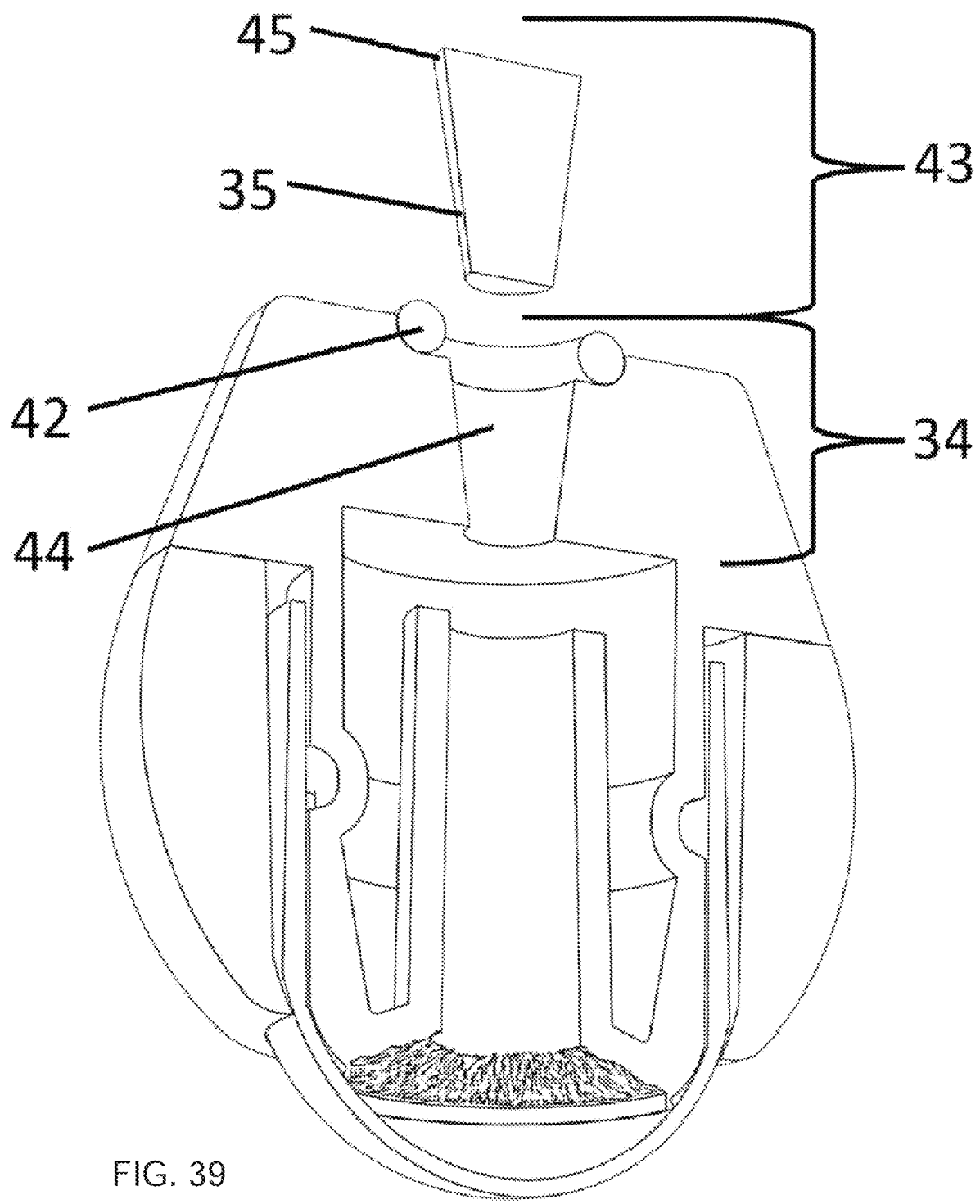
FIG. 39 is an alternative refill system design of the eye model of FIG. 14 that uses a non-threaded shaft to seal the water port.

An alternative design of the refill system (FIG. 39) could utilize a straight or tapered shaft in place of a threaded attachment. The cylindrical/conical walls would act as the port guide (#44) to guide the water port (#43) into place where the O-ring (#42) would seal off against the sealing surface (#35). The end of the shaft could be pulled on to act as the seal opener (#45).

Figure 14:
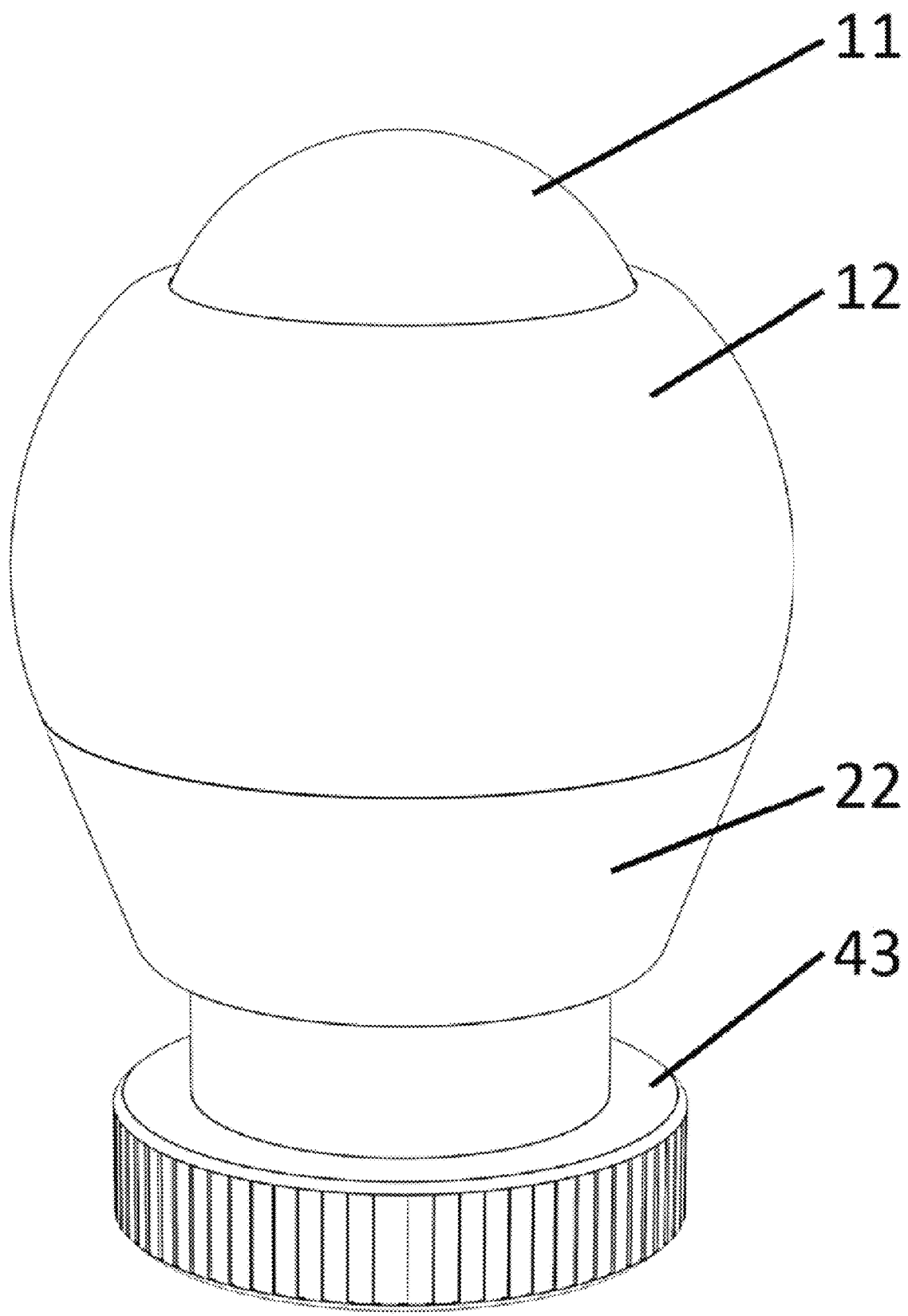
FIG. 14 is a perspective view of an eye model prototype with a 360-degree internal bubble reservoir and single bottom port.
Figure 38:
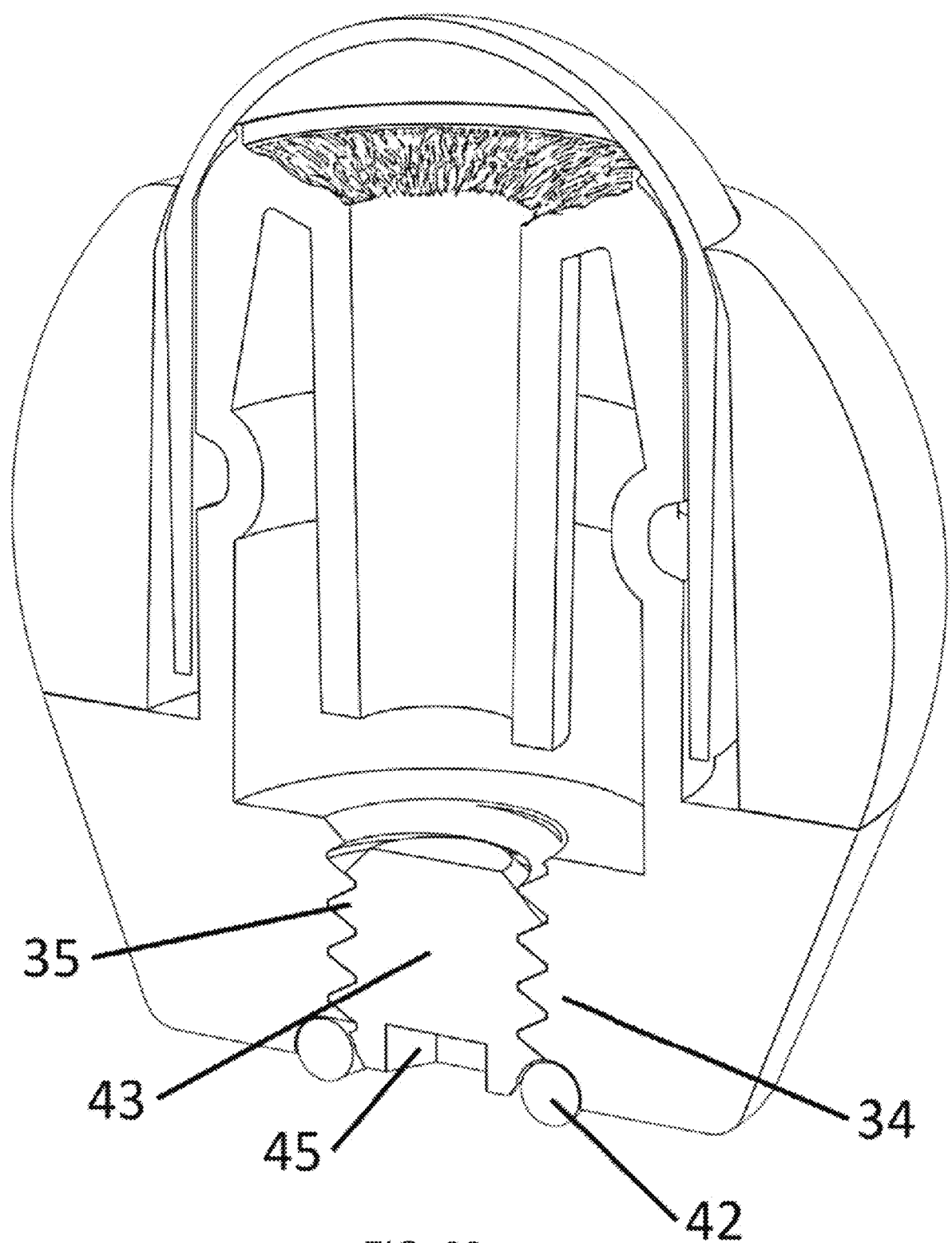
FIG. 38 is a cross-sectional view of the eye model of FIG. 14 where the port cover is a set screw.

FIG. 14 shows what a simulated eye with a bubble reservoir can look like from the outside. FIG. 14 and FIG. 15A demonstrate that there are no external chambers to hold fluid as they are unnecessary. All features necessary for water/bubble containment are designed to fit within the envelope of the eye. The only external component of the system is the lower section of the port cover (#43); formed as a thumbscrew in this instance for ease of refill access. Alternatively, all components can fit within the envelope of the eye as demonstrated in FIG. 38 where the port cover (#43) is a set screw which contains the sealing surface (#35) to seal against the O-ring (#42) and a seal opener (#45), a hex drive in this instance.

To capture unwanted bubbles that may be introduced or develop, the simulated eye adds a bubble reservoir (FIG. 15A, #37) behind the iris. After the laser system is used to ablate the TM and generates bubbles in the anterior chamber, the eye is disconnected from the machine. To clear the bubbles the following actions are taken and identified in FIGS. 16A-16H with circles representing the bubbles. The bubble reservoir has a 360° symmetric design about a vertical axis (FIG. 15A, #39) so that it can be inverted in any direction for ease of use. Of course, axial symmetry is not absolutely required, Step 1 (FIG. 16A) shows the eye in the initial position with bubbles generated in the anterior chamber by the laser. Step 2 (FIG. 16B) inverts the eye so that bubbles float away from the anterior chamber and through the capture tube. By "inverting," the technician rotates the simulated eye 180° about a horizontal axis so that the buoyant bubbles float out of the AC and along the capture tube. Some may stay attached in the anterior chamber so Step 3 (FIG. 16C) dislodges the remaining bubbles by impact, tapping, shaking, and/or pressing on the cornea so that all bubbles float away from the anterior chamber and through the capture tube. Step 4 (FIG. 16D) shows how the bubbles will naturally collect around the water port, outside the end of capture tube.

Step 5 (FIG. 16E) inverts the eye about 90° about a horizontal axis so that the bubbles float away from the opening of the capture tube and towards the side wall, this step should be done in a slow manner to allow the bubbles the time to rise away from the end of the capture tube. A pause of about 5-10 seconds will suffice; the smaller the bubble, the less buoyant it is, and the slower it rises. Step 6 (FIG. 16F) shows the eye returned to its initial position so that the bubbles can float up from the bottom and into the bubble chamber. Step 7 (FIG. 16G) shows how the bubbles will collect at the top of the bubble chamber; the length of the capture tube prevents the bubbles from migrating back into the anterior chamber. Step 8 (FIG. 16H) demonstrates how the bubbles will eventually coalesce together to form a larger bubble ring around the capture tube due to the 360 axially symmetric bubble chamber beneath the iris. The eye is now ready to be used again.

Thus, after full 360° rotation of the eye model about a horizontal axis, bubbles are captured in the bubble chamber and the buoyancy of the bubbles prevents them from traveling back to the anterior chamber. It should be noted that the term "full 360° rotation of the eye model about a horizontal axis" means that the eye model starts upright, is rotated upside-down, and then rotated right side up, not necessarily all in one direction. That is, the 360° rotation can be done all in one rotational direction, or, as should be apparent to the ordinary observer, a rotation of 180° in a first direction, but a second rotation of 180° in a different direction. Once the eye model is inverted so the bubbles are out of the capture tube, they may be urged to travel in any direction by a subsequent rotation.

Figure 16:
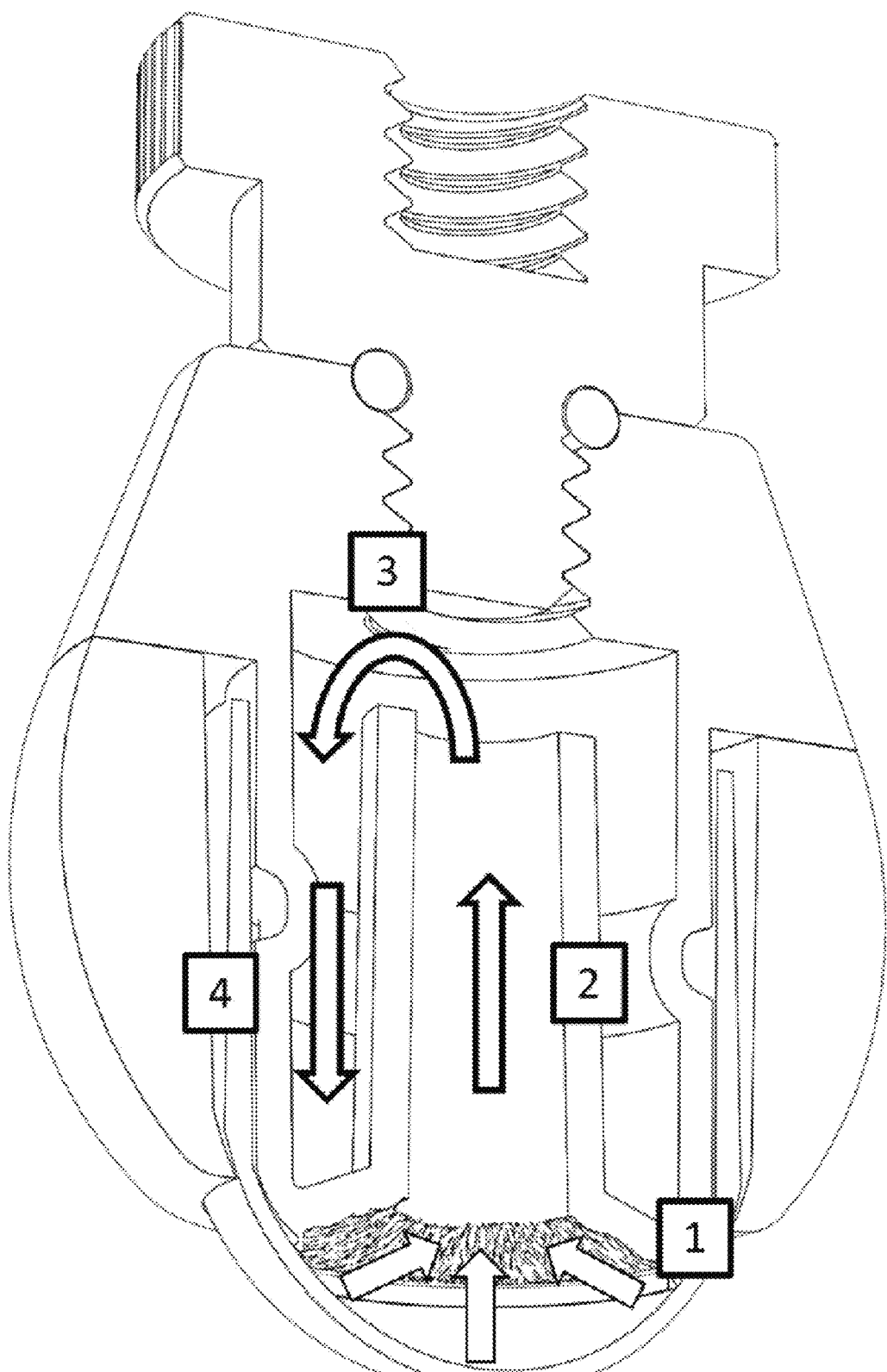
FIG. 16 demonstrates the process of bubble management inside the eye model of FIG. 14.
Figure 16A:
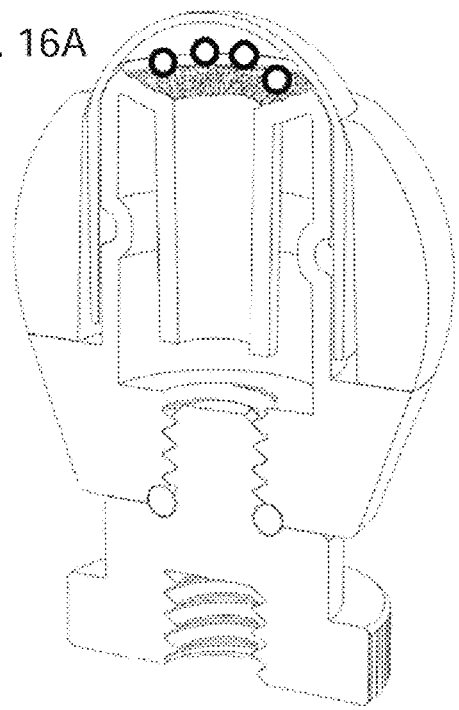
FIG. 16A-16H are views that demonstrate an alternative explanation for the bubble management process of FIG. 16.
Figure 16B:
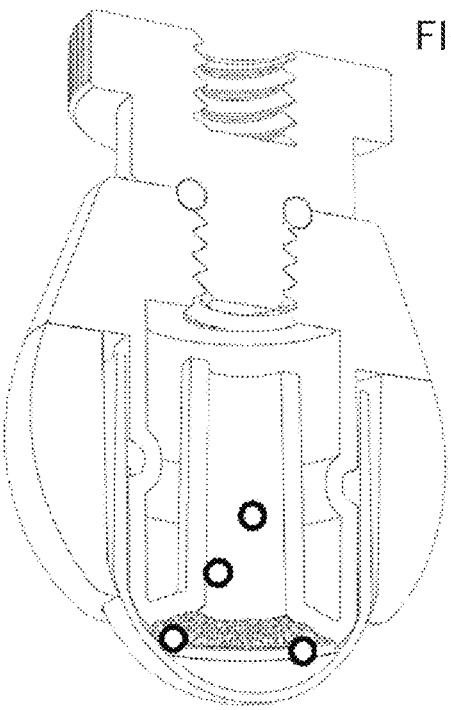
Figure 16C:
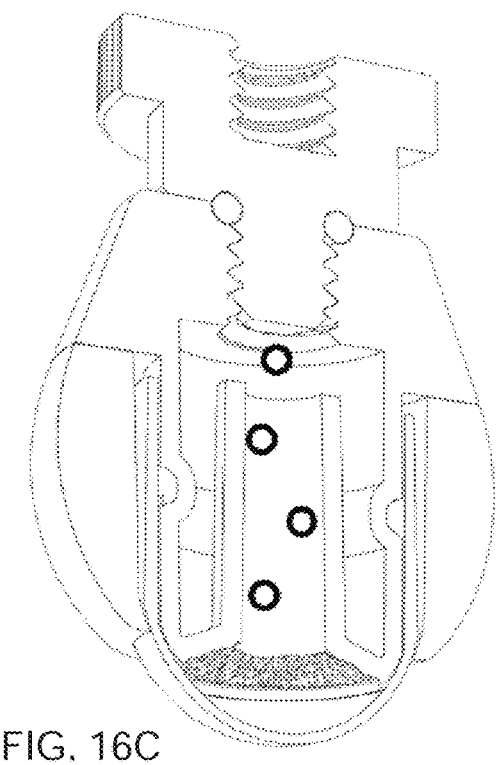
Figure 16D:
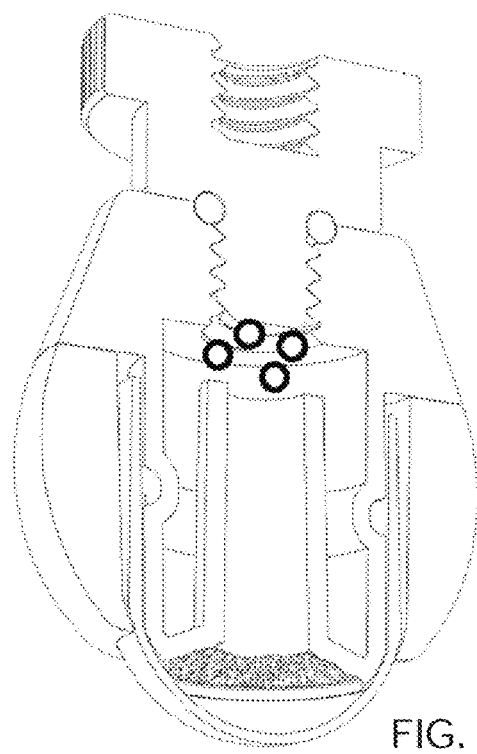
Figure 16E:
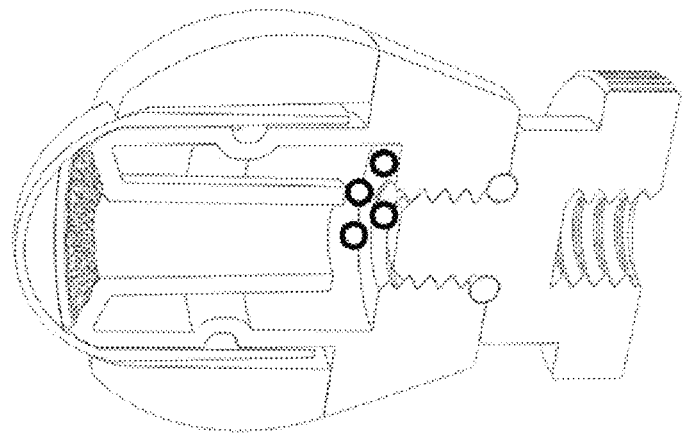
Figure 16F:
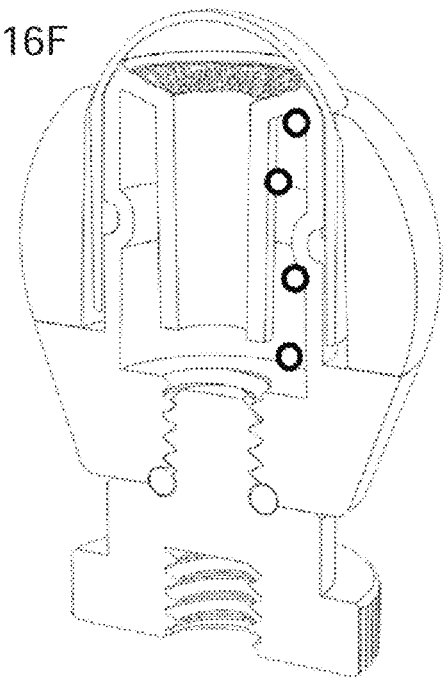
Figure 16G:
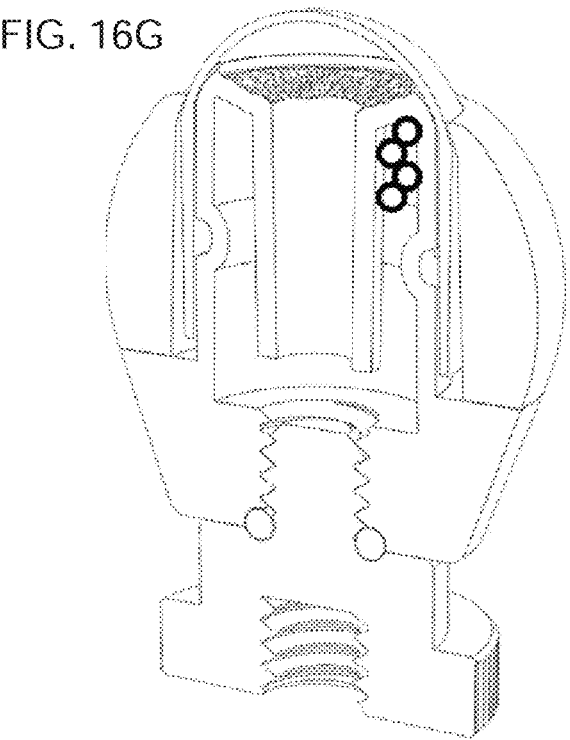
Figure 16H:
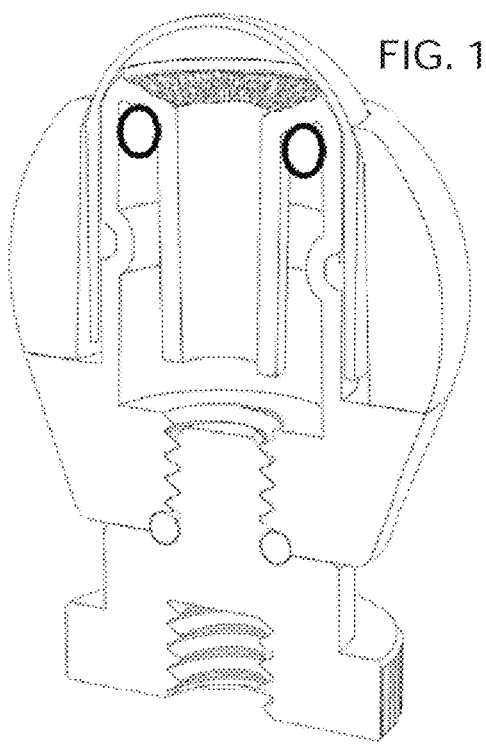

FIG. 16 shows an alternative approach to help describe the path of the bubbles of seen in FIGS. 16A-16H with an inverted eye model. The bubbles start in the anterior chamber and are shaken loose by impact (Stage 1), travel through the pupil tube (Stage 2), and when the eye is inverted will float up into the bubble reservoir (Stage 4). This bubble reservoir has a 360 design which allows it to be tilted in any direction to use.

Figure 17:
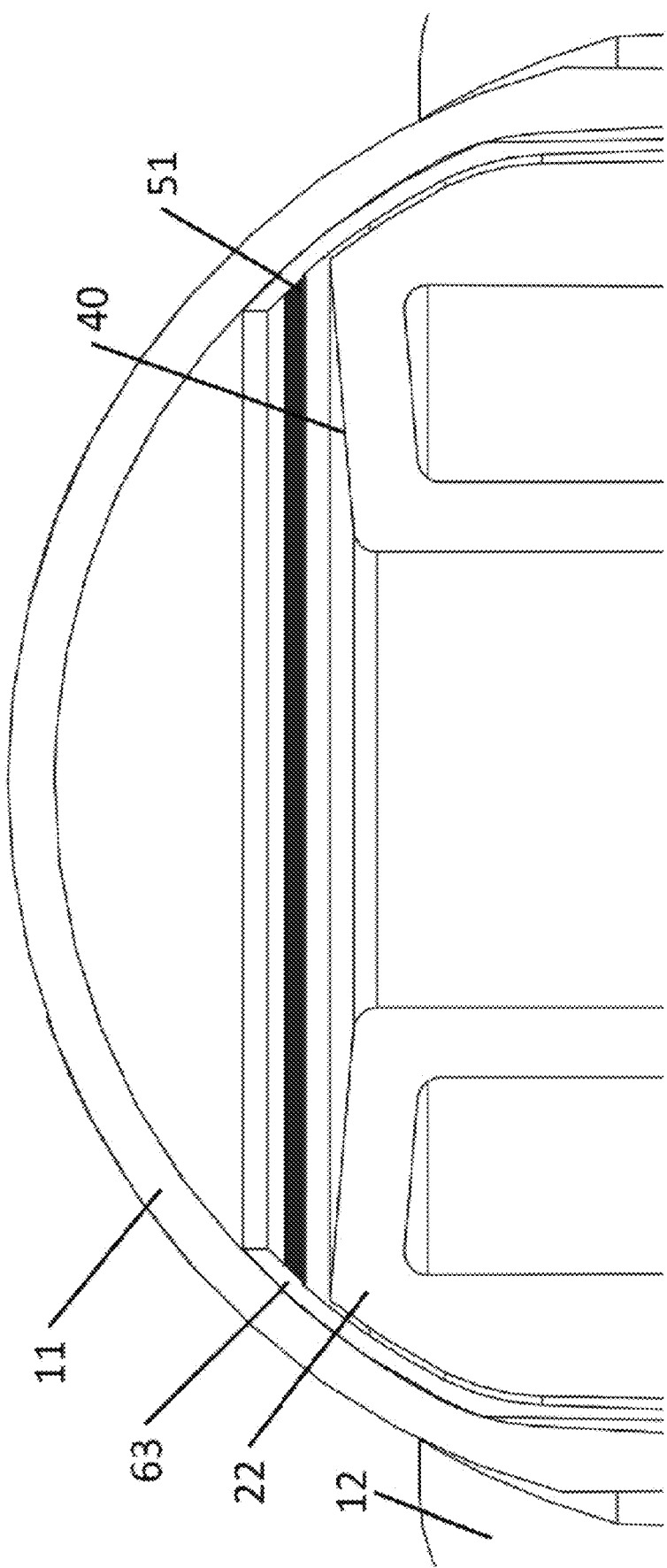
FIG. 17 is an enlarged cross-sectional view of the anterior chamber that shows that the iris is tilted inward to encourage bubble movement to the pupil when the model of FIG. 14 is inverted.

The iris can be slanted inward to help guide the bubbles towards center as shown in FIG. 15A, #31 and FIG. 17, #40. The inward slant of the iris is helpful for functionality.

Each use of the laser turns some volume of water into gas and generates bubbles. As the water is converted into gas the bubble reservoir will eventually overflow. When this occurs, more water needs to be added through a port hole. FIG. 18 demonstrates how the sealing surface (#35) can be removed by hand (#45) to refill the eye with water. The O-ring of the water port (#34) seals the water in place. The water port can seal against any threaded rod allowing the water port to also be a mounting dock. A separate mounting dock (#46) can be added to the port cover (#43) allowing the water port (#34) and mount functions to operate independently.

Figure 19:
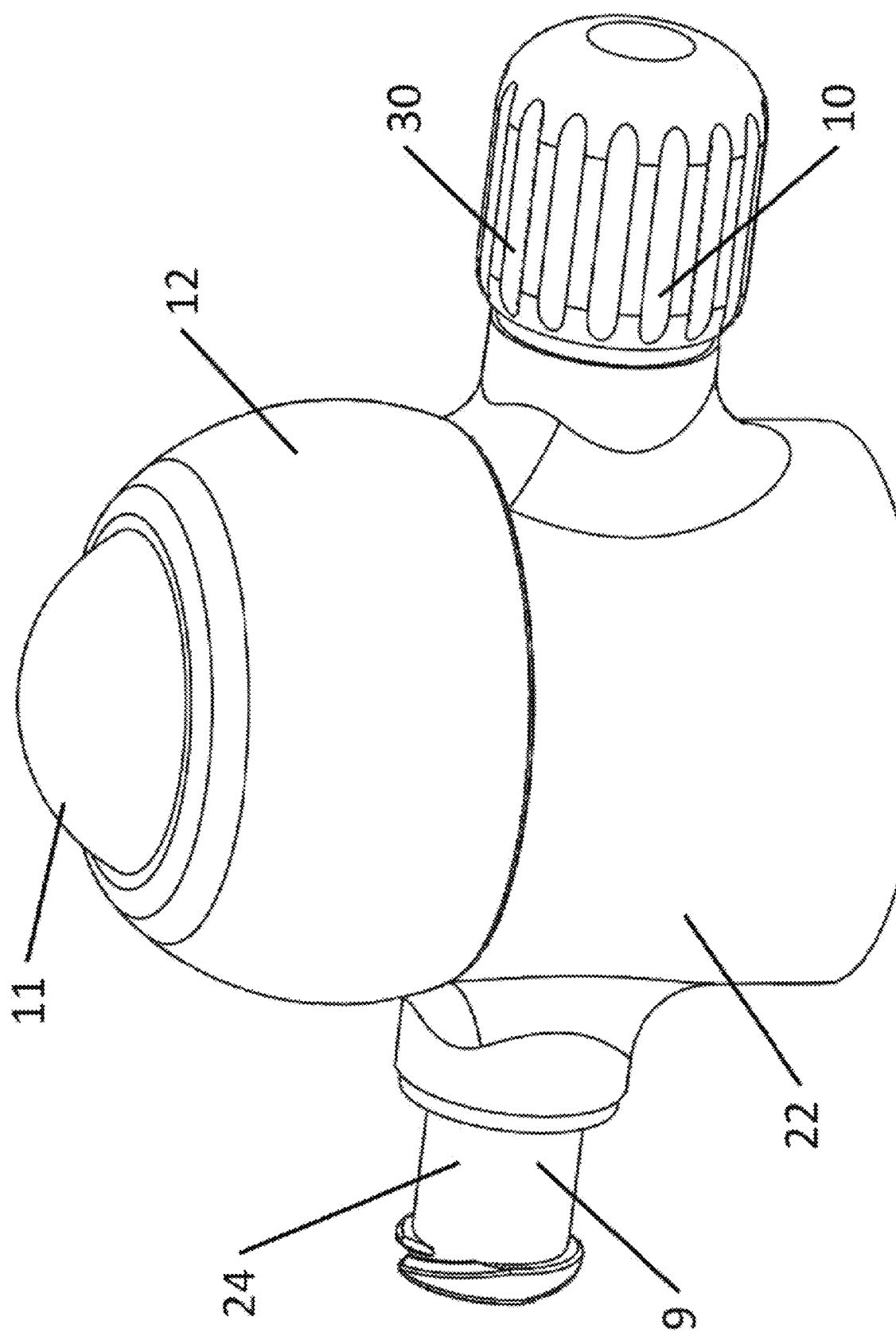
FIG. 19 is a perspective view of an eye model prototype with an internal bubble reservoir and two side ports.
Figure 20:
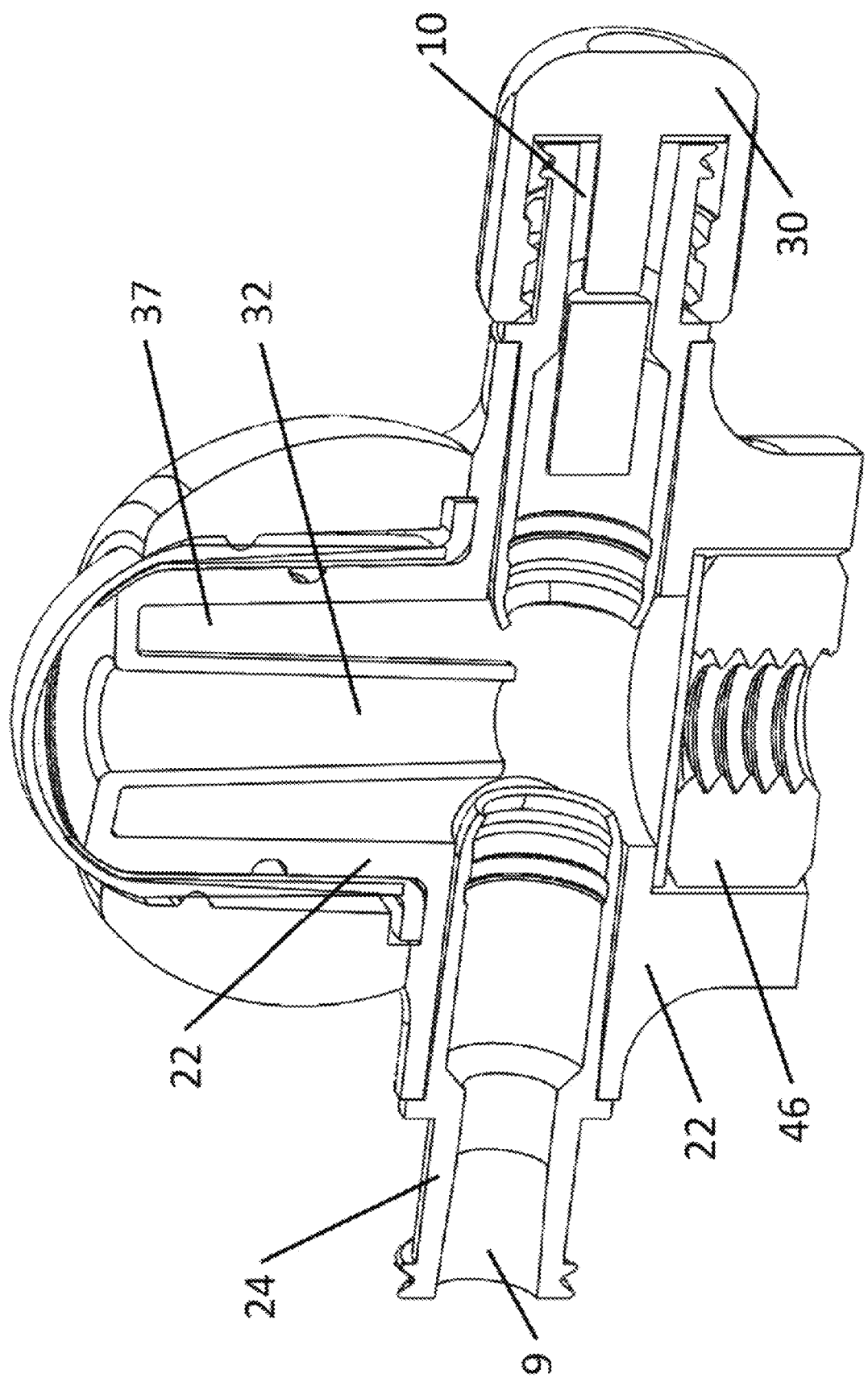
FIG. 20 is a cross-sectional view of the eye model of FIG. 19 with part identification.
Figure 21:
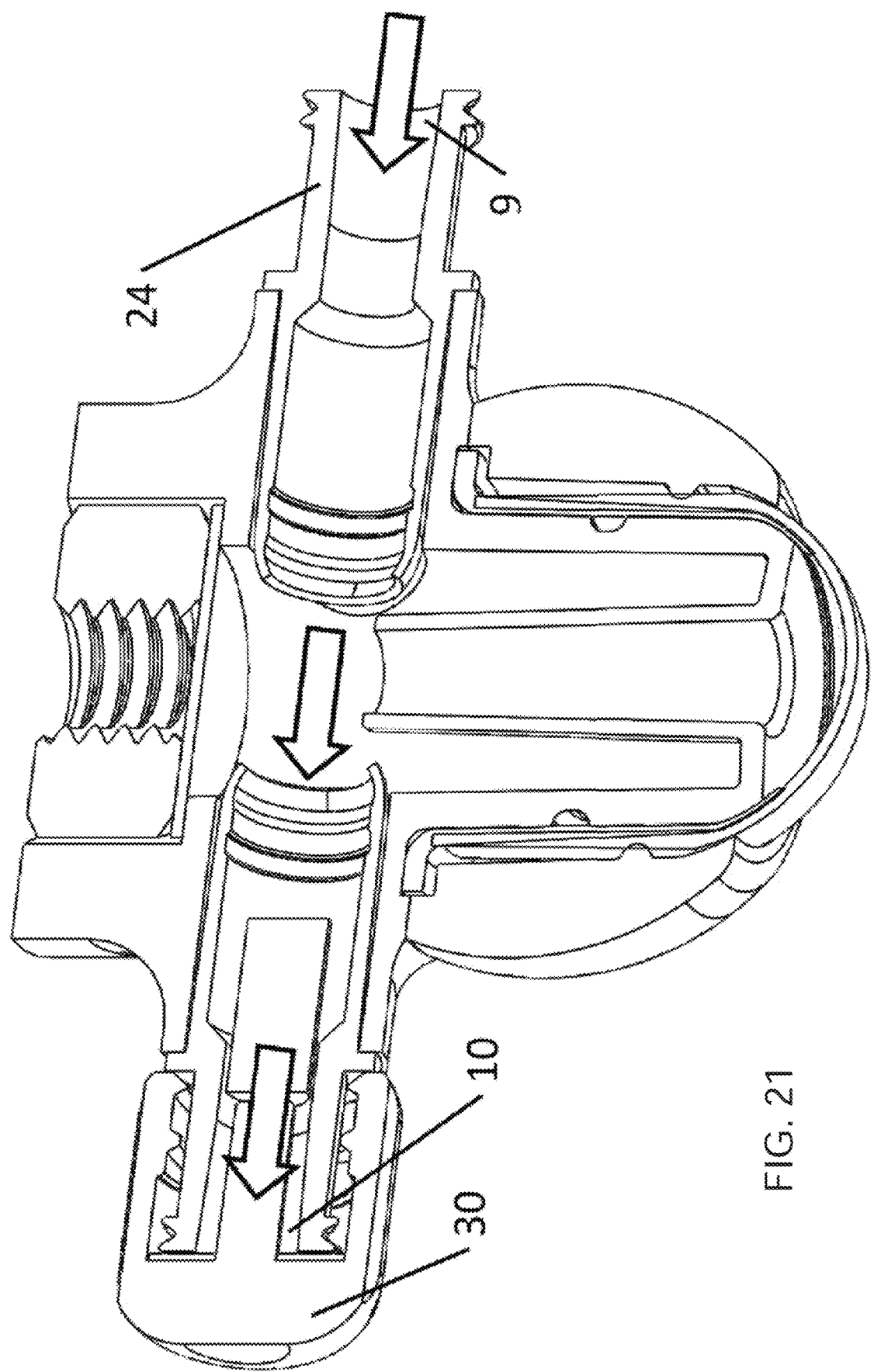
FIG. 21 is an inverted view of the eye model of FIG. 19 with arrows that demonstrate the path water flows for refilling, from a syringe to a one-way push-button valve exit.

FIGS. 19 and 20 show an alternative design where a bubble reservoir (comprised of #37 and #32) is used in conjunction with an inlet/outlet system, similar to those shown in FIGS. 1-8. Due to the addition of a push-button one-way valve (#30), both the inlet and outlet are fixed and not interchangeable. Removal of the one-way valve would return interchangeable inlet/outlet functionality. In FIG. 20 there is a defined inlet (#9) and defined outlet (#10). In this instance the outlet uses a push-button one-way valve exit (#30) to control flow. In FIG. 21, a syringe would be attached to the luer (#24) inlet (#9) of the inverted eye to generate pressure/flow (similar to the setup of FIG. 13). The syringe is pushed while the push-button valve (#30) is also pushed allowing the water to flow through the chamber bringing bubbles with it as shown by the arrows in FIG. 21. Release of the one-way valve (#30) seals the system even with the inlet (#9) open as no water can be exchanged. A threaded mounting dock can be found on the bottom (#46) to aid in attachment.

An annular 360-degree, single-chamber bubble reservoir is ideal. The 360-degree design allows the model to be inverted in any direction to capture bubbles, making it user friendly. The single chamber collects bubbles into a single larger bubble which is easier to manage and keep out of the anterior chamber.

Closed Eye Models

The proposed internal bubble reservoir can also be made without a reusable water port giving a sealed design. This would allow the manufacturer to control the fluid inside the eye and prevent the customer from refilling.

FIG. 22-27 are simplified demonstrations of such "closed" bubble reservoirs that do not contain water ports resulting in a sealed bottom. These illustrations provide alternate designs of reservoirs and optional ribs which can be incorporated into a regular reservoir eye (e.g., as in FIG. 15A) which, again, do not need to be sealed on the bottom.

Figure 25:
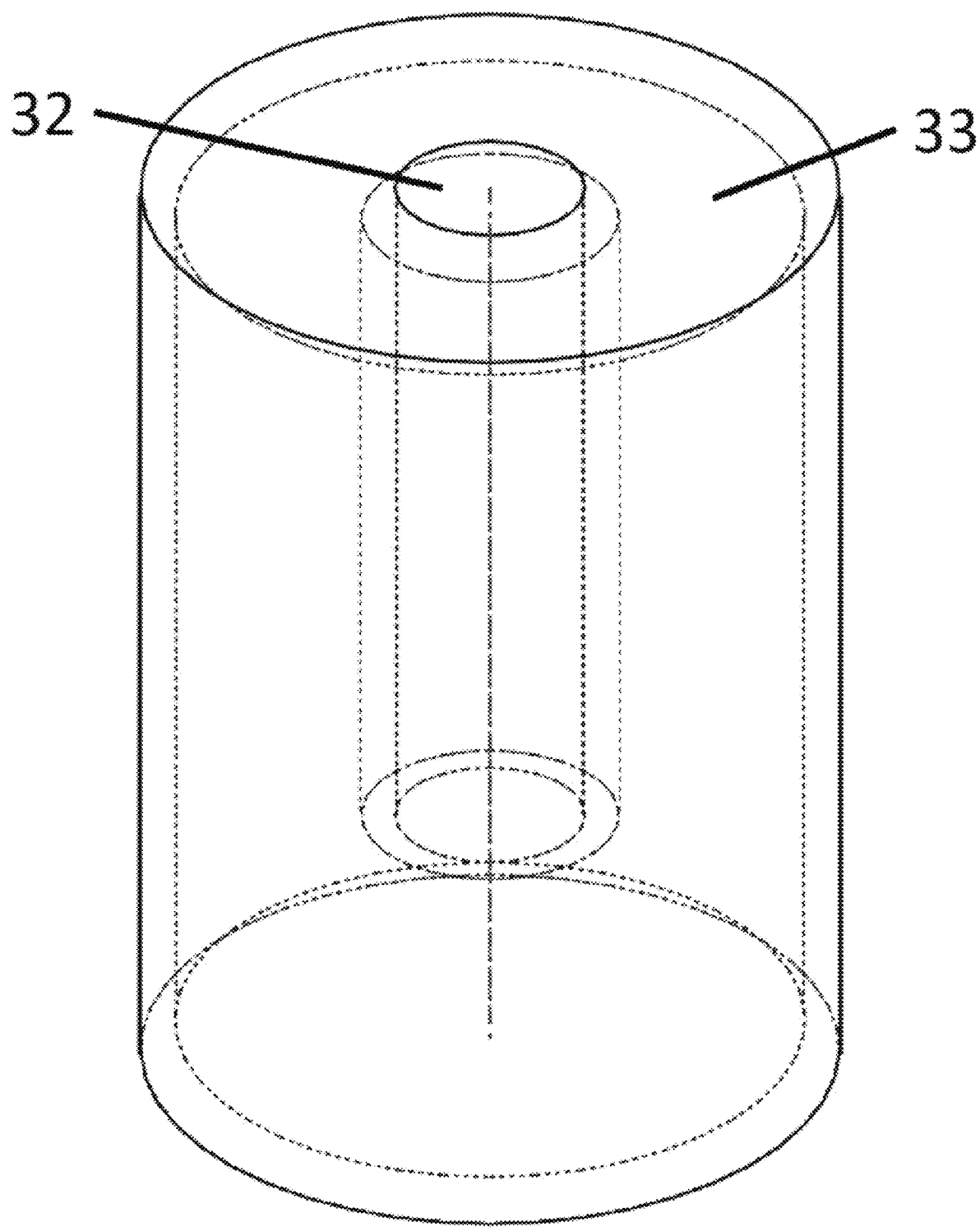
FIG. 25 is a perspective view of a simplified internal bubble reservoir with a single chamber and 360-degree bubble capture, hidden lines, and center lines visible.
Figure 26:
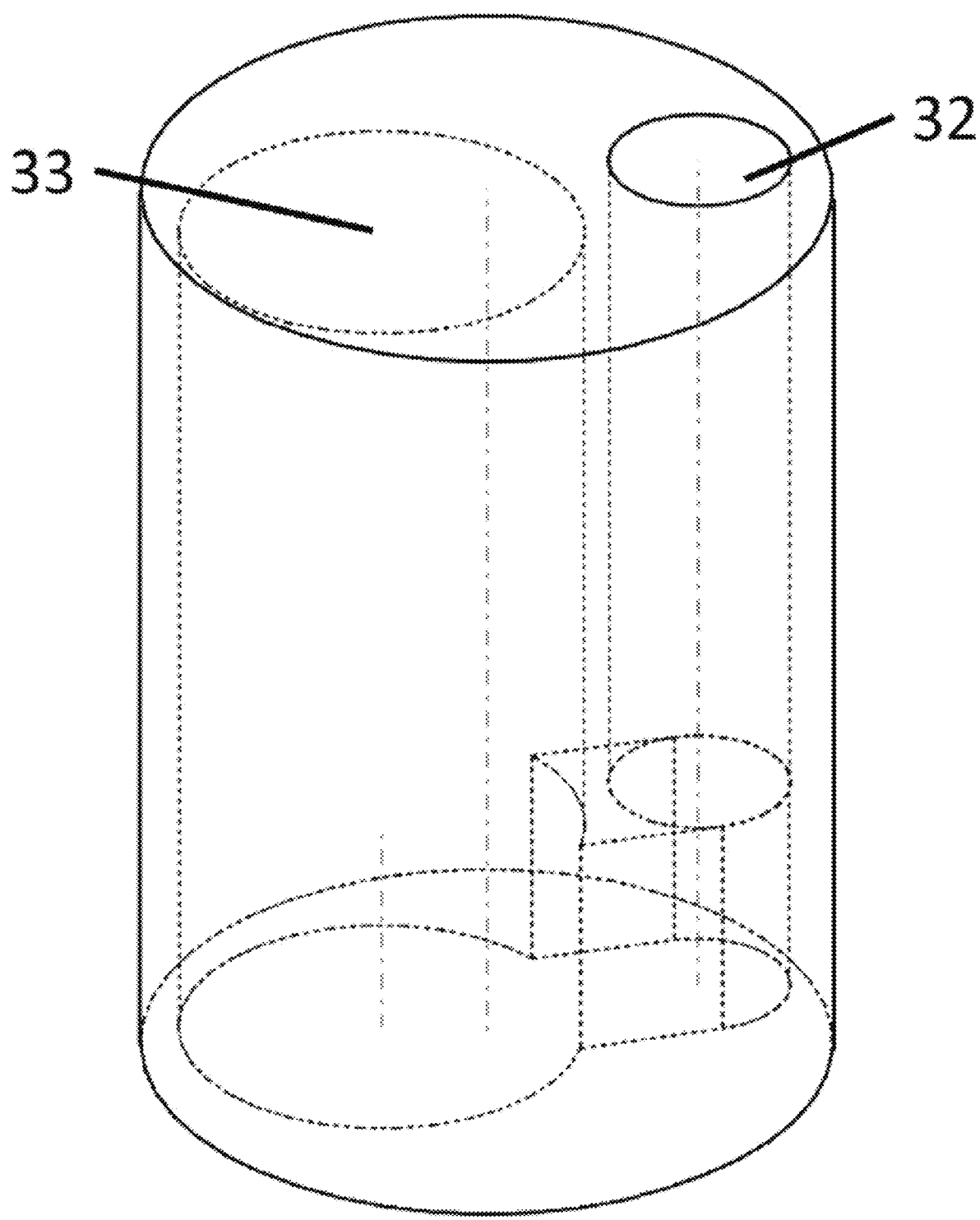
FIG. 26 is a perspective view of a simplified internal bubble reservoir demonstrating that location of the capture tube and bubble chamber can vary, hidden lines and center lines visible.

FIG. 25 is a simplified version of FIG. 15A without simulated eye components, and demonstrates the bubble chamber (#33) as one continuous unit that surrounds a capture tube (#32) at the center which allows for bubble capture in every direction. However, there are alternative approaches that utilize non-360-degree designs and multiple chambers to achieve similar results.

Figure 22:
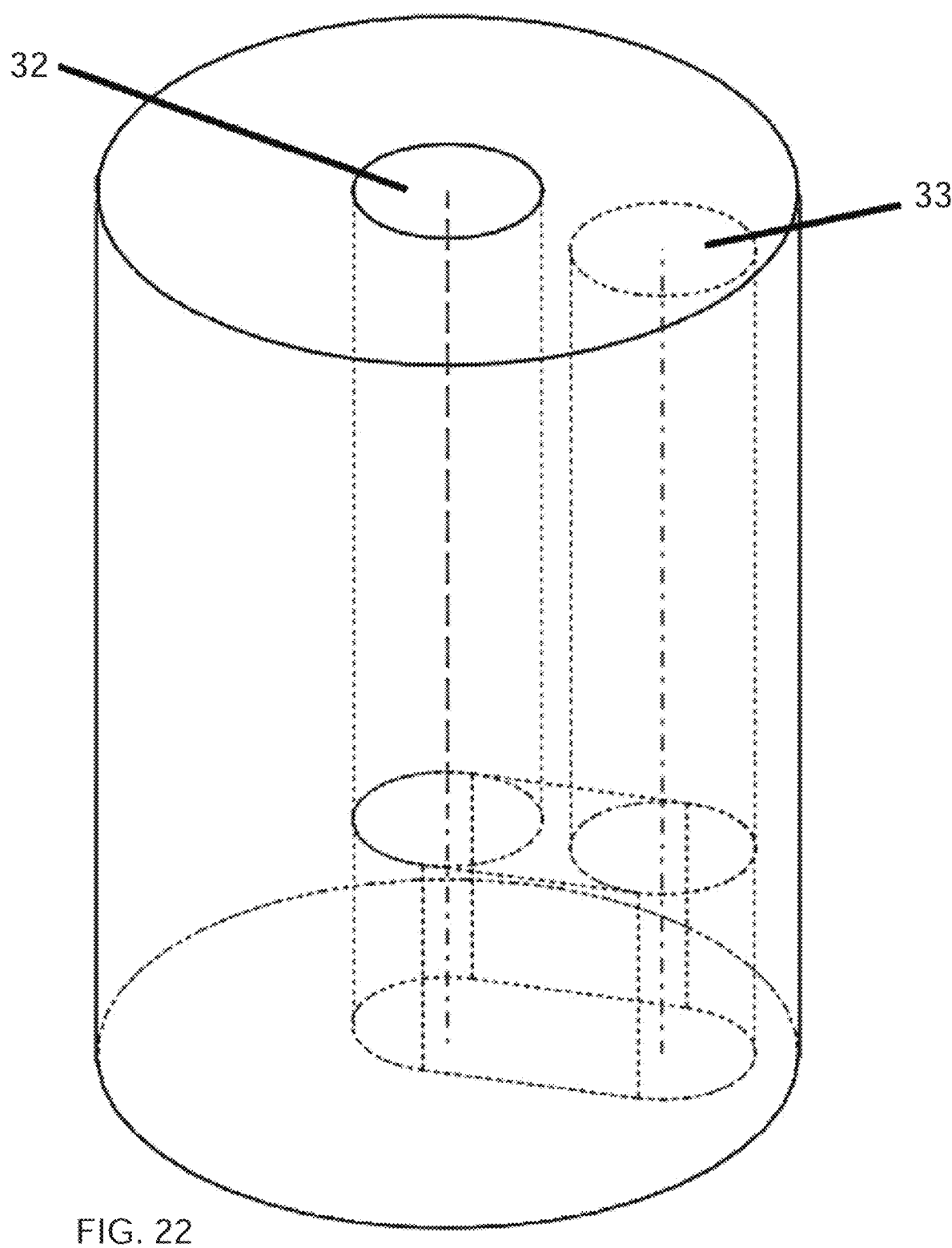
FIG. 22 is a perspective view of a simplified internal bubble reservoir with a single chamber and single bubble capture direction, hidden lines, and center lines visible.
Figure 23:
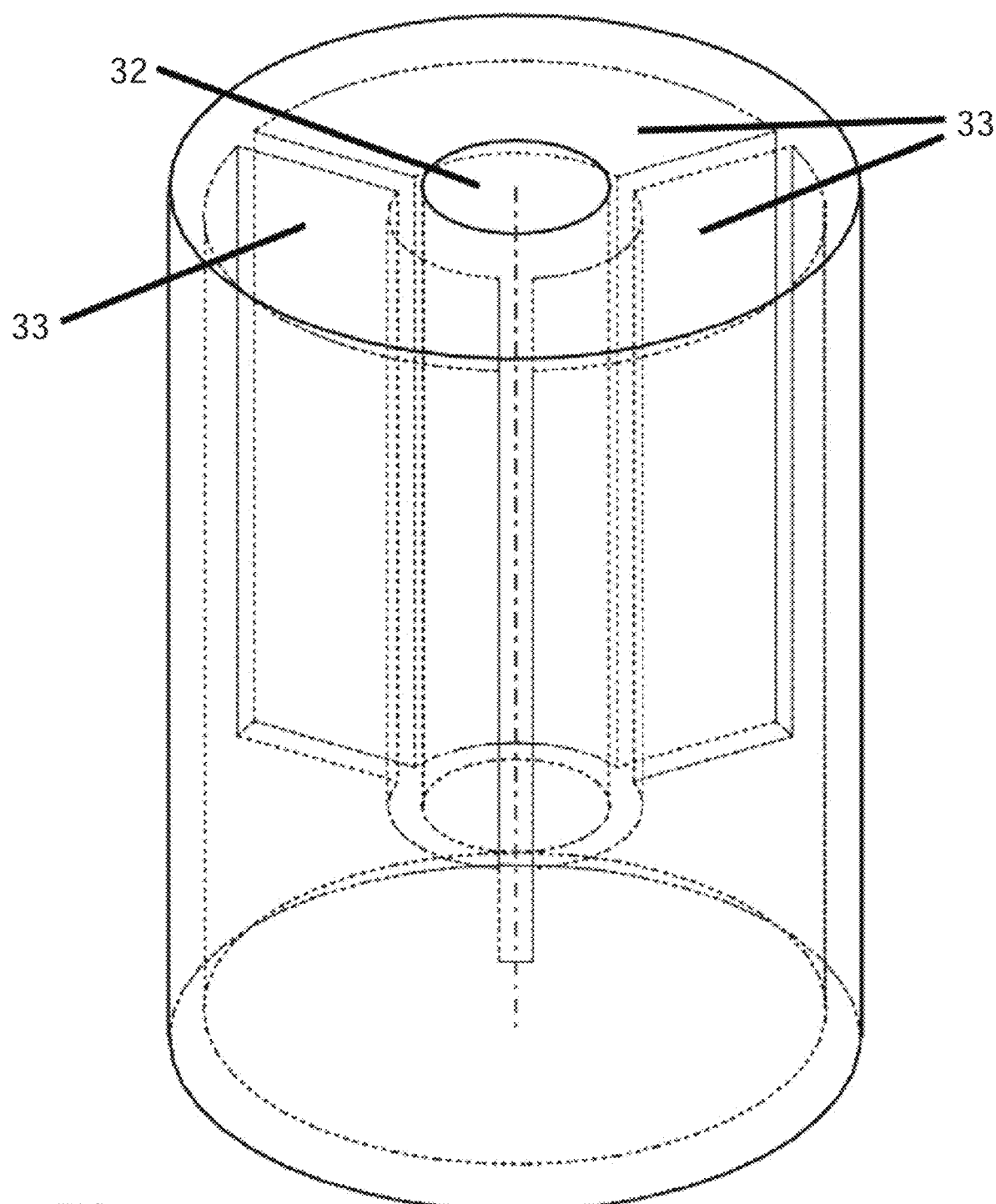
FIG. 23 is a perspective view of a simplified internal bubble reservoir with multiple chambers and 360-degree bubble capture, hidden lines, and center lines visible.

FIG. 23 is an example of how a multi-chamber bubble reservoir could work while still allowing for 360-degree capture. FIG. 23 shows 3 ribs that split the bubble chamber into 3 separate sections (#33) with the capture tube going through the center (#32). FIG. 22 is an example of a non-360-degree single chamber design where the bubbles have a specified path to travel and the tool must be inverted in that specific direction to pass the bubbles from the center capture tube (#32) to the bubble chamber (#33).

Figure 24:
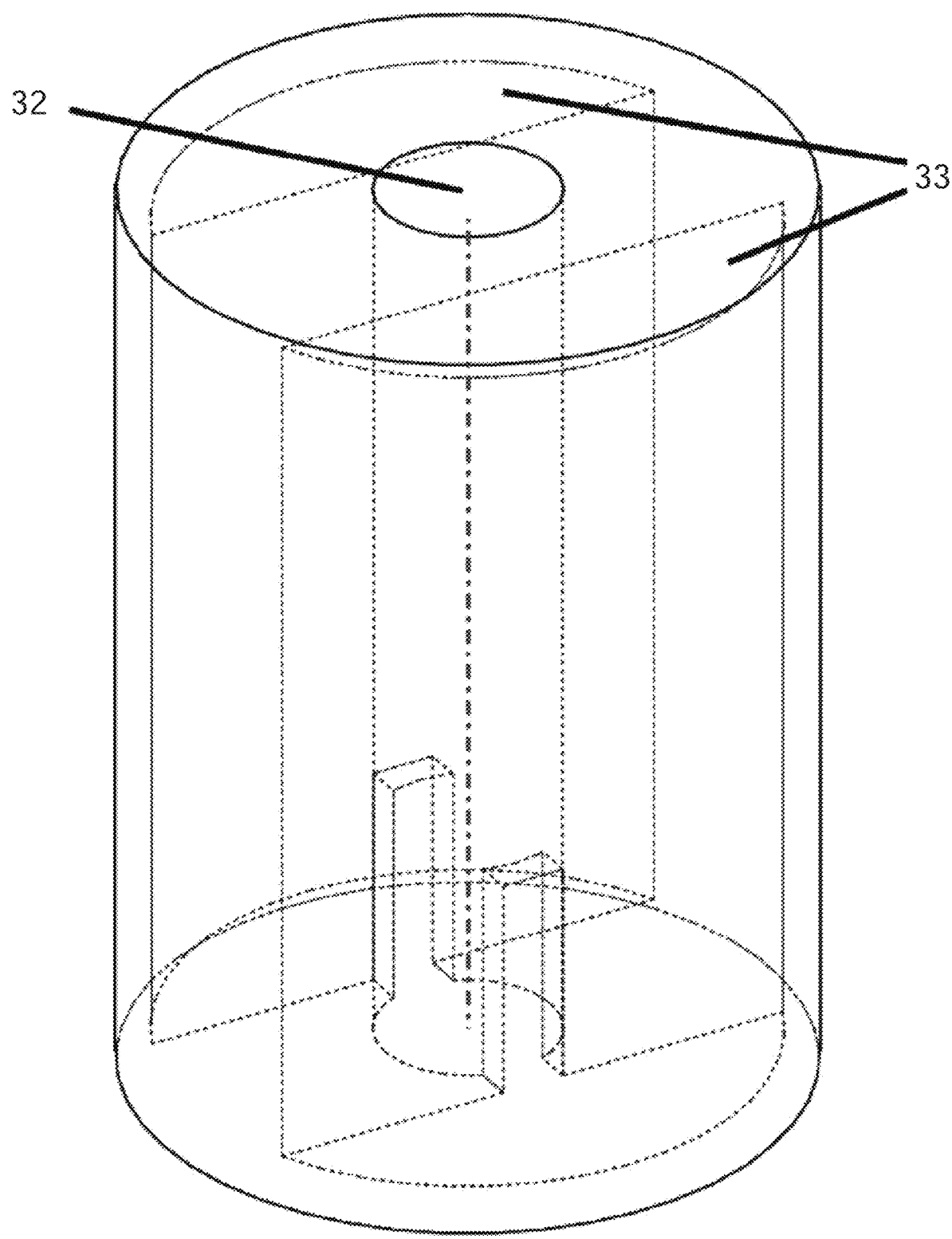
FIG. 24 is a perspective view of a simplified internal bubble reservoir with multiple chambers and two bubble capture directions, hidden lines, and center lines visible.

FIG. 24 is an example of a non-360-degree multi-chamber design where there are only two valid capture directions to two distinct bubble chambers (#33) with the capture tube situated at the center (#32).

Figure 27:
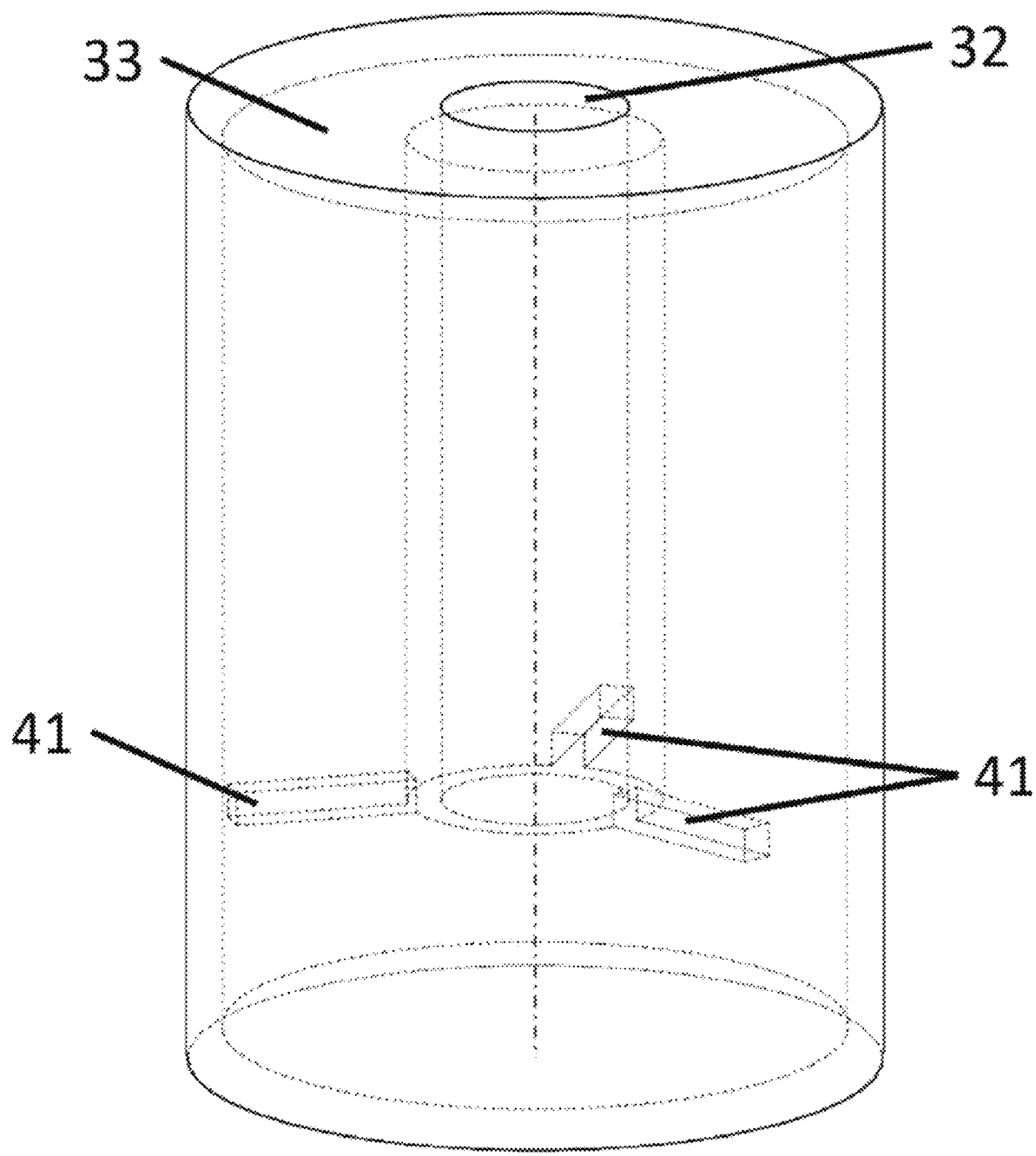
FIG. 27, is a perspective view of a simplified internal bubble reservoir with a single chamber and 360-degree bubble capture where the end of the capture tube is structurally supported, hidden lines, and center lines visible.
Figure 37:
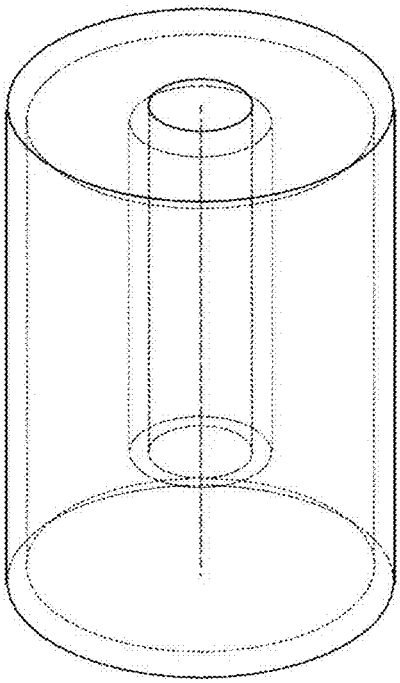
FIG. 37 is a bubble reservoir design matrix that compares capture direction vs number of chambers.

FIG. 27 is an alternative design of a 360-degree single-chamber bubble reservoir where posts (#41) can structurally support the end of the capture tube (#32), similar to the design of a wagon wheel, to keep the bubble chamber as a continuous unit (#33). A bubble reservoir design matrix can be found in FIG. 37 that uses FIGS. 25, 23, 22, and 24 to contrast capture directions with number of chambers while having a center capture tube.

It is preferable to have the capture tube located at the pupil in the center for ease of use (#32 on FIGS. 22, 23, 24, 25, and 27). However, the capture tube can be located anywhere beneath and connected to the anterior chamber. For instance, in FIG. 26, the capture tube (#32) can be offset from center with a large bubble chamber (#33) taking up much of the bubble reservoir space.

Figure 30:
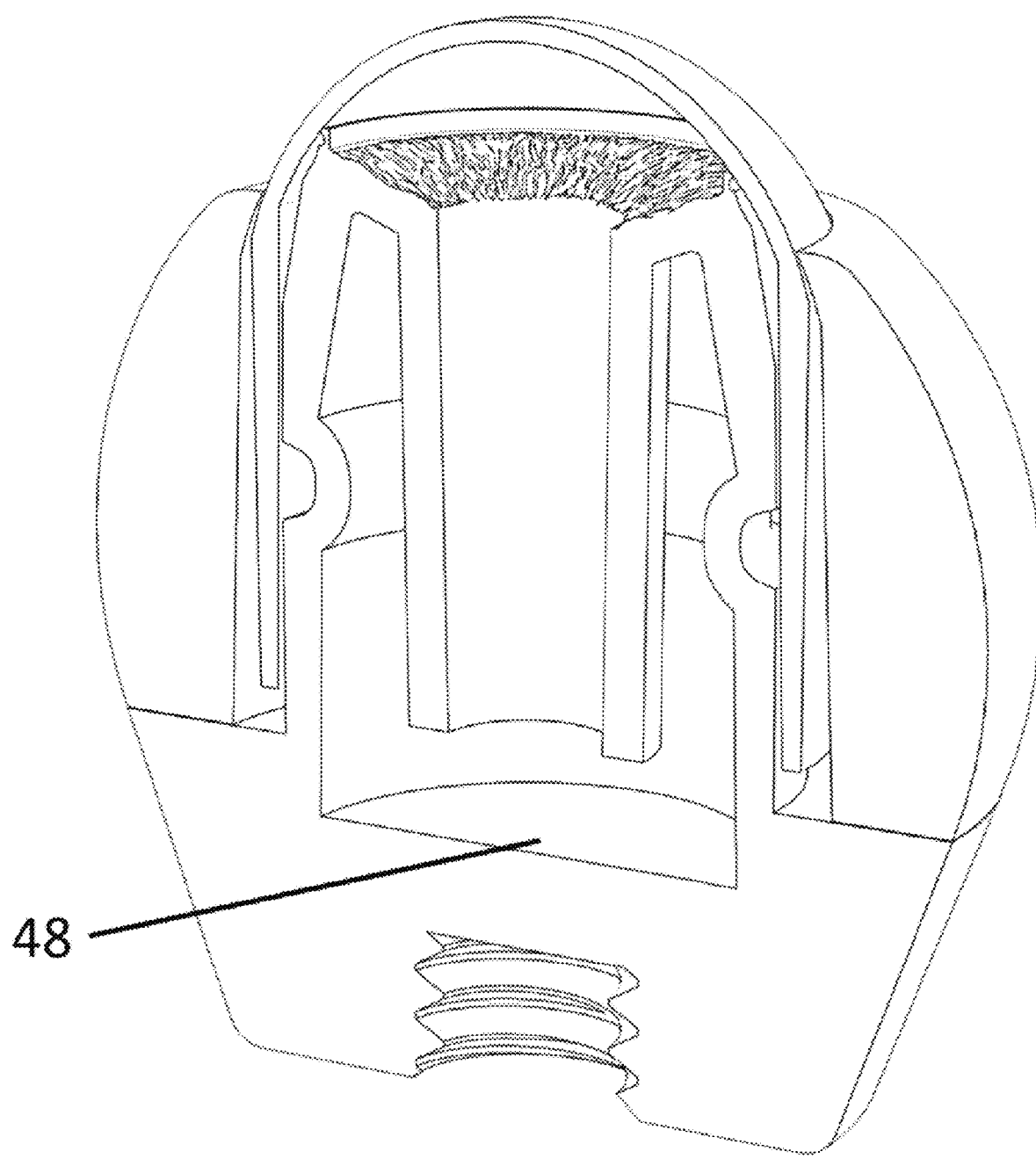
FIG. 30 shows an eye model design that is sealed, and an internal cavity is liquid filled and non-accessible.

FIG. 30 presents a bubble reservoir eye with a sealed bottom (#48) protecting the inner fluid from being tampered with by the end user. Alternatively, the eye model of FIG. 15A can be modified by adding thread locker/glue to the interface between the thumbscrew and sealing nut, after filling the eye, permanently sealing the bubble reservoir.

Partial Eye Models

Figure 28A:
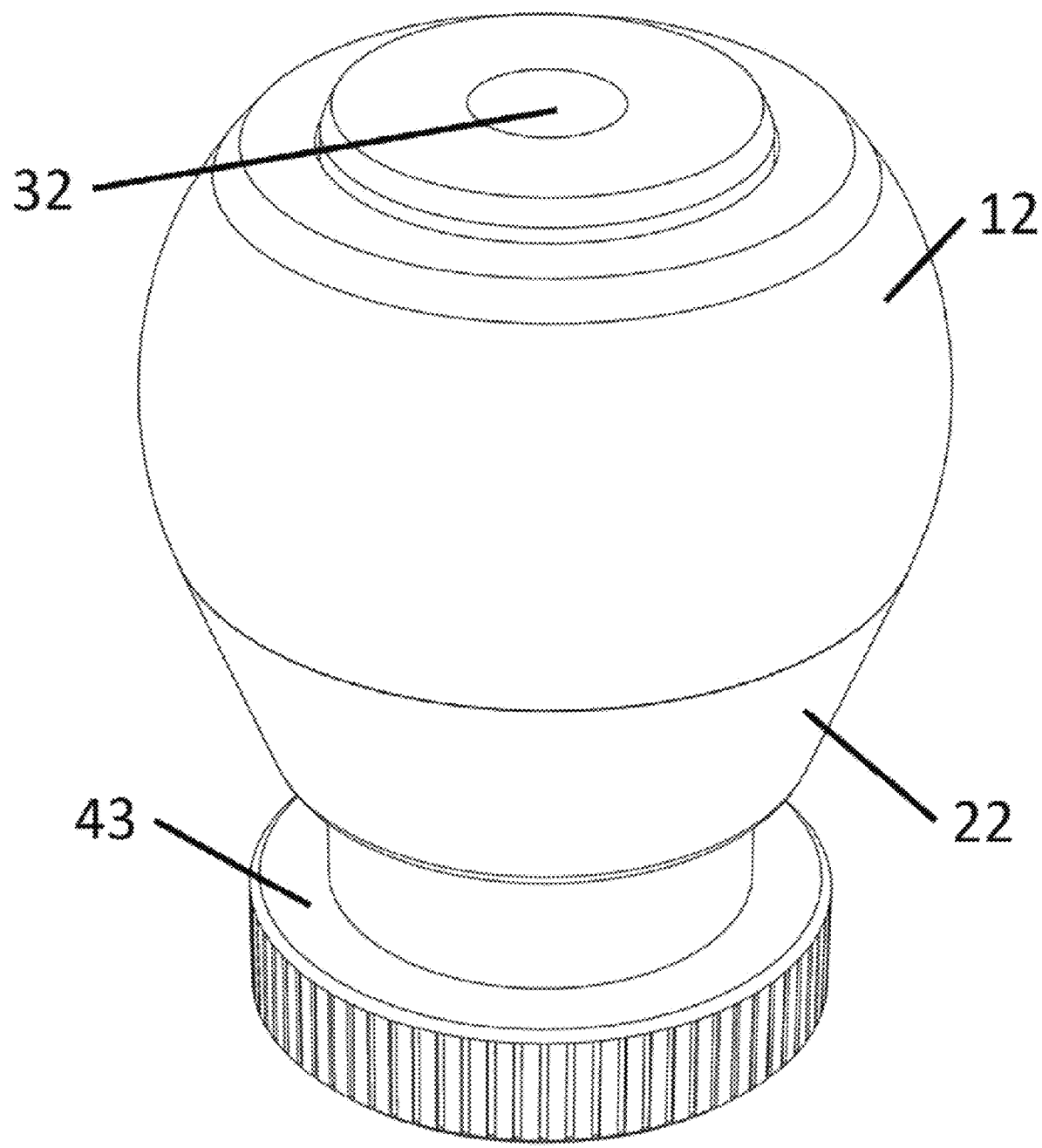
FIG. 28A is a perspective view of a bubble reservoir independent of a simulated anterior chamber and FIG. 28B is a cross-section thereof.
Figure 28B:
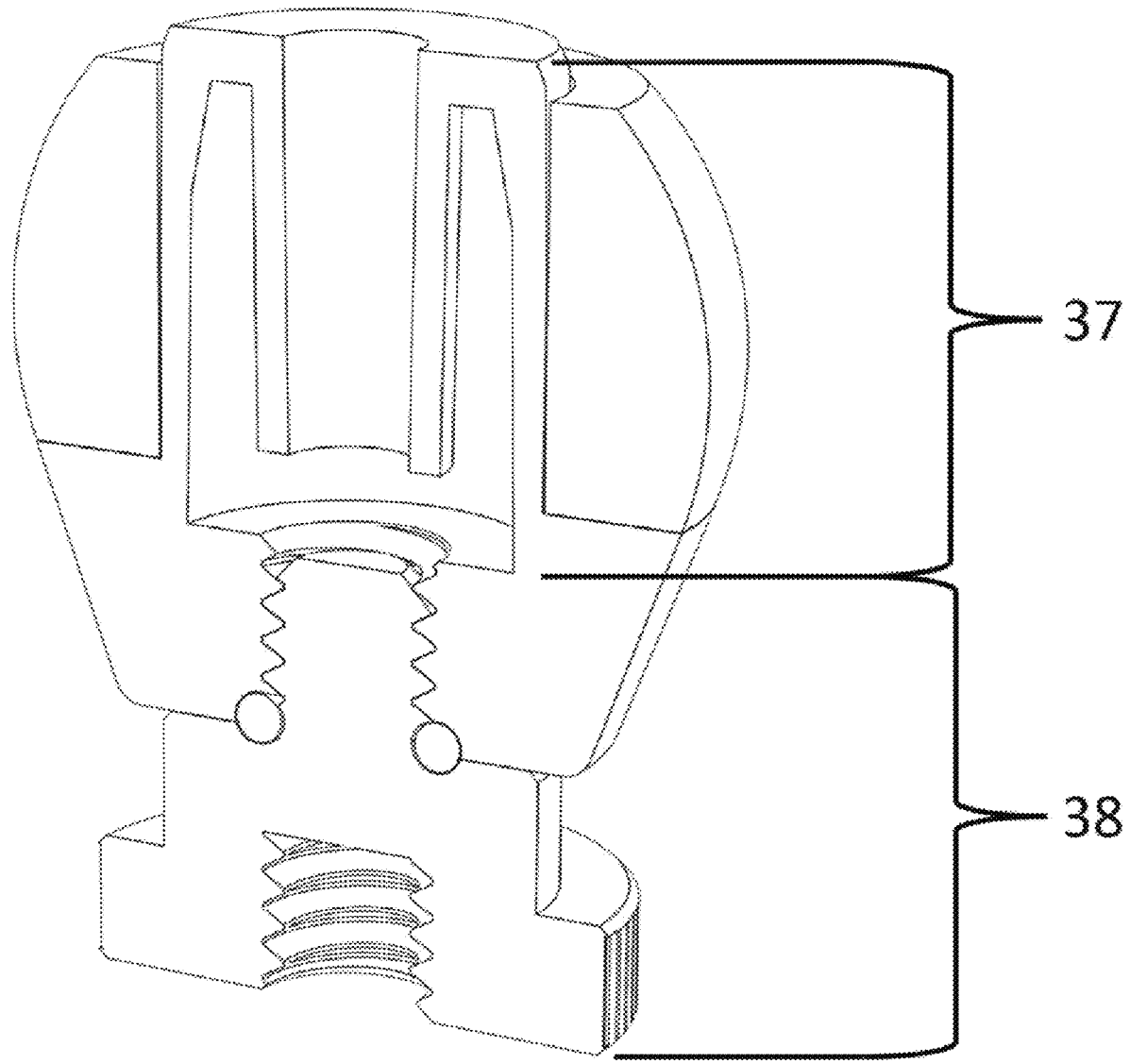

The proposed internal bubble reservoir can be made without an anterior chamber. The upper portion of a simulated eye can then be attached to the top of the tool providing bubble management to an eye that previously didn't have the capability. FIG. 28A demonstrates how the unit could look without an attached anterior chamber. FIG. 28B is a cross-section of FIG. 28A displaying the bubble reservoir (#37) and refill system (#38).

The unit shown in FIG. 28A could also be utilized without a cornea or with only a partial cornea where the patient interface directly secures to the sclera (#12). With a complete eye, the patient interface or gonioprism would sit over the cornea and the surrounding edges of the scleral dome. With the cornea gone, the interfacing component would rely on the contact of the scleral dome to position itself. The shape of the interfacing component would act as the shape of the corneal dome. The interfacing component would create a seal on the scleral dome so that a new cavity is formed that replicates the AC. This pseudo AC can be filled with liquid and undergo laser firing like a normal complete eye with a cornea would. This open dome eye would give easier access to the TM structure and could allow filling the eye from the open dome. If a highly viscous viscoelastic is used to create a mound on top of the eye, the interfacing component would squeeze out the excess viscoelastic to create a pseudo filled AC. This model would be more difficult to set up and use but would allow access to the TM. Access to the TM could be necessary to analyze the ablated hole created by the laser. Using equipment, such as a microscope or depth analyzer, would be difficult or impossible to use unless the cornea was removed. This scenario would facilitate an easier analysis by not having to remove the cornea post laser firing.

Simulated TM

Figure 6:
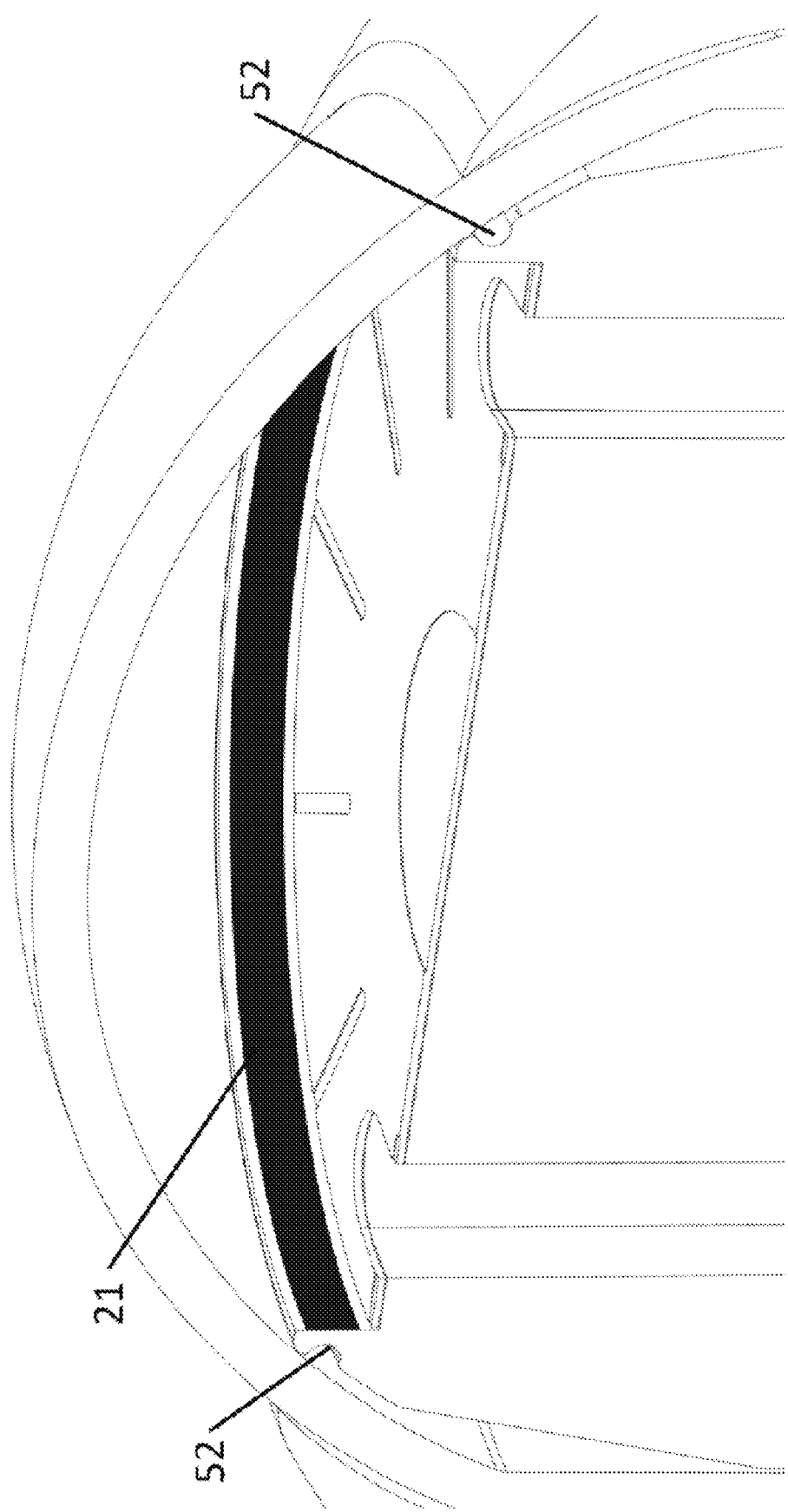
FIG. 6 is an enlarged cross-sectional view of an upper portion of the eye model of FIG. 5 having a plastic ridge with a coated layer representing the TM.
Figure 7:
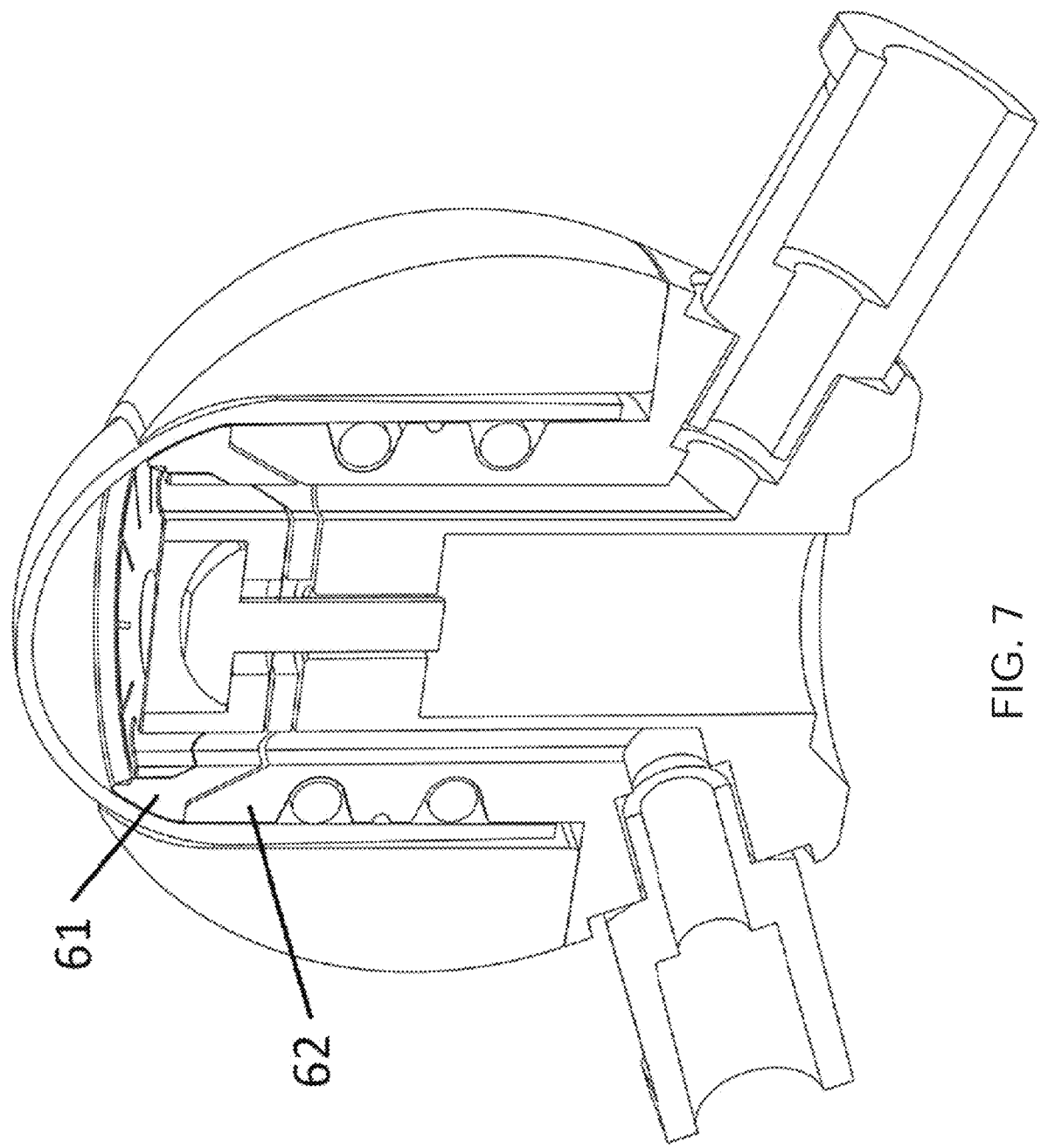
FIG. 7 is a cross-sectional view of an alternative eye model.

The proposed design includes a section representing TM that is intended to be removed via laser ablation (FIG. 6, #21). This section of TM material may have color (FIG. 34A, #51) and geometrical features (FIG. 35A-35D) to help differentiate it from surrounding simulated tissue. The geometry of the simulated TM wall, or other tissue structures, doesn't need to match one-to-one with the respective geometry of an actual eye. Real live tissue is flexible, compliant, and contains water throughout which allows it to easily adjust to a patient interface (i.e., the component of the laser system which makes direct contact with the eye itself), Engineering materials are more rigid than real tissue and need to be designed in unique ways to engage with the same patient interface. For example, the iridocorneal angle of the human eye is an acute angle (FIG. 36) and to achieve the same visualization of the TM with a less flexible simulated eye, a vertical TM wall (FIG. 35A, #56) or a less acute angle (FIG. 35C, #57), can be valid solutions depending on the design of a patient interface.

FIGS. 34A-34D are perspective sectional views of the eye model of FIG. 14 to demonstrate a laser treatment on a simulated eye. FIG. 34A demonstrates how a rim structure (#21) can represent the iridocorneal angle with a coating as the trabecular meshwork (#51) and a Schlemm's canal in the back of the structure (#52). The coating (#51) should not wash away by the fluid within the eye and can be made of any color that contrasts with the TM ridge (#21) color to allow for easy demarcation. The laser generated hole in the TM (FIG. 34D, #55) demonstrates the importance of color contrast between the TM ridge (#21) and TM coating (#51), the high contrast allows for easy visualization of a successful procedure.

While theses eyes are meant to simulated human tissue they are also used to educate and provide feedback, so additional features can be added to provide learning assistance, similar to the clock hours on the iris (FIG. 2A, #28) which are used to help orient the surgeon and gage distance travelled by tools during surgery. FIG. 35D, #58 demonstrates an additional feature not found in human anatomy, where a change in the TM wall geometry is added to coincide with the top of the colored TM section. This change in visual color paired with a change in physical geometry may be useful for additional feedback to a laser system.

Figure 35A:
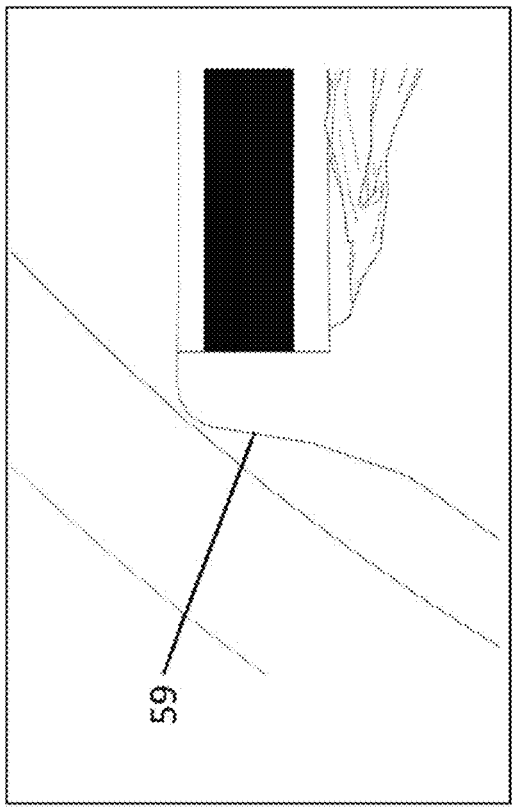
FIGS. 35A-35D show sectional views of various rim structures and coating, and shows alternate rear surfaces and an angled trabecular meshwork surface.
Figure 36:
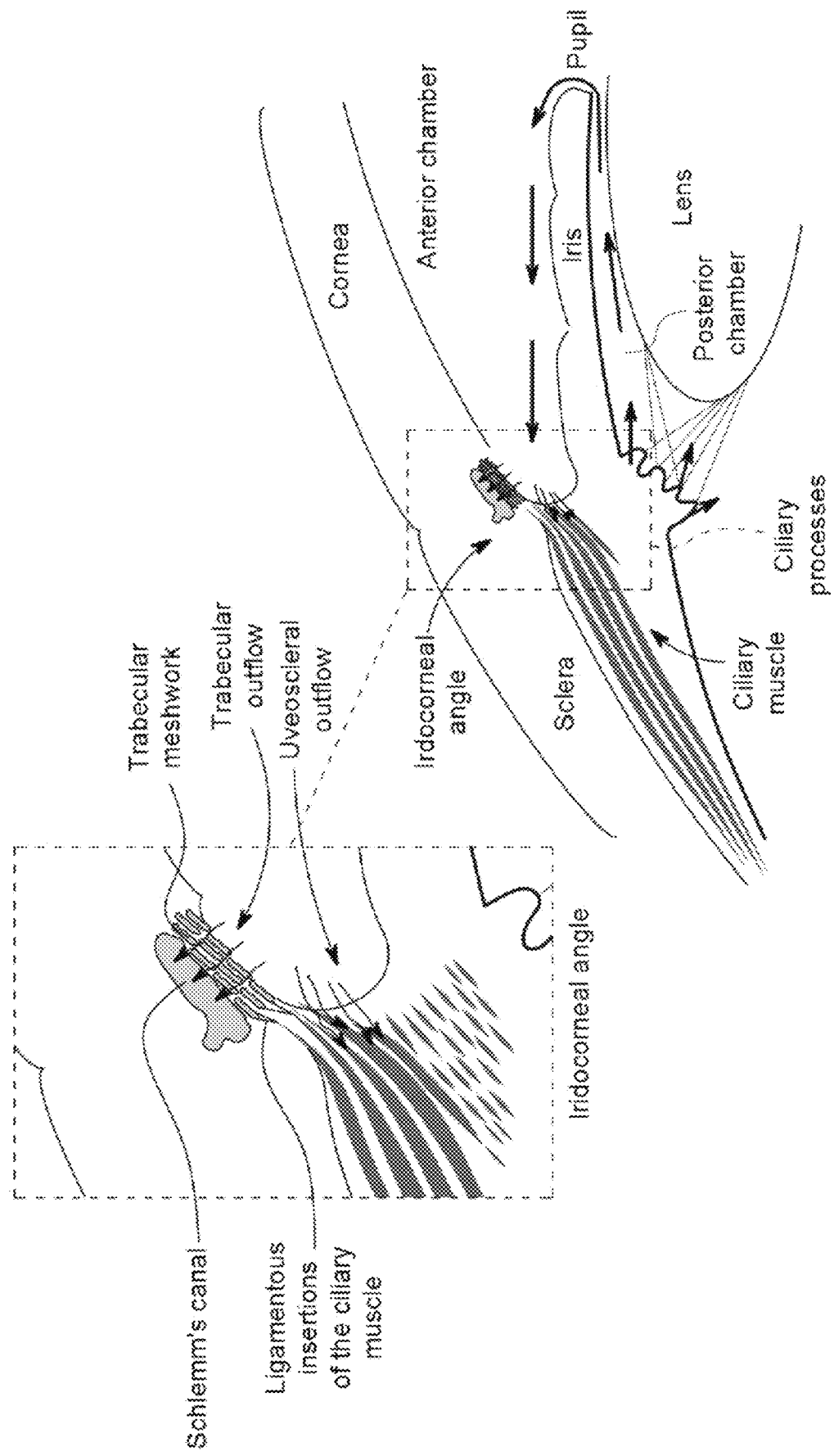
FIG. 36 shows an anatomical diagram of the aqueous humor cycle through one corner of a human eye; the enlargement illustrating how fluid exits through Schlemm's canal via the trabecular meshwork (TM).

FIG. 35A demonstrates TM profile with a vertical wall (#56), a colored TM section (#51), and a Schemm's Canal (#52). When the laser is activated on this region it ablates similar to human tissue as seen in the procedure of FIG. 34A-34D. Once the section of TM is lasered and removed a void is visually apparent as a color contrast between the ridge material and the colored front of the TM (FIG. 34D, #55).

Figure 35B:
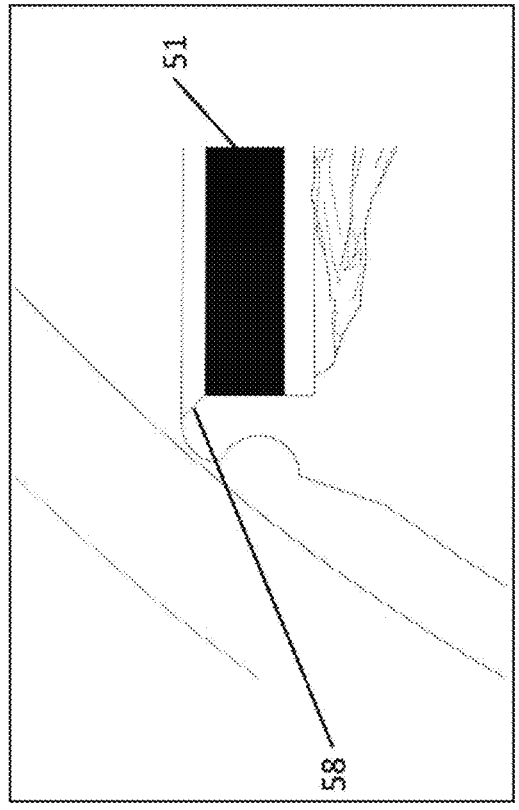
Figure 35C:
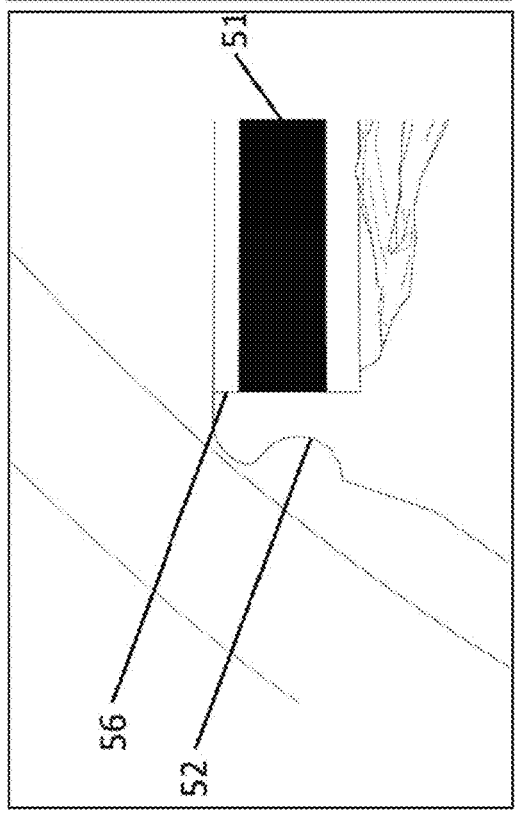
Figure 35D:
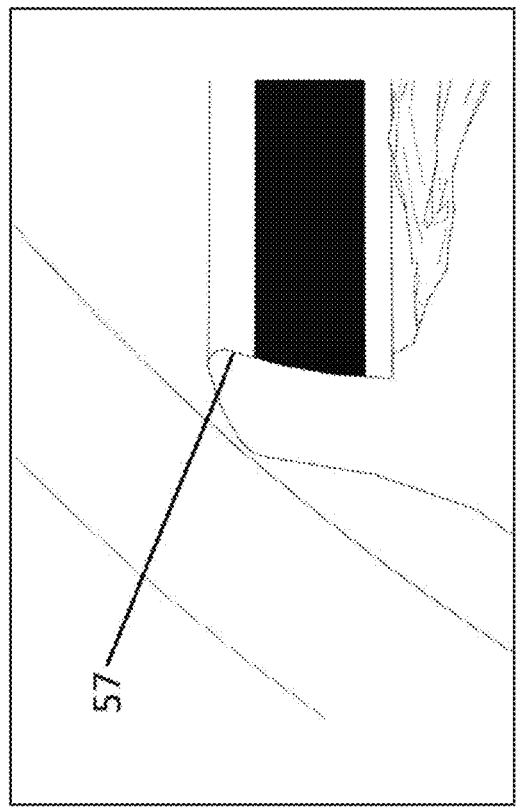

One design is to have a plastic ridge (FIG. 34A, #21) with a coated layer representing the TM (#51). Schlemm's Canal (SC) is represented in this case by a "C" shaped channel that sits within the ridge and behind the coated TM layer (#52). An alternative cross section of this design can be seen in FIG. 6 which demonstrates the SC (#52) going around the entire perimeter of the TM ridge (#21). Laser ablating this plastic ridge directly in front of the SC region could partially or fully expose the SC. This method could also include removing set layers of material to simulate tissue removal. The hidden presence of an SC could be useful to a surgeon or laser system if they utilize non-invasive imaging such as ocular ultrasound or OCT (optical coherence tomography). If an SC is not useful to the end user, it can be eliminated to increase structural integrity of the TM ridge as seen in FIG. 35B, #59.

Figure 8:
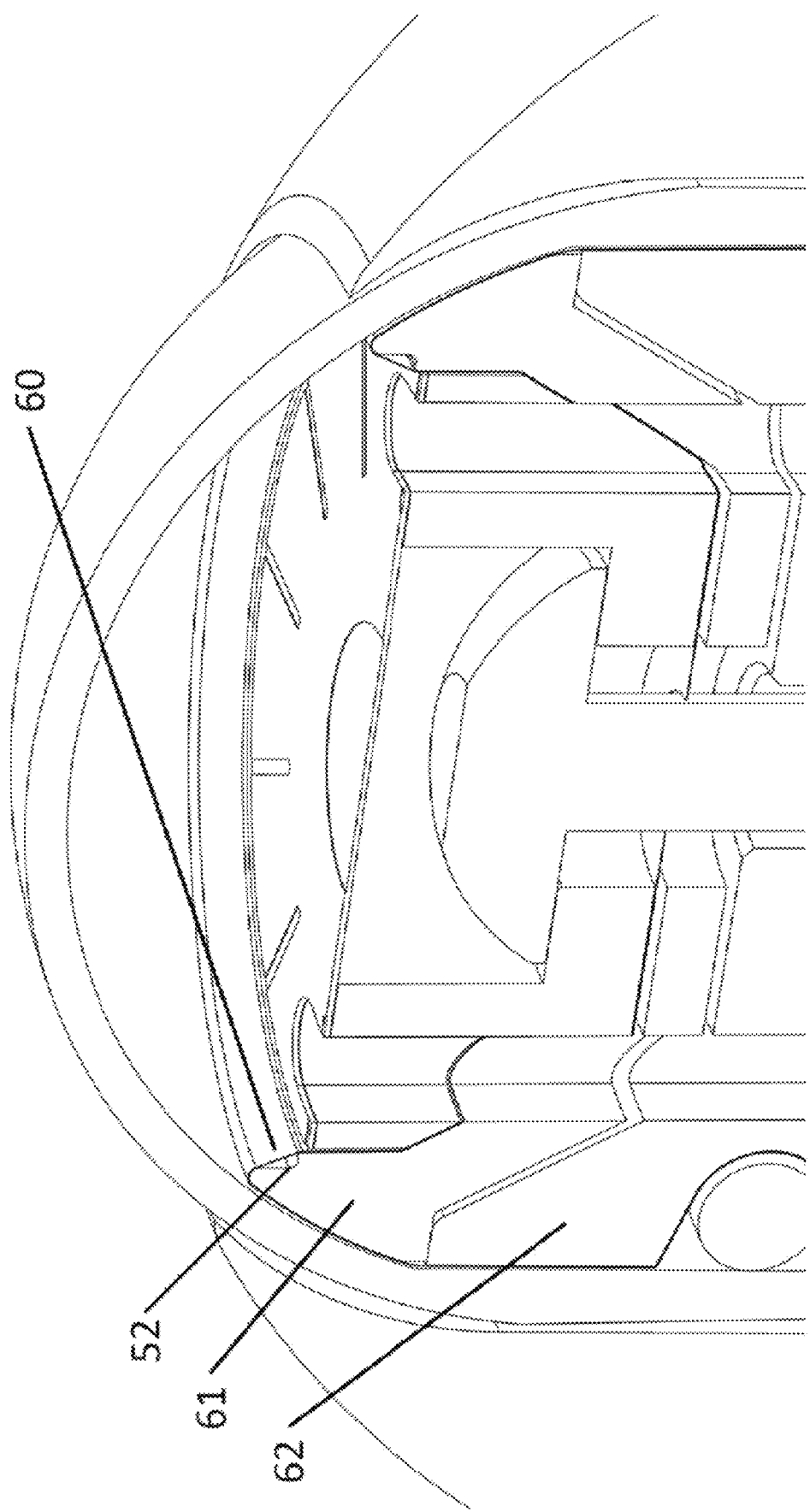
FIG. 8 is an enlarged cross-sectional view of an upper portion of the eye model of FIG. 7 showing a flexible sheet spanning across the Schlemm's canal groove to simulate a TM.

An alternate design for the TM/SC is to have a flexible sheet (FIG. 8, #60) that spans across the SC groove (FIG. 8, #52) to simulate the TM. This design uses a canal frame (#61) disposed at an upper end of the core (FIG. 7, #62) that defines a circular upper lip and an inwardly-facing circular Schlemm's canal groove (FIG. 8, #52). The canal frame (#61) is disposed on top of the lower core, and the flexible sheet (#60) is held taut by capture between the canal frame and the lower core. This design can be seen with an inlet/outlet system in FIG. 7 and enlarged in FIG. 8. The laser would remove a section of this sheet to expose the SC directly behind it.

Elongated TM Structure

Figure 29A:
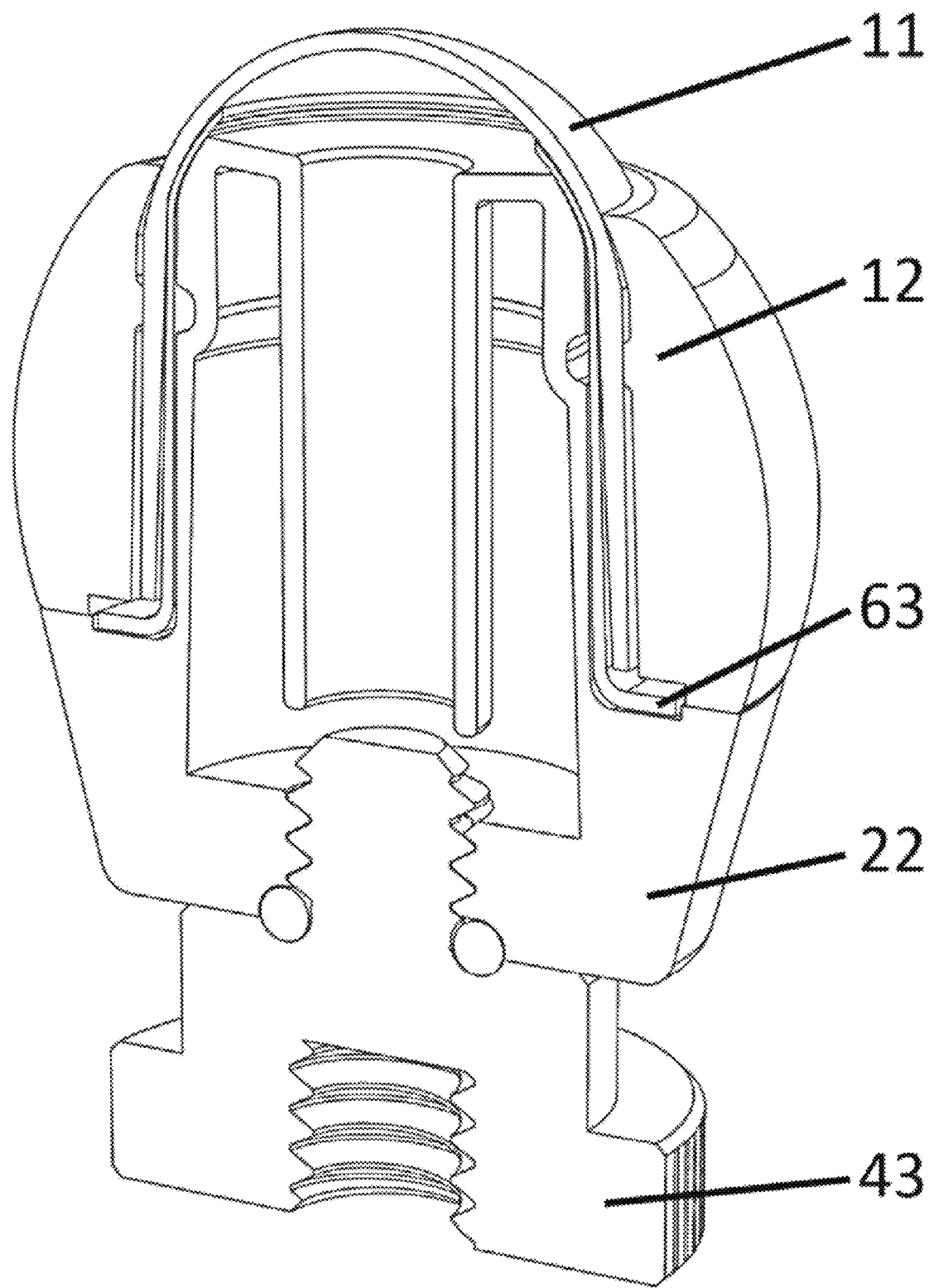
FIG. 29A is a cross-sectional view of an eye model prototype with a 360-degree internal bubble reservoir, single bottom port, and an Elongated TM Structure.
Figure 29B:
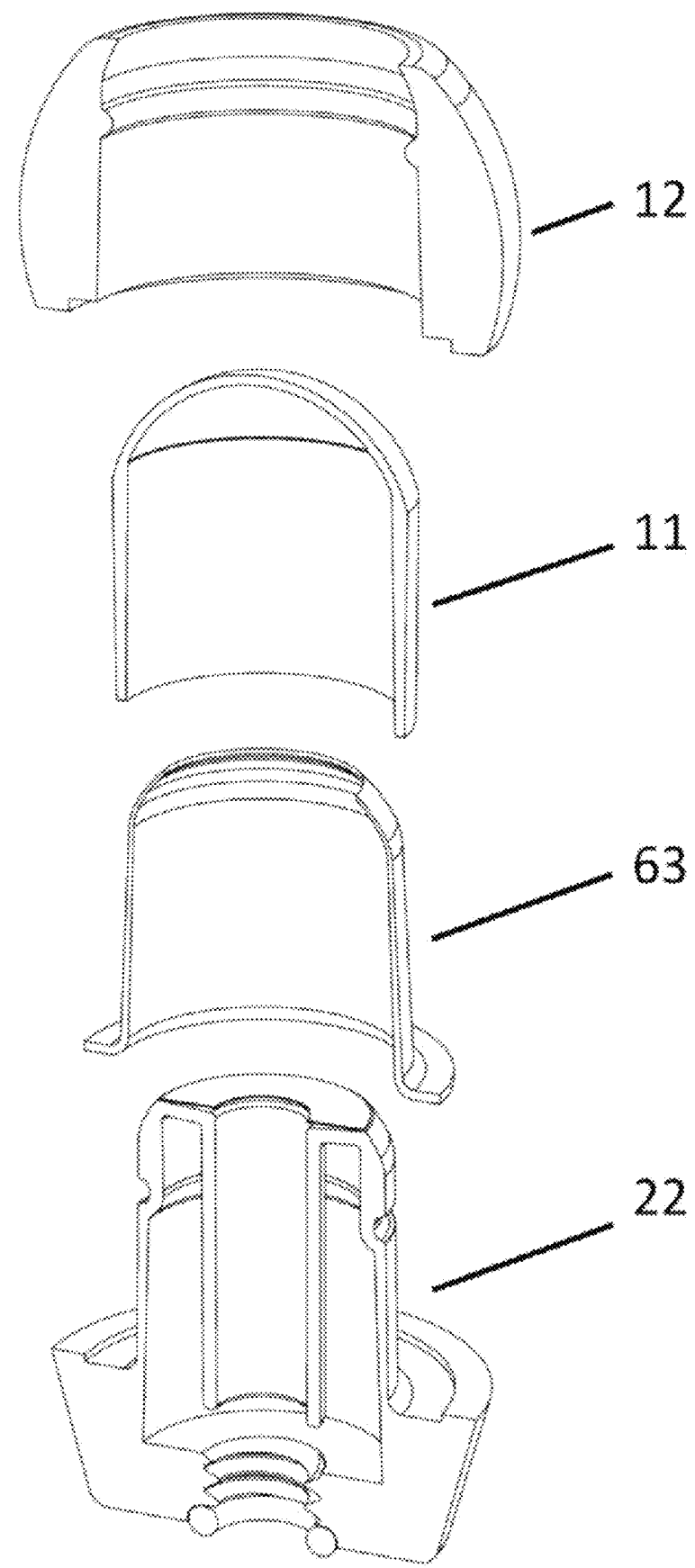
FIG. 29B is an exploded view thereof.

An elongated open dome-like TM structure (#63) may be provided as a separate component from the lower core (#22) or corneal dome (#11), allowing the TM to be constructed from a different material as identified in FIG. 29B. The scleral dome (#12) is secured over both the corneal dome (#11) and the dome-like TM structure (#63), and may be attached to the lower core (#22). The upper portion of the elongated TM structure is spherical in contour and extends into the anterior chamber (FIG. 17, #63) to simulate the TM itself. The elongated TM structure then extends downward in a tubular form below the anterior chamber and has a lower outward flange to mount on the lower core (FIG. 29A, #22). The elongated TM structure can be adhered to the core, mechanically fixed to the core, or encapsulated between (FIG. 29A): the core (#22), corneal dome (#11), and scleral dome (#12). Note that water containment sealed by the sealing surface (#35) is unaffected by this component.

The Elongated TM Structure can have unique material properties for realistic tissue visualization during simulated eye imaging and scanning.

The Elongated TM Structure can be transparent or opaque depending on the simulation requirements.

The simulated TM can have surface coatings applied or laser alterations to better simulate tissue (FIG. 17, #51).

Pierceable Membrane

The proposed design (FIG. 31) has a pierceable membrane (FIG. 32, #66) to contain the fluid inside the eye model. This membrane (#66) and accompanying piercing attachment (#67) allow the eye to be filled with fluid while simultaneously purged of air. While the eye is upside down (FIG. 33), a syringe pushes fluid (e.g., water or viscoelastic, saline, etc.) into the inlet luer (#68) where the fluid travels through the inlet needle (#69), past the pierceable membrane (#66), and into the bubble reservoir (#37) and anterior chamber. When the water is pushed into the eye it displaces the air inside where it escapes through an outlet needle (#70). The attachment arms (#71) hold the eye securely during use of the piercing attachment (#67). After filling the eye, the piercing attachment (#67) can be removed, which then allows the pierceable membrane (#66) to reseal itself to maintain integrity of the internal chamber during use.

Figure 31:
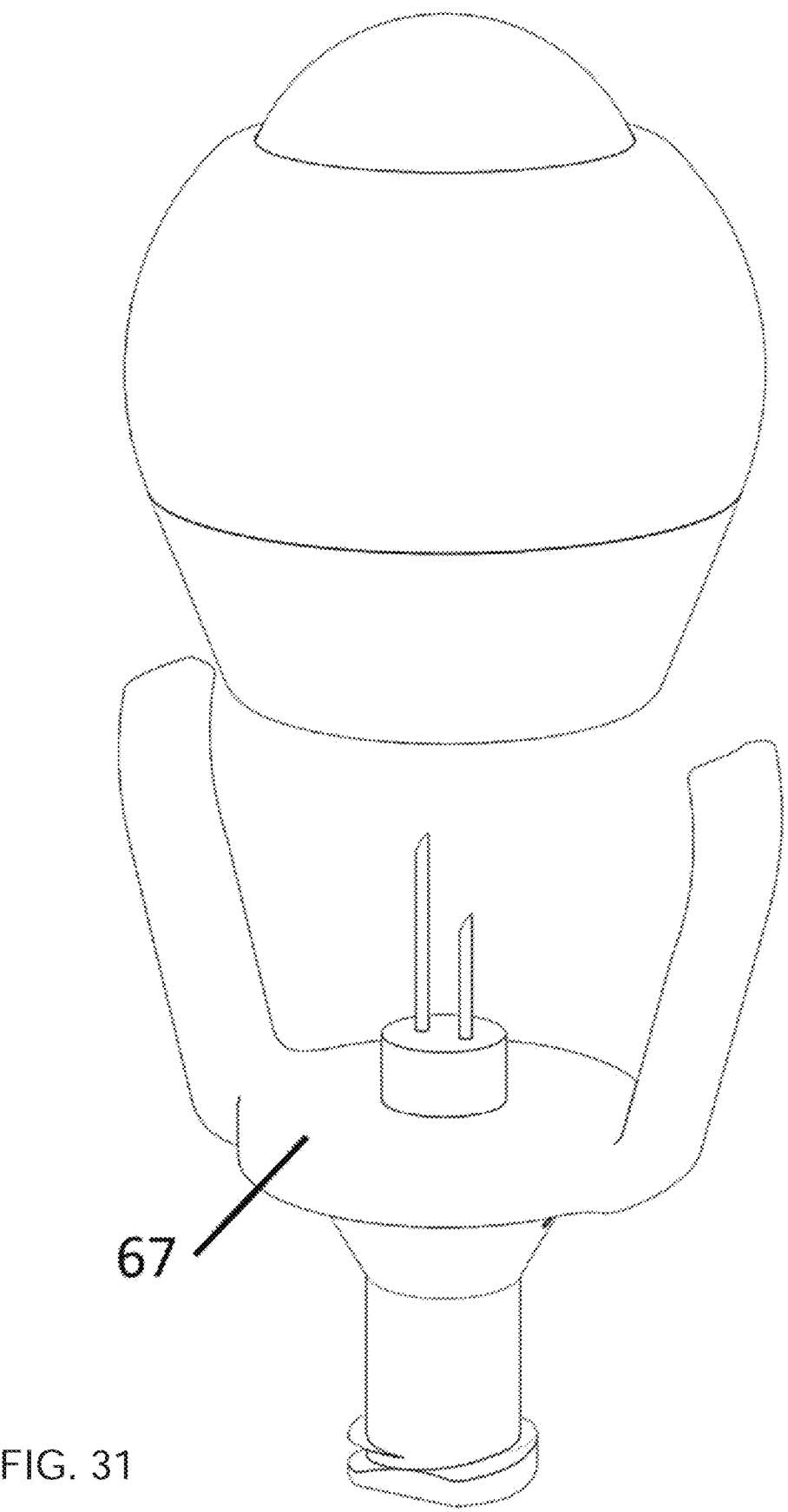
FIG. 31 is a perspective view of an eye model with a penetrable membrane and piercing attachment for filling fluid and exhausting air.
Figure 32:
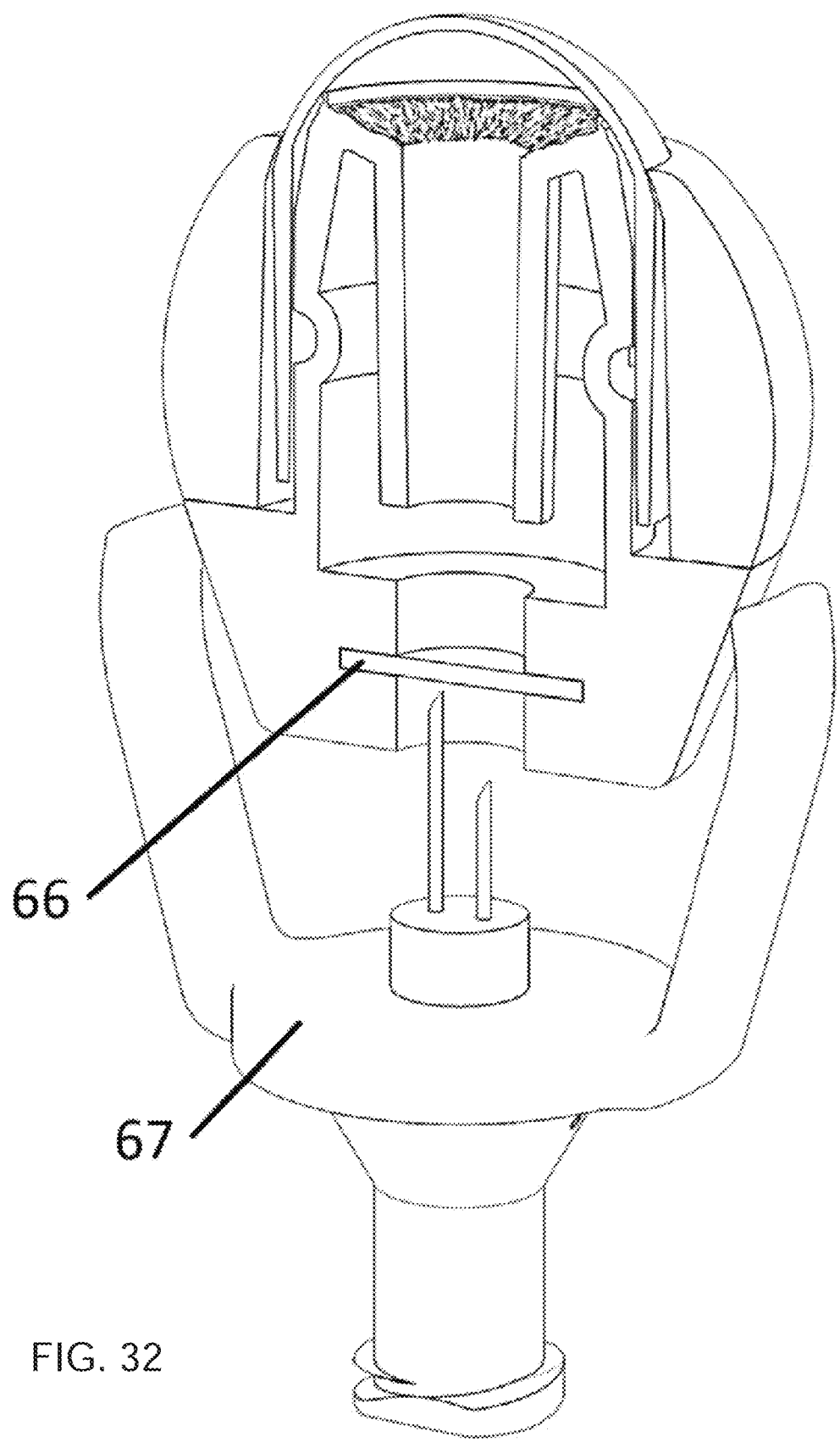
FIG. 32 is a cross-sectional view of the eye model of FIG. 31 showing internal membrane piercing attachment.
Figure 33:
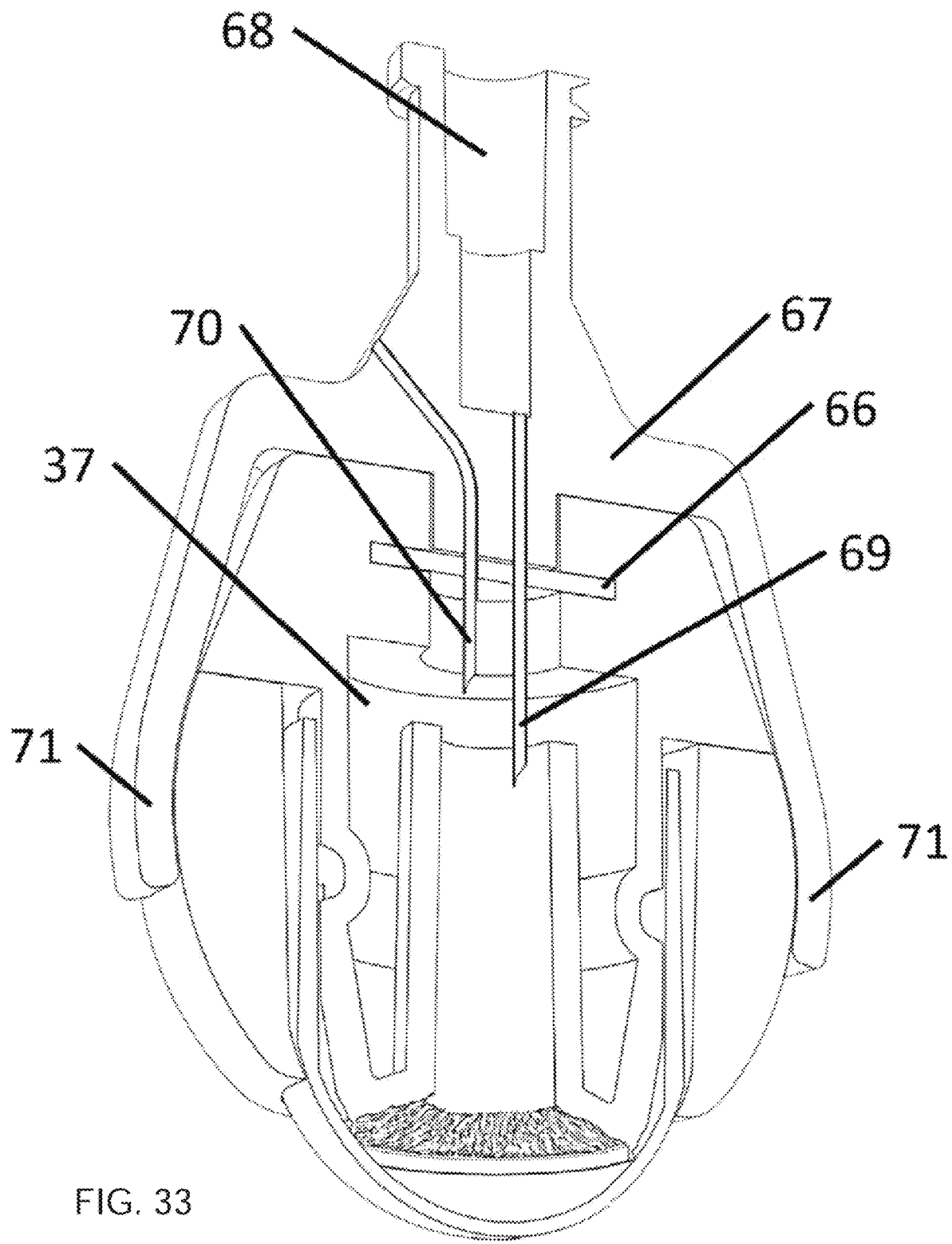
FIG. 33 is an inverted cross-sectional view of the eye model of FIG. 31 showing the piercing attachment connected and flow channels

FIG. 31 demonstrates what the eye and piercing attachment look like from the outside. FIG. 32 shows a partial cross-sectional view of the eye model of FIG. 31. FIG. 32 is a full cross-sectional view of FIG. 31 to demonstrate full engagement of the piercing attachment (#67) and how it could sit within the eye.

Figure 40:
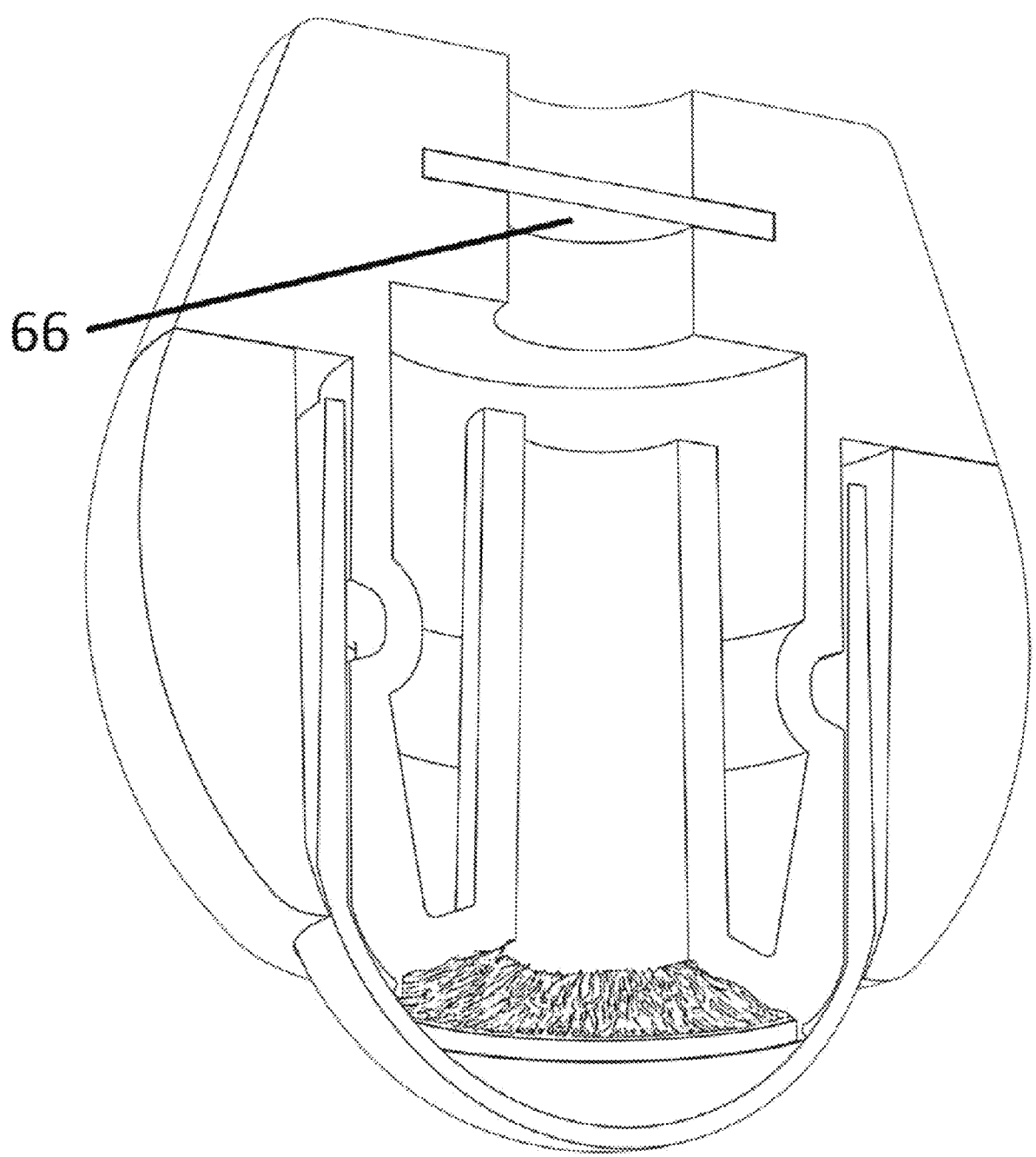
FIG. 40 is an alternative design to the eye model of FIG. 31 where the pierceable membrane is utilized without the piercing attachment.

An alternative approach is displayed in FIG. 40 where the pierceable membrane (#66) exists without the piercing attachment. The piercing attachment holds two needles in place to reduce the skill needed to exchange water/air through the membrane but it isn't necessary as two separate standard hypodermic needles can be utilized to achieve the same result.

The following lists various elements numbered in the drawings:

| Item # | Component/Concept |
|---|---|
| 11 | Corneal Dome |
| 12 | Scleral Dome |
| 13 | inlet/outlet ports |
| 14 | luer connectors, attached |
| 15 | cosmetic iris |
| 16 | iris holes |
| 17 | iris holes, alternative shape |
| 18 | internal flow channels |
| 19 | syringe |
| 20 | mounting stand |
| 21 | TM ridge |
| 22 | core |
| 23 | tubing/fluid transport tubes |
| 24 | luer connectors, detached |
| 25 | iris/pupil floor |
| 26 | cornea section of corneal dome |
| 27 | structural section of corneal dome |
| 28 | clock hour markings |
| 29 | water basin |
| 30 | one way valve |
| 31 | iris, 3D |
| 32 | capture tube |
| 33 | bubble chamber |
| 34 | water port - made of 42 (O-ring) and 44 (mechanical attach) |
| 35 | sealing surface |
| 36 | anterior chamber with 3D iris |
| 37 | bubble reservoir - made of 32 (capture tube) and 33 (bubble chamber) |
| 38 | refill system - made of 34 (port) and 43 (port cover) |
| 39 | center axis |
| 40 | iris, smooth |
| 41 | posts for capture tube |
| 42 | O-ring, water port |
| 43 | port cover (entire separate component) |
| 44 | water port: mechanical attachment |
| 45 | seal opener (thumbscrew, hex key, Phillips, other driver type) |
| 46 | threaded mounting dock |
| 47 | set screw |
| 48 | sealed bottom |
| 51 | colored TM walls |
| 52 | Schlemm's canal |
| 53 | laser |
| 54 | bubbles |
| 55 | hole from laser in TM |
| 56 | vertical TM wall |
| 57 | less acute TM wall |
| 58 | TM wall with additional geometry |
| 59 | no SC |
| 60 | flexible sheet TM |
| 61 | canal frame |
| 62 | upper end of the core |
| 63 | elongated TM structure |
| 66 | Pierceable membrane |
| 67 | piercing attachment |
| 68 | inlet luer |
| 69 | inlet needle |
| 70 | outlet needle |
| 71 | attachment arms |

While the invention has been described in its preferred embodiments, it is to be understood that the words which have been used are words of description and not of limitation. Therefore, changes may be made within the appended claims without departing from the true scope of the invention.

What is claimed is:

1. An eye model adapted to manage bubbles, comprising:
a lower core;
a corneal dome positioned above the lower core;
an anterior chamber under the corneal dome defining a floor; and
a bubble reservoir defined by the lower core and located under the anterior chamber, the bubble reservoir having a capture tube opening through the floor to the anterior chamber and a bubble chamber in fluid communication with a lower end of the capture tube and rising up above the capture tube lower end to an upper portion sealed off from the anterior chamber;
wherein the bubble reservoir is configured such that upon rotation of the eye model about a horizontal axis bubbles in the anterior chamber are urged out of the capture tube and captured in the bubble chamber and, after full 360° rotation of the eye model about the horizontal axis, buoyancy of the bubbles prevents them from traveling back to the capture tube and the anterior chamber.

2. The eye model of claim 1, wherein the floor of the anterior chamber simulates an iris.

3. The eye model of claim 1, wherein the lower core has a lower port where fluid can be added to or removed from the eye model.

4. The eye model of claim 3, further including a removable sealed cover over the lower port.

5. The eye model of claim 4, wherein the sealed cover comprises a set screw and an O-ring.

6. The eye model of claim 4, wherein the sealed cover comprises a straight or tapered shaft and an O-ring.

7. The eye model of claim 1, wherein the lower core has an inlet port and an outlet port, each port being in fluid communication with the bubble reservoir for adding and removing fluid from the eye model.

8. The eye model of claim 1, wherein the corneal dome mounts to the lower core.

9. The eye model of claim 1, wherein the capture tube is centered within the eye model and the bubble chamber surrounds the capture tube so that bubbles can be urged out of the capture tube and into the bubble chamber by tilting the eye model horizontally in any direction.

10. The eye model of claim 1, further including a rim structure surrounding and extending upward from the floor of the anterior chamber to represent an iridocorneal angle for simulated surgeries.

11. The eye model of claim 10, further including a coating on the rim structure indicating a trabecular meshwork that is susceptible to removal by application of a laser.

12. An eye model adapted to manage bubbles, comprising:
a lower core having an anterior chamber floor at an upper end and two holes therethrough;
a corneal dome positioned above the lower core above the floor defining an anterior chamber therebetween; and
a bubble management flow subsystem defined by the lower core and located under the anterior chamber, the subsystem having an inlet port and an outlet port, each port being in fluid communication with separate internal flow channels for fluid inlet and outlet within the lower core that each open to one of the holes in the anterior chamber floor;
wherein bubbles and particulates in the anterior chamber are removed from the anterior chamber upon fluid flow through the bubble management flow subsystem.

13. The eye model of claim 12, further including a rim structure surrounding and extending upward from the floor of the anterior chamber to represent an iridocorneal angle for simulated surgeries.

14. The eye model of claim 13, further including a coating on the rim structure indicating a trabecular meshwork that is susceptible to removal by application of a laser.

15. The eye model of claim 13, further including a flexible sheet stretched over the rim structure to represent a trabecular meshwork that is susceptible to removal by application of a laser or tissue removal tool.

16. The eye model of claim 15, further including a canal frame disposed at an upper end of the lower core, wherein the flexible sheet is held taut by capture between the canal frame and the lower core.

17. The eye model of claim 12, further including a push-button one-way valve attached to the outlet port for controlled removal of fluid and bubbles from the bubble management flow subsystem.

18. The eye model of claim 12, further including an elongated trabecular meshwork structure having an upper portion that is spherical in contour and extends into the anterior chamber within the corneal dome, the elongated trabecular meshwork structure extends downward below the anterior chamber to a lower tubular portion.

19. The eye model of claim 18, wherein the lower tubular portion terminates in an outward flange for mounting to the lower core.

20. The eye model of claim 18, wherein the elongated trabecular meshwork structure is encapsulated between the lower core and the corneal dome.

\* \* \* \* \*